US012732554B2

(12) United States Patent
Zhu et al.

(10) Patent No.: US 12,732,554 B2
(45) Date of Patent: Sep. 8, 2026

(54) COMMUNICATION METHOD AND RELATED APPARATUS

(71) Applicant: HUAWEI TECHNOLOGIES CO., LTD., Shenzhen (CN)

(72) Inventors: Huiying Zhu, Shanghai (CN); Pengpeng Dong, Shanghai (CN); Zhiyuan Tan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 211 days.

(21) Appl. No.: 18/649,621

(22) Filed: Apr. 29, 2024

(65) Prior Publication Data

US 2024/0283838 A1 Aug. 22, 2024

Related U.S. Application Data

(63) Continuation of application No. PCT/CN2022/127394, filed on Oct. 25, 2022.

(30) Foreign Application Priority Data

Oct. 29, 2021 (CN) ........................ 202111276293.2

(51) Int. Cl.
*H04L 65/70* (2022.01)
*H04L 47/17* (2022.01)

(52) U.S. Cl.
CPC ............. *H04L 65/70* (2022.05); *H04L 47/17* (2013.01)

(58) Field of Classification Search
CPC ....... H04L 65/70; H04L 47/17; H04L 1/0041; H04L 1/0076; H04L 1/0075;
(Continued)

(56) References Cited

U.S. PATENT DOCUMENTS

2011/0142141 A1* 6/2011 Huang .................... H04L 47/10 375/242
2014/0379858 A1* 12/2014 Mahdaviani .......... H04L 1/0076 709/217
(Continued)

FOREIGN PATENT DOCUMENTS

CN 105356968 A 2/2016
CN 109041154 A 12/2018

*Primary Examiner* — Ashley Shivers
(74) *Attorney, Agent, or Firm* — Leydig, Voit & Mayer, Ltd.

(57) ABSTRACT

A communication method related to an extended reality (XR) service or another low-latency service is provided. In a multi-hop scenario, after receiving a data packet sent by a previous-hop node and an encoding coefficient of the data packet relative to an original data packet, a forwarding node first determines a newest encoding coefficient based on the encoding coefficient received by the forwarding node from the previous-hop node and an encoding coefficient newly obtained by the forwarding node, and encodes, by using the newest encoding coefficient, the data packet received by the forwarding node from the previous-hop node. In this case, a data packet obtained through encoding is essentially a data packet obtained by the forwarding node by encoding the original data packet by using the newly obtained encoding coefficient. An encoding calculation amount can be further reduced while network recoding is implemented, thereby improving an encoding rate.

20 Claims, 14 Drawing Sheets

S1201: A communication node receives T data packets and T pieces of first information, where a $t^{th}$ piece of first information in the T pieces of first information indicates an encoding coefficient group of a $t^{th}$ data packet in the T data packets relative to K to-be-encoded data packets, K is a positive integer, T is an integer greater than or equal to K, and t is an integer and is sequentially selected from 1 to T

↓

S1202: The communication node obtains E first encoding coefficient groups, where each of the E first encoding coefficient groups includes k encoding coefficients; and determines E second encoding coefficient groups based on the E first encoding coefficient groups and T encoding coefficient groups indicated by the T pieces of first information

↓

S1203: The communication node encodes K data packets in the T data packets based on the E second encoding coefficient groups to obtain E target data packets

↓

S1204: The communication node sends the E target data packets and E pieces of second information, where an $e^{th}$ piece of second information in the E pieces of second information includes first sub information, the first sub information in the $e^{th}$ piece of second information indicates an $e^{th}$ first encoding coefficient group in the E first encoding coefficient groups, and the $e^{th}$ first encoding coefficient group is an encoding coefficient group of the $e^{th}$ target data packet in the E target data packets relative to the K to-be-encoded data packets

(58) Field of Classification Search
CPC ........... H04L 2001/0097; H04L 1/0033; H04L 1/0036; Y02D 30/70; H04W 28/04
See application file for complete search history.

(56) References Cited

U.S. PATENT DOCUMENTS

| | | | | |
|---|---|---|---|---|
| 2015/0281406 | A1 | 10/2015 | Lucani et al. | |
| 2021/0297180 | A1* | 9/2021 | Ma | H04L 1/1812 |
| 2021/0297988 | A1* | 9/2021 | Zhou | H04L 1/1819 |

* cited by examiner

| Hop quantity information | Bitmap information 1 | Bitmap information 2 | ... | Bitmap information D |
| --- | --- | --- | --- | --- |

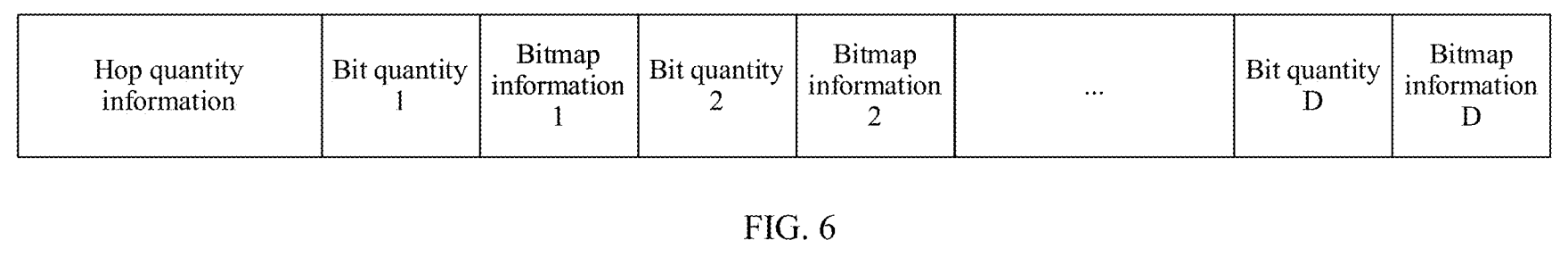

| Hop quantity information | Bit quantity 1 | Bitmap information 1 | Bit quantity 2 | Bitmap information 2 | ... | Bit quantity D | Bitmap information D |
|---|---|---|---|---|---|---|---|

FIG. 6

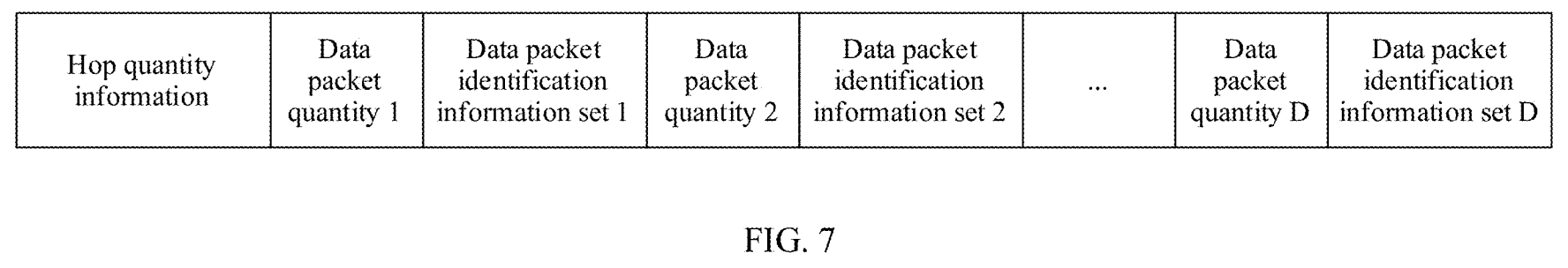

| Hop quantity information | Data packet quantity 1 | Data packet identification information set 1 | Data packet quantity 2 | Data packet identification information set 2 | ... | Data packet quantity D | Data packet identification information set D |
|---|---|---|---|---|---|---|---|

FIG. 7

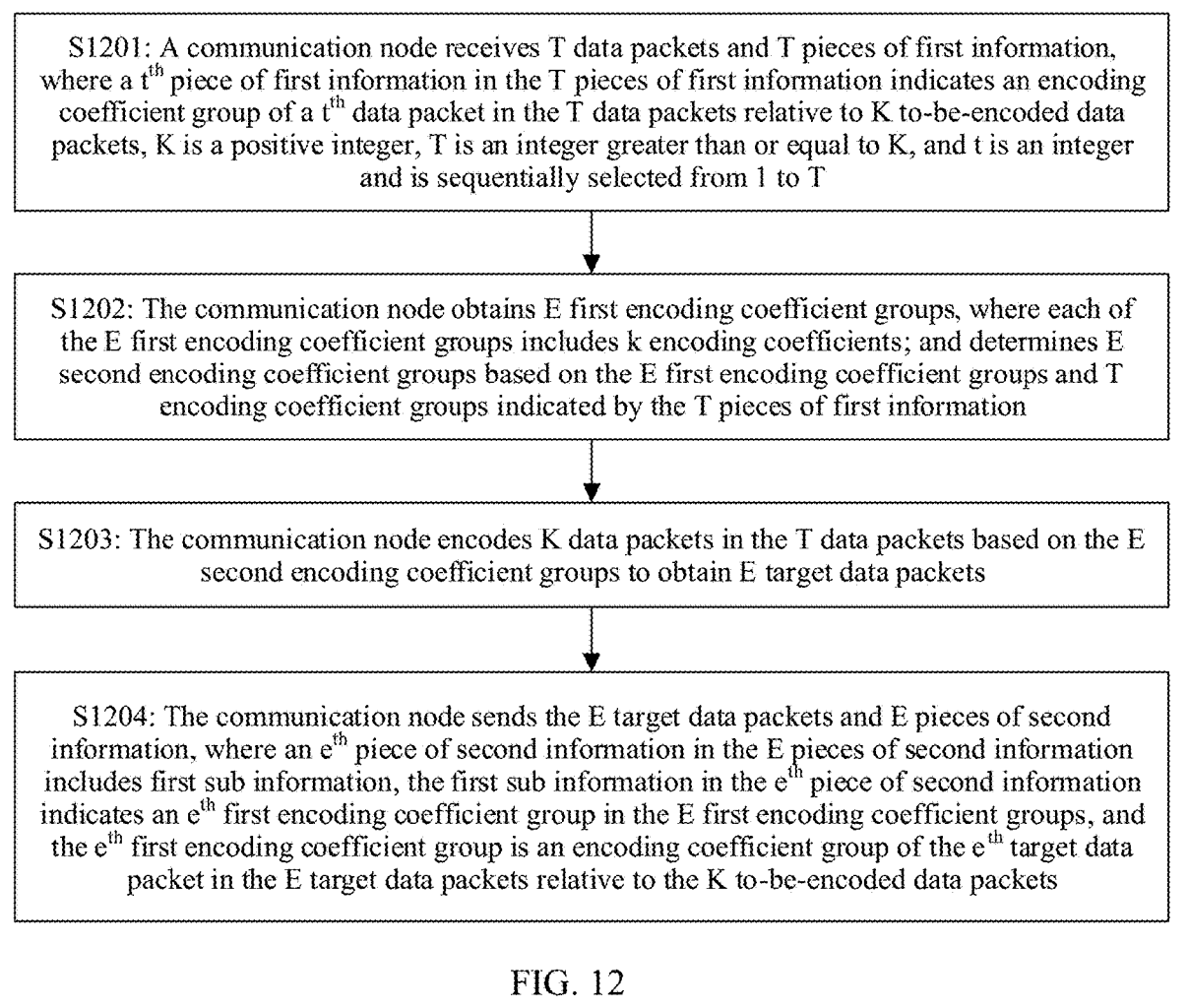

S1201: A communication node receives T data packets and T pieces of first information, where a $t^{th}$ piece of first information in the T pieces of first information indicates an encoding coefficient group of a $t^{th}$ data packet in the T data packets relative to K to-be-encoded data packets, K is a positive integer, T is an integer greater than or equal to K, and t is an integer and is sequentially selected from 1 to T S1202: The communication node obtains E first encoding coefficient groups, where each of the E first encoding coefficient groups includes k encoding coefficients; and determines E second encoding coefficient groups based on the E first encoding coefficient groups and T encoding coefficient groups indicated by the T pieces of first information S1203: The communication node encodes K data packets in the T data packets based on the E second encoding coefficient groups to obtain E target data packets S1204: The communication node sends the E target data packets and E pieces of second information, where an $e^{th}$ piece of second information in the E pieces of second information includes first sub information, the first sub information in the $e^{th}$ piece of second information indicates an $e^{th}$ first encoding coefficient group in the E first encoding coefficient groups, and the $e^{th}$ first encoding coefficient group is an encoding coefficient group of the $e^{th}$ target data packet in the E target data packets relative to the K to-be-encoded data packets

FIG. 12

COMMUNICATION METHOD AND RELATED APPARATUS

CROSS REFERENCE TO RELATED APPLICATIONS

This application is a continuation of International Application No. PCT/CN2022/127394, filed on Oct. 25, 2022, which claims priority to Chinese Patent Application No. 202111276293.2, filed on Oct. 29, 2021. The disclosures of the aforementioned applications are hereby incorporated by reference in their entireties.

TECHNICAL FIELD

Embodiments of this application relate to the communication field, and in particular, to a communication method, a communication apparatus, a computer storage medium, and a computer program product.

BACKGROUND

In a wireless communication network in a multi-hop scenario, a person skilled in the art proposes a technical solution in which a forwarding node of at least one hop needs to recode a data packet from a previous hop after receiving the data packet in multi-hop transmission to improve a transmission success rate of the data packet, but does not further put forward a specific implementation in which the forwarding node implements network recoding for the data packet.

Therefore, how to implement network recoding by a communication node serving as a forwarding node in a multi-hop scenario becomes an urgent technical problem to be resolved.

SUMMARY

Embodiments of this application provide a communication method, a communication apparatus, a computer-readable storage medium, and a computer program product, to implement network recoding of a forwarding node in a multi-hop scenario and further reduce an encoding calculation amount of the forwarding node in the multi-hop scenario, thereby improving an encoding rate.

A communication system to which the technical solutions provided in this application may be applied includes multi-hop transmission. A transmit end of each hop is referred to as a start node of the hop, and a receive end of the hop is referred to as an end node of the hop. An end node of a previous hop is a start node of a current hop. A communication node that serves as the end node of the previous hop and serves as the start node of the current hop is referred to as a forwarding node.

A first hop in a plurality of hops is used as a current hop. A start node of the current hop encodes a data packet, and sends an encoded data packet of the start node of the current hop to an end node of the current hop. After receiving the encoded data packet of the start node of the current hop, the end node of the current hop serves as a start node of a new current hop, and continues to repeat the foregoing steps until the data packet arrives at an end node of a final hop.

According to a first aspect, this application provides a communication method. The communication method includes: receiving T data packets and T pieces of first information, where the T data packets are in a one-to-one correspondence with the T pieces of first information, each of the T pieces of first information indicates an encoding coefficient group of a data packet corresponding to the first information in the T data packets relative to K to-be-encoded data packets, K is a positive integer greater than 1, and T is an integer greater than or equal to K; obtaining E first encoding coefficient groups, where each of the E first encoding coefficient groups includes K encoding coefficients; and determining E second encoding coefficient groups based on the E first encoding coefficient groups and T encoding coefficient groups indicated by the T pieces of first information, where the E second encoding coefficient groups, the E first encoding coefficient groups, and the T encoding coefficient groups satisfy the following relationship:

$$[f_1 \ldots f_e \ldots f_E]=[l_1 \ldots l_k \ldots l_K]^{-1}[h_1 \ldots h_e \ldots h_E], \text{ where}$$

$l_k$ represents a $k^{th}$ encoding coefficient group in K encoding coefficient groups in the T encoding coefficient groups, $h_e$ represents an $e^{th}$ first encoding coefficient group in the E first encoding coefficient groups, $[l_1 \ldots l_k \ldots l_K]^{-1}$ represents an inverse matrix of a matrix in which K encoding coefficient groups from $l_1$ to $l_K$ are K column vectors, $f_e$ represents an $e^{th}$ second encoding coefficient group in the E second encoding coefficient groups, k is an integer and is sequentially selected from 1 to K, and e is an integer and is sequentially selected from 1 to E; encoding K data packets in the T data packets based on the E second encoding coefficient groups to obtain E target data packets, where the K data packets are in a one-to-one correspondence with the K encoding coefficient groups, and the E target data packets, the E second encoding coefficient groups, and the T data packets satisfy the following relational expression:

$$[Y_1 \ldots Y_e \ldots Y_E]=[R_1 \ldots R_k \ldots R_K][f_1 \ldots f_e \ldots f_E], \text{ where}$$

$Y_e$ represents an $e^{th}$ target data packet in the E target data packets, and $R_k$ represents a $k^{th}$ data packet in the K data packets; and sending the E target data packets and E pieces of second information that are in a one-to-one correspondence with the E target data packets, where each of the E pieces of second information includes first sub information indicating a first encoding coefficient group that is of a target data packet corresponding to the second information and that is in the E first encoding coefficient groups, and the first encoding coefficient group is an encoding coefficient group of the target data packet relative to the K to-be-encoded data packets.

Any forwarding node in a multi-hop scenario or a chip used in a forwarding node may perform this method. When the method is performed by different forwarding nodes, values of a same variable in the method may be the same or may be different on different forwarding nodes. For example, values of quantities T of data packets encoded by different forwarding nodes may be the same or may be different. For another example, E first encoding coefficient groups used by different forwarding nodes may be the same or may be different. However, generally, E first encoding coefficient groups used by a same forwarding node are E different encoding coefficient groups.

In this method, the K to-be-encoded data packets are data packets that are to be encoded by an initial node by using the method in this application, and may be original data packets (that is, data packets that do not undergo network encoding)

or may be data packets obtained by encoding original data packets by another forwarding node. A manner in which the another forwarding node encodes the original data packets is not limited.

An inversion operation may be performed for encoding coefficient groups corresponding to the K data packets in the T data packets. If inversion can be performed for encoding coefficient groups corresponding to more than K data packets in the T data packets, K data packets may be selected from the more than K data packets according to a specific rule. For example, the data packets are randomly selected, or K previous data packets are selected.

In this method, because the K encoding coefficient groups in the T encoding coefficient groups are all or some of encoding coefficient groups of the T data packets relative to the K to-be-encoded data packets, and $[f_1 \ldots f_e \ldots f_E]$ is a product of an inverse matrix of a matrix formed by the K encoding coefficient groups and E first encoding coefficient groups obtained by a transit node, in a process of multiplying $[f_1 \ldots f_e \ldots f_E]$ by the K data packets in the T data packets to encode the K data packets, it may be understood that effect of encoding the K to-be-encoded data packets by using the K encoding coefficient groups is canceled. In this way, the E target data packets obtained through encoding by the transit node may be equivalent to encoded data packets obtained by encoding the K to-be-encoded data packets by using the E first encoding coefficient groups obtained by the transit node. In this case, the forwarding node sends the E first encoding coefficient groups and the E target data packets obtained through encoding, so that a subsequent node can obtain the K to-be-encoded data packets through decoding based on some encoding coefficient groups in the E first encoding coefficient groups and corresponding target data packets in the E target data packets.

In addition, because $[l_1 \ldots l_k \ldots l_K]^{-1} [h_1 \ldots h_e \ldots h_E]$ is calculation at an encoding coefficient group data volume level, and $[R_1 \ldots R_k \ldots R_K][f_1 \ldots f_e \ldots f_E]$ is calculation at a data packet data volume level, calculation at the data packet data volume level needs to be performed only once in an encoding process of the method.

In an encoding method in which $[R_1 \ldots R_k \ldots R_K][l_1 \ldots l_k \ldots l_K]^{-1}$ is calculated first and then a product of the result and $[h_1 \ldots h_e \ldots h_E]$ is calculated, because a process of calculating $[R_1 \ldots R_k \ldots R_K][l_1 \ldots l_k \ldots l_K]^{-1}$ is calculation at the data packet data volume level, and a calculation result is also a value at the data packet data volume level, a process of calculating the product of the result and $[h_1 \ldots h_e \ldots h_E]$ also includes calculation at the data packet data volume level. In other words, this recoding method requires two times of calculation at the data packet data volume level.

According to the method in this application, a quantity of times of calculation at the data packet data volume level is reduced. In addition, a data packet data volume is relatively large. Therefore, according to the method in this application, a recoding computing resource of the forwarding node can be saved, and recoding efficiency of the forwarding node can be improved.

In this method, an example of a correspondence between the T data packets and the T pieces of first information is as follows: A $t^{th}$ piece of first information in the T pieces of first information corresponds to a $t^{th}$ data packet in the T data packets, where t is an integer and is sequentially selected from 1 to T. In this case, that each of the T pieces of first information indicates an encoding coefficient group of the data packet corresponding to the first information in the T data packets relative to the K data packets may be understood as follows: The $t^{th}$ piece of first information in the T pieces of first information indicates an encoding coefficient group of the $t^{th}$ data packet in the T data packets relative to the K data packets.

It may be understood that the correspondence between the $t^{th}$ piece of first information in the T pieces of first information and the $t^{th}$ data packet in the T data packets is merely an example of the correspondence between the T data packets and the T pieces of first information. In this method, a correspondence between a data packet in the T data packets and first information in the T pieces of first information may be determined in another manner, provided that a location or sequence of each piece of first information in the T pieces of first information and a location or sequence of a data packet corresponding to the first information in the T data packets satisfy a preset relationship. The preset relationship may be preset between the forwarding node and another forwarding node, or may be indicated by a previous-hop forwarding node to a current-hop forwarding node.

In this method, an example of the one-to-one correspondence between the K data packets and the K encoding coefficient groups is as follows: A $k^{th}$ data packet in the K data packets corresponds to a $k^{th}$ encoding coefficient group in the K encoding coefficient groups, where k is an integer and is sequentially selected from 1 to K.

It may be understood that the correspondence between the $k^{th}$ encoding coefficient group in the K encoding coefficient groups and the $k^{th}$ data packet in the K data packets is merely an example of the correspondence between the K data packets and the K encoding coefficient groups. In this method, the correspondence between a data packet in the K data packets and an encoding coefficient group in the K encoding coefficient groups may be determined in another manner, for example, provided that a location or sequence of each encoding coefficient group in the K encoding coefficient groups and a location or sequence of a data packet corresponding to the encoding coefficient group in the K data packets satisfy a preset relationship. The preset relationship may be preset between the forwarding node and another forwarding node, or may be indicated by a previous-hop forwarding node to a current-hop forwarding node.

In this method, an example of the one-to-one correspondence between the E target data packets and the E pieces of second information is as follows: An $e^{th}$ piece of second information in the E pieces of second information corresponds to an $e^{th}$ target data packet in the E target data packets, where e is an integer and is sequentially selected from 1 to E. In this case, the $e^{th}$ piece of second information includes first sub information indicating an $e^{th}$ first encoding coefficient group in the E first encoding coefficient groups, and the $e^{th}$ first encoding coefficient group is an encoding coefficient group of the $e^{th}$ target data packet in the E target data packets relative to the K data packets.

It may be understood that the correspondence between the $e^{th}$ piece of second information in the E pieces of second information and the $e^{th}$ target data packet in the E target data packets is merely an example of the one-to-one correspondence between the E target data packets and the E pieces of second information. In this method, the correspondence between a target data packet in the E target data packets and second information in the E pieces of second information may be determined in another manner, for example, provided that a location or sequence of each first encoding coefficient group in the E first encoding coefficient groups and a location or sequence of a target data packet corresponding to the first encoding coefficient group in the E target data packets satisfy a preset relationship. The preset relationship may be preset between the forwarding node and another forwarding node, or may be indicated by a previous-hop forwarding node to a current-hop forwarding node.

With reference to the first aspect, in a first possible implementation, the first sub information includes the first encoding coefficient group of the target data packet corresponding to the second information.

For example, when the $e^{th}$ piece of second information in the E pieces of second information corresponds to the $e^{th}$ target data packet in the E target data packets, first sub information in the $e^{th}$ piece of second information includes the $e^{th}$ first encoding coefficient group.

With reference to the first aspect or the first possible implementation, in a second possible implementation, the first sub information includes an index, in a preset encoding coefficient group set, of the first encoding coefficient group of the target data packet corresponding to the second information.

For example, when the $e^{th}$ piece of second information in the E pieces of second information corresponds to the $e^{th}$ target data packet in the E target data packets, the $e^{th}$ first encoding coefficient group is an encoding coefficient group in the preset encoding coefficient group set.

In this implementation, linear correlation between encoding coefficient groups can be reduced, so that a relatively small quantity of encoded packets obtained through encoding based on a relatively small quantity of encoding coefficient groups can be successfully decoded, thereby reducing transmission overheads.

With reference to the second possible implementation, in a third possible implementation, the first sub information includes an index, in a preset encoding coefficient group set, of the first encoding coefficient group of the target data packet corresponding to the second information.

For example, when the $e^{th}$ piece of second information in the E pieces of second information corresponds to the $e^{th}$ target data packet in the E target data packets, first sub information in the $e^{th}$ piece of second information includes an index of the $e^{th}$ first encoding coefficient group in the preset encoding coefficient group set.

Because transmission overheads of the index are relatively low, the transmission overheads can be reduced in this implementation.

With reference to the second possible implementation, in a fourth possible implementation, the first sub information includes identification information of the target data packet corresponding to the second information, and the identification information and an index, in a preset encoding coefficient group set, of the first encoding coefficient group of the target data packet corresponding to the second information satisfy a preset relationship.

For example, when the $e^{th}$ piece of second information in the E pieces of second information corresponds to the $e^{th}$ target data packet in the E target data packets, the first sub information in the $e^{th}$ piece of second information includes identification information of the $e^{th}$ target data packet, and the identification information and an index of the $e^{th}$ first encoding coefficient group in the preset encoding coefficient group set satisfy a preset relationship.

Compared with the encoding coefficient group, transmission overheads of the identification information are relatively low. Therefore, transmission overheads can be reduced in this implementation.

With reference to the third or the fourth possible implementation, in a fifth possible implementation, each piece of second information further includes second sub information, and the second sub information indicates version information of the preset encoding coefficient group set.

For example, when the $e^{th}$ piece of second information in the E pieces of second information corresponds to the $e^{th}$ target data packet in the E target data packets, the $e^{th}$ piece of second information further includes second sub information, and the second sub information in the $e^{th}$ piece of second information indicates the version information of the preset encoding coefficient group set.

In this way, different forwarding nodes may use different preset encoding coefficient group sets. In other words, in a multi-hop scenario, even if different forwarding nodes use different encoding coefficient group sets, data can still be recoded and transmitted.

With reference to the third or the fourth possible implementation, in a sixth possible implementation, an encoding coefficient group set to which the first encoding coefficient group belongs is a pre-agreed encoding coefficient group set. In other words, different forwarding nodes agree to use a same encoding coefficient group set. In this way, transmission overheads of signaling used between communication nodes to indicate encoding coefficient group sets used by the communication nodes can be avoided.

According to a second aspect, this application provides a communication method. The method includes: receiving $G_D$ data packets and D pieces of first information from a first communication node, where the first communication node is a start node of a $D^{th}$ hop in D hop transmission, in the D hop transmission, a start node of a first hop is configured to encode $G_0$ data packets and send encoded data packets, an end node of a $d^{th}$ hop is configured to encode $G_d$ data packets from a start node of a $d^{th}$ hop and send encoded data packets, the end node of the $d^{th}$ hop is a start node of a $(d+1)^{th}$ hop, the D pieces of first information include D−1 pieces of first information that are in a one-to-one correspondence with D−1 previous hops in the D hop transmission and first information corresponding to the $G_D$ data packets, first information corresponding to a $d^{th}$ hop in the D−1 hops includes $G_d$ pieces of first sub information, the $G_d$ pieces of first sub information are in a one-to-one correspondence with the $G_d$ to-be-encoded data packets of the end node of the $d^{th}$ hop, each of the $G_d$ pieces of first sub information indicates an encoding coefficient group of a data packet corresponding to the first sub information in the $G_d$ data packets relative to a plurality of to-be-encoded data packets of the start node of the $d^{th}$ hop, the first information corresponding to the $G_D$ data packets includes $G_D$ pieces of second sub information, the $G_D$ pieces of second sub information are in a one-to-one correspondence with the $G_D$ data packets, each of the $G_D$ pieces of second sub information indicates an encoding coefficient group of a data packet corresponding to the second sub information in the $G_D$ data packets relative to to-be-encoded data packets of the first communication node, $G_0$, $G_d$, $G_D$, and D are all positive integers, d takes no value when D is 1, and d is selected from 1 to D−1 when D is greater than 1; encoding the $G_D$ data packets by using U encoding coefficient groups to obtain U data packets, where each of the U encoding coefficient groups includes $G_D$ encoding coefficients, the U data packets are in a one-to-one correspondence with the U encoding coefficient groups, and U is a positive integer; and sending D+1 pieces of first information and the U data packets, where the D+1 pieces of first information include the D−1 pieces of first information, first information corresponding to the $D^{th}$ hop, and first information corresponding to the U data packets, the first information corresponding to the $D^{th}$ hop includes $G_D$ pieces of first sub information, the $G_D$ pieces of first sub information are in a one-to-one correspondence with the $G_D$ data packets, each of the $G_D$ pieces of first sub information indicates an encoding coefficient group of a corresponding data packet in the $G_D$ data packets relative to the to-be-encoded data packets of the first communication node, the first information corresponding to the U data packets includes U pieces of second sub information that are in a one-to-one correspondence with the U encoding coefficient groups, and each of the U pieces of second sub information indicates a corresponding encoding coefficient group in the U encoding coefficient groups.

Optionally, the sent first information corresponding to the $D^{th}$ hop may be the first information that corresponds to the $G_D$ data packets and that is included in the received D pieces of first information, or may be different from the first information that corresponds to the $G_D$ data packets and that is included in the received D pieces of first information. For example, first information in a form different from a form of the first information that corresponds to the $G_D$ data packets and that is included in the D pieces of received first information is used to indicate encoding coefficient groups of corresponding data packets in the $G_D$ data packets relative to the to-be-encoded data packets of the first communication node. For example, the first information corresponding to the $G_D$ received data packets is in a bitmap form, and the sent first information corresponding to the $D^{th}$ hop includes an index of an encoding coefficient group.

Any forwarding node in a multi-hop scenario or a chip used in a forwarding node may perform this method. When the method is performed by different forwarding nodes, values of a same variable in the method may be the same or may be different on different forwarding nodes. For example, values of quantities of data packets encoded by different forwarding nodes may be the same or may be different. Generally, the quantities are greater than or equal to $G_0$. For another example, encoding coefficient groups used by different forwarding nodes may be the same or different. For still another example, values of quantities of encoded data packets of different transit nodes may be the same or different.

In this method, the $G_0$ data packets may be original data packets (that is, data packets that do not undergo network encoding), or may be data packets obtained by encoding original data packets by another transit node. A manner in which the another transit node encodes the original data packets is not limited. If the $G_0$ data packets are the data packets obtained by performing network encoding on the original data packets, encoding coefficient groups of the $G_0$ data packets relative to the original data packets may be further transmitted in a transmission process of each hop in the D hop transmission, to facilitate decoding.

In this method, there may be one or more end nodes and/or start nodes of a same hop. If there are a plurality of start nodes of a same hop, quantities of data packets obtained by encoding same data packets by each of the plurality of start nodes may be the same or different, and may be less than $G_0$. However, a total quantity of data packets obtained by encoding same data packets by the plurality of start nodes is usually greater than or equal to $G_0$.

If there is one start node of a same hop, a quantity of data packets obtained by encoding a same batch of data packets by the start node usually needs to be greater than or equal to $G_0$.

The $G_d$ to-be-encoded data packets of the end node of the $d^{th}$ hop may include the $G_d$ data packets received by the end node of the $d^{th}$ hop from the start node of the $d^{th}$ hop. In an example, the start node of the $d^{th}$ hop encodes a same encoding block or a same sliding window to obtain $F_d$ data packets, and sends the $F_d$ data packets. The end node of the $d^{th}$ hop receives the $G_d$ data packets in the $F_d$ data packets. The $G_d$ data packets may be all or some of the $F_d$ data packets. In other words, $G_d$ is less than or equal to $F_d$, and $F_d$ is a positive integer.

An example of the $G_d$ data packets is an encoding block, and $F_{d+1}$ data packets may be obtained by encoding data packets in the encoding block. Another example of the $G_d$ data packets is a sliding window, and $F_{d+1}$ data packets may be obtained by encoding data packets in the sliding window.

In the method, after a current forwarding node recodes the $G_D$ data packets by using U encoding coefficients, the current forwarding node not only sends U encoded data packets and encoding coefficient groups of the U data packets relative to the $G_D$ data packets, but also sends encoding coefficient groups corresponding to to-be-encoded data packets of an end node of each hop relative to to-be-encoded data packets of an end node of each hop's previous hop. In this way, a subsequent node may learn of encoding coefficient groups used when received data packets are recoded at each previous hop, and therefore can obtain original data packets through decoding based on these encoding coefficient groups.

In addition, in comparison with a method in which an end node of each hop further needs to calculate an encoding coefficient group of a recoded data packet relative to an original data packet after recoding a received data packet by using an encoding coefficient group selected by the end node of each hop, in the method, the encoding coefficient group used by the end node of each hop for recoding is directly sent, and the encoding coefficient group of the recoded data packet relative to the original data packet does not need to be calculated, to reduce computing resource overheads of the forwarding node, improve recoding efficiency of the forwarding node, reduce a transmission delay, and improve transmission efficiency.

In this method, because the U encoding coefficient groups are in a one-to-one correspondence with the U data packets, and the U encoding coefficient groups are in a one-to-one correspondence with the U pieces of second sub information, the U pieces of second sub information are in a one-to-one correspondence with the U data packets, and the U pieces of second sub information and second sub information corresponding to each of the U data packets indicate encoding coefficient groups corresponding to the data packets in the U encoding coefficient groups.

In this method, an example in which D−1 previous hops in the D hop transmission are in a one-to-one correspondence with D−1 pieces of first information in the D pieces of first information is as follows: A $d^{th}$ piece of first information in the D pieces of first information corresponds to a $d^{th}$ hop in the D hop transmission, where d takes no value when D is 1, and d is selected from 1 to D−1 when D is greater than 1. In this case, first information corresponding to a $d^{th}$ hop in the D−1 hops is a $d^{th}$ piece of first information in the D pieces of first information, and the first information corresponding to the $G_D$ data packets is a $D^{th}$ piece of first information in the D pieces of first information.

It may be understood that the correspondence between the $d^{th}$ piece of first information in the D pieces of first information and the $d^{th}$ hop in the D hop transmission is merely an example of the one-to-one correspondence between the D−1 previous hops and the D−1 pieces of first information. In this method, the correspondence between each of the D−1 previous hops and the first information in the D−1 pieces of first information may be determined in another manner, provided that a location or sequence of the first information corresponding to the $d^{th}$ hop in the D pieces of first information and a value of d satisfy the preset relationship.

In this method, an example in which the U data packets are in a one-to-one correspondence with the U encoding coefficient groups is as follows: A $u^{th}$ encoding coefficient group in the U encoding coefficient groups corresponds to a $u^{th}$ data packet in the U data packets, where u is an integer and is selected from 1 to U. In this case, the $u^{th}$ data packet in the U data packets is a data packet obtained by encoding the $G_D$ data packets by using the $u^{th}$ encoding coefficient group in the U encoding coefficient groups.

It may be understood that the correspondence between the $u^{th}$ encoding coefficient group in the U encoding coefficient groups and the $u^{th}$ data packet in the U data packets is merely an example of the one-to-one correspondence between the U data packets and the U encoding coefficient groups. In this method, the correspondence between the U data packets and the U encoding coefficient groups may be determined in another manner, provided that a location or sequence of each data packet in the U data packets and a location or sequence of an encoding coefficient group corresponding to the data packet in the U encoding coefficient groups satisfy a preset relationship.

In this method, an example in which the U encoding coefficient groups are in a one-to-one correspondence with the U pieces of second sub information is as follows: The $u^{th}$ encoding coefficient group in the U encoding coefficient groups corresponds to a $u^{th}$ piece of second sub information in the U pieces of second sub information, where u is an integer and is selected from 1 to U. In this case, the $u^{th}$ piece of second sub information in the U pieces of second sub information indicates the $u^{th}$ encoding coefficient group in the U encoding coefficient groups.

It may be understood that the correspondence between the $u^{th}$ encoding coefficient group in the U encoding coefficient groups and the $u^{th}$ piece of second sub information in the U pieces of second sub information is an example of the one-to-one correspondence between the U encoding coefficient groups and the U pieces of second sub information. In this method, the correspondence between an encoding coefficient group in the U encoding coefficient groups and second sub information in the U pieces of second sub information may be determined in another manner, provided that a location or sequence of each piece of second sub information in the U pieces of second sub information and a location or sequence of an encoding coefficient group corresponding to the second sub information in the U encoding coefficient group satisfy a preset relationship, or provided that a location or sequence of each piece of second sub information in the U pieces of second sub information and a location or sequence of a data packet corresponding to an encoding coefficient group corresponding to the second sub information in the U data packets satisfy a preset relationship.

With reference to the second aspect, in a first possible implementation, each of the U encoding coefficient groups is an encoding coefficient group in a first preset encoding coefficient group set.

In this implementation, the preset encoding coefficient group set includes one or more encoding coefficient groups, and encoding coefficients included in each encoding coefficient group in the preset encoding coefficient group set are fixed, determined, or preset.

Encoding is performed by using an encoding coefficient group in the preset encoding coefficient group set, to reduce linear correlation between the encoding coefficient groups. In this way, to-be-encoded data packets can be obtained by decoding a relatively small quantity of encoded packets. Therefore, transmission overheads can be reduced, and a transmission success rate can be improved.

With reference to the first possible implementation, in a second possible implementation, each of the U pieces of second sub information includes an index, in the first preset encoding coefficient group set, of an encoding coefficient group of a data packet corresponding to the second sub information in the U encoding coefficient groups.

For example, the $u^{th}$ encoding coefficient group in the U encoding coefficient groups corresponds to the $u^{th}$ piece of second sub information in the U pieces of second sub information. In this case, the $u^{th}$ piece of second sub information in the U pieces of second sub information includes an index, in the first preset encoding coefficient group set, of the $u^{th}$ encoding coefficient group in the U encoding coefficient groups. In other words, the $u^{th}$ piece of second sub information in the U pieces of second sub information includes the index, in the first preset encoding coefficient group set, of the encoding coefficient group corresponding to the $u^{th}$ data packet in the U data packets.

Encoding coefficients included in each encoding coefficient group in the preset encoding coefficient group set are fixed. Therefore, when the encoding coefficient group in the preset encoding coefficient group set is used for recoding, and the forwarding node indicates, to a subsequent communication node, the encoding coefficient group used for recoding, the used encoding coefficient group may be indicated by using an index of the used encoding coefficient group (referred to as a target encoding coefficient group) in the preset encoding coefficient group set.

The forwarding node indicates the used encoding coefficient group by using the index of the used encoding coefficient group in the preset encoding coefficient group set. Transmission resources can be saved in this manner in comparison with a manner in which a transit node directly transmits the encoding coefficient group to a subsequent communication node.

With reference to the first possible implementation, in a third possible implementation, each of the U pieces of second sub information includes identification information of a data packet that corresponds to the second sub information and that is in the U data packets, and the identification information of the data packet that corresponds to the second sub information and that is in the U data packets and an index, in the first preset encoding coefficient group set, of an encoding coefficient group of a data packet corresponding to the second sub information in the U encoding coefficient groups satisfy a first preset relationship.

For example, the $u^{th}$ encoding coefficient group in the U encoding coefficient groups corresponds to the $u^{th}$ piece of second sub information in the U pieces of second sub information, and the $u^{th}$ encoding coefficient group in the U encoding coefficient groups corresponds to the $u^{th}$ data packet in the U data packets. The $u^{th}$ piece of second sub information in the U pieces of second sub information includes identification information of the $u^{th}$ data packet in the U data packets. The identification information of the $u^{th}$ data packet in the U data packets and an index, in the first preset encoding coefficient group set, of the $u^{th}$ encoding coefficient group in the U encoding coefficient groups satisfy the first preset relationship.

In this implementation, because a relationship (the first preset relationship) between identification information of a data packet and an index of an encoding coefficient group corresponding to the data packet in the first preset encoding coefficient group set is preset, the forwarding node may indicate, by using the identification information of the data packet, the index of the encoding coefficient group corresponding to the data packet, and finally indicate the encoding coefficient group corresponding to the data packet.

The encoding coefficient group corresponding to the data packet is indicated by using the identification information of the data packet. In comparison with direct transmission of the encoding coefficient group to the subsequent communication node, transmission resources can be saved because transmission overheads of the identification information of the data packet are less than transmission overheads of the encoding coefficient group.

With reference to any one of the first to the third possible implementations, in a fourth possible implementation, the first information corresponding to the U data packets further includes third sub information, and the third sub information indicates version information of the first preset encoding coefficient group set.

For example, the first information corresponding to the U data packets is a $(D+1)^{th}$ piece of first information in the D+1 pieces of first information. The $(D+1)^{th}$ piece of first information further includes the third sub information. The third sub information indicates the version information of the first preset encoding coefficient group set.

In this implementation, the forwarding node further indicates, to a subsequent node, version information of a preset encoding coefficient group set used by the forwarding node. In this way, even if the forwarding node and another communication node use different preset encoding coefficient group sets, the subsequent node can accurately learn of the preset encoding coefficient group set used by the forwarding node for recoding, so that the subsequent node can accurately learn of the encoding coefficient group used by the forwarding node for recoding.

In this implementation, different communication nodes in a multi-hop scenario may use different preset encoding coefficient group sets, so that networking flexibility of a wireless communication network in the multi-hop scenario can be improved.

Optionally, the forwarding node and another communication node in the multi-hop scenario to which the forwarding node belongs may use a same preset encoding coefficient group set. In this case, the first information may not include the third sub information. Transmission resources can be saved in this implementation.

Optionally, each of the U pieces of second sub information includes an encoding coefficient group corresponding to the second sub information in the U encoding coefficient groups. For example, the $u^{th}$ encoding coefficient group in the U encoding coefficient groups corresponds to the $u^{th}$ piece of second sub information in the U pieces of second sub information, and the $u^{th}$ piece of second sub information in the U pieces of second sub information includes the $u^{th}$ encoding coefficient group in the U encoding coefficient groups.

With reference to the first aspect or any one of the first to the fourth possible implementations, in a fifth possible implementation, an encoding coefficient group of each of the $G_D$ data packets relative to the to-be-encoded data packets of the first communication node is an encoding coefficient group in a second preset encoding coefficient group set. In this way, linear correlation between encoding coefficient groups selected by the first communication node for encoding can be reduced.

With reference to the fifth possible implementation, in a sixth possible implementation, the first information corresponding to the $D^{th}$ hop includes $B_D$ fields. The $G_D$ pieces of first sub information are in a one-to-one correspondence with $G_D$ fields in the $B_D$ fields. An index, in the second preset encoding coefficient group set, of an encoding coefficient group indicated by each of the $G_D$ pieces of first sub information and a location, in the $B_D$ fields, of a corresponding field in the $B_D$ fields satisfy a second preset relationship. A value of each of the $G_D$ fields is a first preset value. A value of any field other than the $G_D$ fields in the $B_D$ fields is a second preset value. Herein, $B_D$ is an integer greater than or equal to $G_D$.

In this implementation, a location, in the $B_D$ fields, of each of the $G_D$ fields and an index, in a preset encoding coefficient group set, of an encoding coefficient group corresponding to the field satisfy the second preset relationship. Therefore, the communication node that receives the $(D+1)^{th}$ piece of first sub information may learn of, based on the location of each of the $G_D$ fields in the B fields and the second preset relationship, the index, in the preset encoding coefficient group set, of the encoding coefficient group used for obtaining each of the $G_D$ data packets through encoding, and may further learn of, based on the index, the encoding coefficient group used for obtaining the data packet through encoding.

In comparison with another method of indicating the $G_D$ encoding coefficient groups corresponding to the $G_D$ data packets, transmission overheads can be reduced in this implementation.

In this implementation, optionally, each field may include one or more bits.

In this implementation, the second preset encoding coefficient group set may be the same as or different from the first preset encoding coefficient group set.

With reference to the sixth possible implementation, in a seventh possible implementation, $B_D$ is a third preset value.

With reference to the sixth possible implementation, in an eighth possible implementation, the first information corresponding to the $D^{th}$ hop further includes fourth sub information, and the fourth sub information indicates a value of $B_D$. In this implementation, the current forwarding node can flexibly set a total quantity of fields.

Optionally, $B_D$ may be a total quantity of data packets obtained by encoding the to-be-encoded data packets by the first communication node. In other words, $B_D$ may be equal to $F_D$. In this way, transmission overheads can be reduced for the current forwarding node when the total quantity of fields is flexibly set.

With reference to the fifth possible implementation, in a ninth possible implementation, each of the $G_D$ pieces of first sub information includes identification information of a corresponding data packet in the $G_D$ data packets, and an index, in the preset encoding coefficient group set, of an encoding coefficient group indicated by each of the $G_D$ pieces of first sub information and the identification information of the corresponding data packet in the $G_D$ data packets satisfy a third preset relationship.

In an example, the identification information of each of the $G_D$ data packets may be the index of the data packet in the $F_D$ data packets, and the $F_D$ data packets may be a plurality of data packets obtained by encoding a same encoding block or a same sliding window.

In comparison with another method of indicating the $G_D$ encoding coefficient groups corresponding to the $G_D$ data packets, transmission overheads can be reduced in this implementation.

With reference to the ninth possible implementation, in a tenth possible implementation, the first information corresponding to the $D^{th}$ hop further includes fifth sub information, and the fifth sub information indicates a value of $G_D$. In this implementation, the subsequent node can accurately learn of a quantity of pieces of identification information in the $D^{th}$ piece of first information, and finally can learn of an encoding coefficient group corresponding to each data packet.

With reference to any one of the fifth to the tenth possible implementations, in an eleventh possible implementation, the first information corresponding to the $D^{th}$ hop further includes sixth sub information, and the sixth sub information indicates version information of the second preset encoding coefficient group set.

With reference to the second aspect or any one of the foregoing possible implementations, in a twelfth possible implementation, D is greater than 1, and the end node of the $d^{th}$ hop encodes the $G_d$ data packets from the start node of the $d^{th}$ hop by using encoding coefficient groups in a preset encoding coefficient group set. In this way, linear correlation between encoding coefficient groups selected by the first communication node for encoding can be reduced.

With reference to the twelfth possible implementation, in a thirteenth possible implementation, the first information corresponding to the $d^{th}$ hop includes $B_d$ fields. The $G_d$ pieces of first sub information in the first information corresponding to the $d^{th}$ hop are in a one-to-one correspondence with $G_d$ fields in the $B_d$ fields. An index, in the preset encoding coefficient group set used by the end node of the $d^{th}$ node, of an encoding coefficient group indicated by each of the $G_d$ pieces of first sub information and a location, in the $B_d$ fields, of a corresponding field in the $B_d$ fields satisfy a fourth preset relationship. A value of each of the $G_d$ fields is a fourth preset value. A value of any field other than the $G_d$ fields in the $B_d$ fields is a fifth preset value. Herein, $B_d$ is an integer greater than or equal to $G_d$.

In this implementation, each of the $B_d$ fields may include one or more bits. In this implementation, $B_d$ may be greater than or equal to $F_d$. In this implementation, indication overheads of the first information can be reduced, so that transmission overheads of the first information can be reduced.

With reference to the thirteenth possible implementation, in a fourteenth possible implementation, $B_{b1}=B_{b2}$, b1 is any integer from 1 to D−1, and b2 is any integer from 1 to D−1. In other words, quantities of fields in different pieces of first information in the D−1 pieces of first information in the D pieces of first information are the same. However, generally, the same quantities of fields need to be greater than or equal to a largest value in $F_1$ to $F_{D-1}$. In this way, for each node, overheads of indication information of a quantity of fields in first information corresponding to the node, thereby reducing transmission overheads.

With reference to the thirteenth possible implementation, in a fifteenth possible implementation, the first information corresponding to the $d^{th}$ hop further includes seventh sub information, and the seventh sub information in the first information corresponding to the $d^{th}$ hop indicates a value of $B_d$. In this implementation, an end node of each hop can flexibly set a quantity of fields in corresponding first information.

Optionally, $B_d$ is a total quantity of data packets obtained by encoding to-be-encoded data packets by the end node of the $d^{th}$ hop, that is, $B_d$ is equal to $F_d$.

With reference to the twelfth possible implementation, in a sixteenth possible implementation, each of the $G_d$ pieces of first sub information includes identification information of a corresponding data packet in the $G_d$ data packets, and an index, in the preset encoding coefficient group set, of an encoding coefficient group indicated by each of the $G_d$ pieces of first sub information and the identification information of the corresponding data packet in the $G_d$ data packets satisfy a fifth preset relationship.

When indication overheads of identification information of a data packet are less than indication overheads of an encoding coefficient group corresponding to the data packet, the encoding coefficient group corresponding to the data packet is indicated by using the identification information of the data packet, to reduce indication overheads and reduce transmission overheads.

With reference to the sixteenth possible implementation, in a seventeenth possible implementation, the first information corresponding to the $d^{th}$ hop further includes eighth sub information, and the eighth sub information in the first information corresponding to the $d^{th}$ hop indicates a value of $G_d$. In this implementation, the subsequent communication node can accurately obtain a quantity of to-be-encoded data packets of an end node of each hop, so that identification information of the to-be-encoded data packets of the end node of each hop can be accurately obtained from a plurality of pieces of first information.

With reference to any one of the twelfth to the seventeenth possible implementations, in an eighteenth possible implementation, the first information corresponding to the $d^{th}$ hop further includes ninth sub information, and the ninth sub information in the first information corresponding to the $d^{th}$ hop indicates version information of the preset encoding coefficient group set used by the end node of the $d^{th}$ hop. In this implementation, a subsequent communication node can accurately obtain a preset encoding coefficient group set used by an end node of each hop, so that the subsequent communication node can accurately learn of an encoding coefficient group used by the end node of each hop for recoding.

With reference to the second aspect or any one of the foregoing possible implementations, in a nineteenth possible implementation, the method further includes: adding headers to the U data packets to obtain U encoded packets that are in a one-to-one correspondence with the U data packets, where a header of each of the U data packets carries the D+1 pieces of first information. Correspondingly, the sending D+1 pieces of first information and the U data packets includes: sending the U encoded packets.

With reference to the second aspect or any one of the foregoing possible implementations, in a twentieth possible implementation, the method further includes: adding headers to the U data packets to obtain U encoded packets that are in a one-to-one correspondence with the U data packets, where a header of each of the U data packets carries second sub information corresponding to the data packet in the D+1 pieces of first information. Correspondingly, the sending D+1 pieces of first information and the U data packets includes: sending the U encoded packets, the D−1 pieces of first information, and the first information corresponding to the $D^{th}$ hop.

In this implementation, the D−1 pieces of first information are not carried in headers of the encoded packets, but are independently carried outside the encoded packets. In this way, when a plurality of encoded packets correspond to the D−1 same pieces of first information, only one of the D−1 pieces of first information may be sent, to reduce transmission overheads.

In this implementation, optionally, an encoded packet may be sent in a first protocol data unit (protocol data unit, PDU), and the D−1 pieces of first information may be sent in a second PDU. The first PDU and the second PDU may be a same PDU, or may be different PDUs.

With reference to the second aspect or any one of the foregoing possible implementations, in a twenty-first possible implementation, the method further includes: sending second information, where the second information indicates a value of D. In this implementation, the value of D is indicated, so that the subsequent communication node can accurately learn of a quantity of pieces of first information, to accurately obtain the pieces of first information.

In this implementation, the value of D may be indicated by using a plurality of methods. For example, the second information directly includes the value of D, or includes a value in a mapping relationship with the value of D.

According to a third aspect, this application provides a communication method. The communication method includes receiving $G_D$ data packets and D pieces of first information from a first communication node. The first communication node is a start node of a $D^{th}$ hop in D hop transmission. In the D hop transmission, a start node of a first hop is configured to encode $G_0$ data packets and send encoded data packets. An end node of a $d^{th}$ hop is configured to encode $G_d$ data packets from a start node of a $d^{th}$ hop and send encoded data packets. The end node of the $d^{th}$ hop is a start node of a $(d+1)^{th}$ hop. The D pieces of first information include D−1 pieces of first information that are in a one-to-one correspondence with D−1 previous hops in the D hop transmission and first information corresponding to the $G_D$ data packets. First information corresponding to a $d^{th}$ hop in the D−1 hops includes $G_d$ pieces of first sub information. The $G_d$ pieces of first sub information are in a one-to-one correspondence with the $G_d$ to-be-encoded data packets of the end node of the $d^{th}$ hop. Each of the $G_d$ pieces of first sub information indicates an encoding coefficient group of a data packet corresponding to the first sub information in the $G_d$ data packets relative to a plurality of to-be-encoded data packets of the start node of the $d^{th}$ hop. The first information corresponding to the $G_D$ data packets includes $G_D$ pieces of second sub information. The $G_D$ pieces of second sub information are in a one-to-one correspondence with the $G_D$ data packets. Each of the $G_D$ pieces of second sub information indicates an encoding coefficient group of a data packet corresponding to the second sub information in the $G_D$ data packets relative to to-be-encoded data packets of the first communication node. Herein, $G_0$, $G_d$, and $G_D$ are all positive integers, D is an integer greater than 1, and d is selected from 1 to D−1.

The method may be performed by an end node of a second hop in a multi-hop scenario or any subsequent forwarding node or destination node. In the method in the third aspect, related content of the step of receiving the $G_D$ data packets and the D pieces of first information from the first communication node is similar to related content of the step of receiving the $G_D$ data packets and the D pieces of first information from the first communication node in the method provided in the second aspect. Details are not described herein again.

When the method is performed by the forwarding node, because the forwarding node that performs the method receives encoded data packets of an end node of a previous hop and encoding coefficient groups corresponding to to-be-encoded data packets of an end node of each previous hop relative to the to-be-encoded data packets of the end node of the previous hop, the forwarding node may send, to the subsequent communication node, the encoding coefficient groups corresponding to the to-be-encoded data packets of the end node of each hop relative to the to-be-encoded data packets of the end node of the previous hop. In this way, the subsequent node may learn of encoding coefficient groups used when received data packets are recoded at each previous hop, and therefore can obtain original data packets through decoding based on these encoding coefficient groups.

When the method is performed by the destination node, because the forwarding node, that is, the destination node, that performs the method receives encoded data packets of an end node of a previous hop and encoding coefficient groups corresponding to to-be-encoded data packets of an end node of each previous hop relative to the to-be-encoded data packets of the end node of each previous hop's previous node, the destination node may learn of the encoding coefficient groups used when the received data packets are recoded at each previous hop, and therefore can obtain original data packets by decoding the received data packets based on these encoding coefficient groups.

In this method, an example in which D−1 previous hops in the D hop transmission are in a one-to-one correspondence with D−1 pieces of first information in the D pieces of first information is as follows: A $d^{th}$ piece of first information in the D pieces of first information corresponds to a $d^{th}$ hop in the D hop transmission, where d takes no value when D is 1, and d is selected from 1 to D−1 when D is greater than 1. In this case, first information corresponding to a $d^{th}$ hop in the D−1 hops is a $d^{th}$ piece of first information in the D pieces of first information, and the first information corresponding to the $G_D$ data packets is a $D^{th}$ piece of first information in the D pieces of first information.

It may be understood that the correspondence between the $d^{th}$ piece of first information in the D pieces of first information and the $d^{th}$ hop in the D hop transmission is merely an example of the one-to-one correspondence between the D−1 previous hops and the D−1 pieces of first information. In this method, the correspondence between each of the D−1 previous hops and the first information in the D−1 pieces of first information may be determined in another manner, provided that a location or sequence of the first information corresponding to the $d^{th}$ hop in the D pieces of first information and a value of d satisfy the preset relationship.

In this method, an example in which the $G_D$ pieces of second sub information are in a one-to-one correspondence with the $G_D$ data packets is as follows: A $g^{th}$ piece of second sub information in the $G_D$ pieces of second sub information corresponds to a $g^{th}$ data packet in the $G_D$ data packets, where g is an integer and is selected from 1 to $G_D$. In this case, the $g^{th}$ piece of second sub information in the $G_D$ pieces of second sub information indicates an encoding coefficient group of the $g^{th}$ data packet in the $G_D$ data packets relative to the to-be-encoded data packets of the first communication node.

It may be understood that the correspondence between the $g^{th}$ piece of second sub information in the $G_D$ pieces of second sub information and the $g^{th}$ data packet in the $G_D$ data packets is merely an example of the one-to-one correspondence between the $G_D$ pieces of second sub information and the $G_D$ data packets. In this method, a correspondence between second sub information in the $G_D$ pieces of second sub information and a data packet in the $G_D$ data packets may be determined in another manner, provided that a location or sequence of each of the $G_D$ pieces of second sub information in the $G_D$ pieces of second sub information and a location or sequence of a data packet corresponding to the second sub information in the $G_D$ data packets satisfy a preset relationship. The preset relationship may be pre-agreed on by the first communication node and a current node, or may be indicated by the first communication node to a current node.

With reference to the third aspect, in a first possible implementation, the method further includes: decoding the $G_D$ data packets based on the D pieces of first information to obtain K data packets. Generally, $G_D$ is greater than or equal to K.

Optionally, the $G_0$ data packets are original data packets, and the K data packets obtained through decoding include the $G_0$ data packets. In this case, the K data packets and the $G_D$ data packets satisfy the following relational expression:

$$[Y_1 \ \dots \ Y_k \ \dots \ Y_K] = [R_1 \ \dots \ R_g \ \dots \ R_{G_D}][L_1 \ \dots \ L_d \ \dots \ L_{D-1} \ L]^{-1}.$$

Herein, $Y_k$ represents a $k^{th}$ data packet in the K data packets, $R_g$ represents a $g^{th}$ data packet in the $G_D$ data packets, $L_d$ represents a matrix in which $G_d$ encoding coefficient groups indicated by the $G_d$ pieces of first sub information are $G_d$ column vectors, L represents a matrix in which $G_D$ encoding coefficient groups indicated by the $G_D$ pieces of second sub information are $G_D$ column vectors, $[L_1 \ldots L_d \ldots L_{D-1}L]^{-1}$ represents an inverse matrix of a matrix obtained by multiplying a matrix $L_1$ to a matrix $L_{D-1}$ by a matrix L, and k is an integer and is selected from 1 to K.

Optionally, the $G_0$ data packets are not original data packets, that is, all or some encoded data packets sent by another node to the start node of the first hop after the original data packets are encoded. In this case, a start node of each hop further needs to send encoding coefficient groups of the $G_0$ data packets relative to the original data packets to an end node.

It may be understood that a location or sequence of the $k^{th}$ data packet in the K data packets is not limited to k, provided that the location or sequence of the $k^{th}$ data packet in the K data packets and a value of k satisfy a preset relationship.

With reference to the third aspect or the first possible implementation, in a second possible implementation, the encoding coefficient group indicated by each of the $G_D$ pieces of second sub information is an encoding coefficient group in a first preset encoding coefficient group set. In this way, linear correlation between the $G_D$ encoding coefficient groups indicated by the $G_D$ pieces of second sub information can be reduced.

With reference to the second possible implementation, in a third possible implementation, each of the $G_D$ pieces of second sub information includes an index, in the first preset encoding coefficient group set, of an encoding coefficient group of a corresponding data packet in the $G_D$ data packets relative to the to-be-encoded data packets of the first communication node.

In comparison with another method of indicating the $G_D$ encoding coefficient groups or $G_D$ packet identifiers corresponding to the $G_D$ data packets, transmission overheads can be reduced in this implementation.

For example, the $g^{th}$ piece of second sub information in the $G_D$ pieces of second sub information corresponds to the $g^{th}$ data packet in the $G_D$ data packets. The $g^{th}$ piece of second sub information in the $G_D$ pieces of second sub information includes an index, in the first preset encoding coefficient group set, of an encoding coefficient group of the $g^{th}$ data packet relative to the to-be-encoded data packets of the first communication node.

With reference to the second possible implementation, in a fourth possible implementation, each of the $G_D$ pieces of second sub information includes identification information of a corresponding data packet in the $G_D$ data packets, and the identification information of the corresponding data packet in the $G_D$ data packets and an index, in the first preset encoding coefficient group set, of the encoding coefficient group indicated by each piece of second sub information satisfy a first preset relationship.

In comparison with another method of indicating the $G_D$ encoding coefficient groups corresponding to the $G_D$ data packets, transmission overheads can be reduced in this implementation.

For example, the $g^{th}$ piece of second sub information in the $G_D$ pieces of second sub information corresponds to the $g^{th}$ data packet in the $G_D$ data packets. The $g^{th}$ piece of second sub information in the $G_D$ pieces of second sub information includes identification information of the $g^{th}$ data packet. The identification information of the $g^{th}$ data packet and an index, in the first preset encoding coefficient group set, of an encoding coefficient group indicated by the $g^{th}$ piece of second sub information satisfy the first preset relationship.

In an example, the identification information of the $g^{th}$ data packet is an index of the data packet in $F_g$ data packets, and the $F_g$ data packets may be a plurality of data packets obtained through encoding of a same encoding block or a same sliding window. Herein, $F_g$ is a positive integer.

With reference to the third aspect or any one of the foregoing possible implementations, in a fifth possible implementation, the first information corresponding to the $G_D$ data packets further includes third sub information, and the third sub information indicates version information of the first preset encoding coefficient group set.

In this implementation, different communication nodes in a multi-hop scenario may use different preset encoding coefficient group sets, so that networking flexibility of a wireless communication network in the multi-hop scenario can be improved.

With reference to the third aspect or any one of the foregoing possible implementations, in a sixth possible implementation, the end node of the $d^{th}$ hop encodes the $G_d$ data packets from the start node of the $d^{th}$ hop by using encoding coefficient groups in a preset encoding coefficient group set.

In this way, linear correlation between encoding coefficient groups used for encoding the $G_d$ data packets can be reduced.

With reference to the sixth possible implementation, in a seventh possible implementation, the first information corresponding to the $d^{th}$ hop includes $B_d$ fields. The $G_d$ pieces of first sub information in the first information corresponding to the $d^{th}$ hop are in a one-to-one correspondence with $G_d$ fields in the $B_d$ fields. An index, in the preset encoding coefficient group set used by the end node of the $d^{th}$ node, of an encoding coefficient group indicated by each of the $G_d$ pieces of first sub information and a location, in the $B_d$ fields, of a corresponding field in the $B_d$ fields satisfy a second preset relationship. A value of each of the $G_d$ fields is a first preset value. A value of any field other than the $G_d$ fields in the $B_d$ fields is a second preset value. Herein, $B_d$ is an integer greater than or equal to $G_d$.

In comparison with another method of indicating the $G_d$ encoding coefficient groups corresponding to the $G_d$ to-be-encoded data packets of the $d^{th}$ hop, transmission overheads can be reduced in this implementation.

With reference to the seventh possible implementation, in an eighth possible implementation, $B_{b1}=B_{b2}$, b1 is any integer from 1 to D−1, and b2 is any integer from 1 to D−1.

With reference to the seventh possible implementation, in a ninth possible implementation, the first information corresponding to the $d^{th}$ hop further includes fourth sub information, and the fourth sub information in the first information corresponding to the $d^{th}$ hop indicates a value of $B_d$. In this implementation, an end node of any hop can flexibly set a total quantity of fields.

Optionally, $B_d$ is a total quantity of data packets obtained by encoding to-be-encoded data packets by the end node of the $d^{th}$ hop.

With reference to the sixth possible implementation, in a tenth possible implementation, each of the $G_d$ pieces of first sub information includes identification information of a corresponding data packet in the $G_d$ data packets, and an index, in the preset encoding coefficient group set, of an encoding coefficient group indicated by each of the $G_d$ pieces of first sub information and the identification information of the corresponding data packet in the $G_d$ data packets satisfy a third preset relationship.

In comparison with another method of indicating the $G_d$ encoding coefficient groups corresponding to the $G_d$ to-be-encoded data packets of the $d^{th}$ hop, transmission overheads can be reduced in this implementation.

With reference to the tenth possible implementation, in an eleventh possible implementation, the first information corresponding to the $d^{th}$ hop further includes fifth sub information, and the fifth sub information in the $d^{th}$ piece of first information indicates a value of $G_d$.

In this implementation, the subsequent node can accurately learn of a quantity of pieces of identification information in the first information corresponding to each hop, and finally can learn of an encoding coefficient group corresponding to each data packet.

With reference to the third aspect or any one of the foregoing possible implementations, in a twelfth possible implementation, the first information corresponding to the $d^{th}$ hop further includes sixth sub information, and the sixth sub information in the first information corresponding to the $d^{th}$ hop indicates version information of the preset encoding coefficient group set used by the end node of the $d^{th}$ hop.

With reference to the third aspect or any one of the foregoing possible implementations, in a thirteenth possible implementation, the receiving $G_D$ data packets and D pieces of first information from a first communication node includes: receiving $G_D$ encoded packets, where the $G_D$ encoded packets are in a one-to-one correspondence with the $G_D$ data packets, and each of the $G_D$ encoded packets includes a corresponding data packet in the $G_D$ data packets and the D pieces of first information.

For example, the $g^{th}$ encoded packet in the $G_D$ encoded packets corresponds to the $g^{th}$ data packet in the $G_D$ data packets, and the $g^{th}$ piece of second sub information in the $G_D$ pieces of second sub information corresponds to the $g^{th}$ data packet in the $G_D$ data packets. A data packet included in the $g^{th}$ encoded packet in the $G_D$ encoded packets is the $g^{th}$ data packet in the $G_D$ data packets. A header of the $g^{th}$ encoded packet in the $G_D$ encoded packets includes the D pieces of first information.

With reference to the third aspect or any one of the first to the twelfth possible implementations, in a fourteenth possible implementation, the receiving $G_D$ data packets and D pieces of first information from a first communication node includes: receiving the $G_D$ encoded packets and the D−1 pieces of first information, where the $G_D$ encoded packets are in a one-to-one correspondence with the $G_D$ data packets, and each of the $G_D$ encoded packets includes a corresponding data packet in the $G_D$ data packets and second sub information that corresponds to the corresponding data packet and that is in the first information corresponding to the $G_D$ data packets.

In this implementation, the D pieces of first information are not carried in headers of the encoded packets, but are independently carried outside the encoded packets. In this way, when a plurality of encoded packets correspond to the D same pieces of first information, only one of the D pieces of first information may be sent, to reduce transmission overheads.

For example, the $g^{th}$ encoded packet in the $G_D$ encoded packets corresponds to the $g^{th}$ data packet in the $G_D$ data packets, and the $g^{th}$ piece of second sub information in the $G_D$ pieces of second sub information corresponds to the $g^{th}$ data packet in the $G_D$ data packets. A data packet included in the $g^{th}$ encoded packet in the $G_D$ encoded packets is the $g^{th}$ data packet in the $G_D$ data packets. A header of the $g^{th}$ encoded packet in the $G_D$ encoded packets carries the $g^{th}$ piece of second sub information in the $D^{th}$ piece of first information.

With reference to the third aspect or any one of the foregoing possible implementations, in a fifteenth possible implementation, the method further includes: receiving second information, where the second information indicates a value of D−1.

In this implementation, the value of D−1 is indicated, so that the subsequent communication node can accurately learn of a quantity of pieces of first information, to accurately obtain the pieces of first information.

According to a fourth aspect, this application provides a communication apparatus. The apparatus may include functional modules configured to implement the method in the first aspect. For example, the apparatus includes a receiving module, an encoding module, and a sending module. For effects that can be obtained by the apparatus, refer to the descriptions in the first aspect. Details are not described herein again.

The receiving module may receive T data packets and T pieces of first information. The T data packets are in a one-to-one correspondence with the T pieces of first information. Each of the T pieces of first information indicates an encoding coefficient group of a data packet corresponding to the first information in the T data packets relative to K to-be-encoded data packets. Herein, K is a positive integer greater than 1, and T is an integer greater than or equal to K.

The encoding module may obtain E first encoding coefficient groups, where each of the E first encoding coefficient groups includes K encoding coefficients; and determine E second encoding coefficient groups based on the E first encoding coefficient groups and T encoding coefficient groups indicated by the T pieces of first information. Herein, the E second encoding coefficient groups, the E first encoding coefficient groups, and the T encoding coefficient groups satisfy the following relationship:

$$[f_1 \ \ldots \ f_e \ \ldots \ f_E]=[l_1 \ \ldots \ l_k \ \ldots \ l_K]^{-1}[h_1 \ \ldots \ h_e \ \ldots \ h_E].$$

Herein, $l_k$ represents a $k^{th}$ encoding coefficient group in K encoding coefficient groups in the T encoding coefficient groups, $h_e$ represents an $e^{th}$ first encoding coefficient group in the E first encoding coefficient groups, $[l_1 \ldots l_k \ldots l_K]^{-1}$ represents an inverse matrix of a matrix in which K encoding coefficient groups from $l_1$ to $l_K$ are K column vectors, $f_e$ represents an $e^{th}$ second encoding coefficient group in the E second encoding coefficient groups, k is an integer and is sequentially selected from 1 to K, and e is an integer and is sequentially selected from 1 to E.

The encoding module may further encode K data packets in the T data packets based on the E second encoding coefficient groups to obtain E target data packets. The K data packets are in a one-to-one correspondence with the K encoding coefficient groups. The E target data packets, the E second encoding coefficient groups, and the T data packets satisfy the following relational expression:

$$[Y_1 \ \ldots \ Y_e \ \ldots \ Y_E] = [R_1 \ \ldots \ R_k \ \ldots \ R_K][f_1 \ \ldots \ f_e \ \ldots \ f_E].$$

Herein, $Y_e$ represents an $e^{th}$ target data packet in the E target data packets, and $R_k$ represents a $k^{th}$ data packet in the K data packets.

The sending module may send the E target data packets and E pieces of second information that are in a one-to-one correspondence with the E target data packets. Each of the E pieces of second information includes first sub information indicating a first encoding coefficient group that is of a target data packet corresponding to the second information and that is in the E first encoding coefficient groups. The first encoding coefficient group is an encoding coefficient group of the target data packet relative to the K to-be-encoded data packets.

In some implementations, these modules may be implemented by using software and/or hardware. For example, the encoding module may be implemented by a processor by executing program code stored in a memory, and the receiving module and the sending module may be implemented by a transceiver. In this implementation, the apparatus may include the processor and the transceiver, and optionally, may further include the memory.

According to a fifth aspect, this application provides a communication apparatus. The apparatus may include functional modules configured to implement the method in the second aspect. For example, the apparatus includes a receiving module, an encoding module, and a sending module. For effects that can be obtained by the apparatus, refer to the descriptions in the second aspect. Details are not described herein again.

The receiving module is configured to receive $G_D$ data packets and D pieces of first information from a first communication node. The first communication node is a start node of a $D^{th}$ hop in D hop transmission. In the D hop transmission, a start node of a first hop is configured to encode $G_0$ data packets and send encoded data packets. An end node of a $d^{th}$ hop is configured to encode $G_d$ data packets from a start node of a $d^{th}$ hop and send encoded data packets. The end node of the $d^{th}$ hop is a start node of a $(d+1)^{th}$ hop. The D pieces of first information include D−1 pieces of first information that are in a one-to-one correspondence with D−1 previous hops in the D hop transmission and first information corresponding to the $G_D$ data packets. First information corresponding to a $d^1$ hop in the D−1 hops includes $G_d$ pieces of first sub information. The $G_d$ pieces of first sub information are in a one-to-one correspondence with the $G_d$ to-be-encoded data packets of the end node of the $d^{th}$ hop. Each of the $G_d$ pieces of first sub information indicates an encoding coefficient group of a data packet corresponding to the first sub information in the $G_d$ data packets relative to a plurality of to-be-encoded data packets of the start node of the $d^{th}$ hop. The first information corresponding to the $G_D$ data packets includes $G_D$ pieces of second sub information. The $G_D$ pieces of second sub information are in a one-to-one correspondence with the $G_D$ data packets. Each of the $G_D$ pieces of second sub information indicates an encoding coefficient group of a data packet corresponding to the second sub information in the $G_D$ data packets relative to to-be-encoded data packets of the first communication node. Herein, $G_0$, $G_d$, $G_D$, and D are all positive integers, d takes no value when D is 1, and d is selected from 1 to D−1 when D is greater than 1.

The encoding module is configured to encode the $G_D$ data packets by using U encoding coefficient groups to obtain U data packets. Each of the U encoding coefficient groups includes $G_D$ encoding coefficients. The U data packets are in a one-to-one correspondence with the U encoding coefficient groups. Herein, U is a positive integer.

The sending module is configured to send D+1 pieces of first information and the U data packets. The D+1 pieces of first information include the D−1 pieces of first information, first information corresponding to the D t hop, and first information corresponding to the U data packets. First information corresponding to the $D^{th}$ hop includes $G_D$ pieces of first sub information. The $G_D$ pieces of first sub information are in a one-to-one correspondence with the $G_D$ data packets. Each of the $G_D$ pieces of first sub information indicates an encoding coefficient group of a corresponding data packet in the $G_D$ data packets relative to the to-be-encoded data packets of the first communication node. The first information corresponding to the U data packets includes U pieces of second sub information that are in a one-to-one correspondence with the U encoding coefficient groups. Each of the U pieces of second sub information indicates a corresponding encoding coefficient group in the U encoding coefficient groups.

Optionally, the apparatus may further include a header processing module. The header processing module is configured to: add headers to the U data packets to obtain U encoded packets that are in a one-to-one correspondence with the U data packets, where a header of each of the U data packets carries the D+1 pieces of first information; or add headers to the U data packets to obtain U encoded packets that are in a one-to-one correspondence with the U data packets, where a header of each of the U data packets carries second sub information corresponding to the data packet in the D+1 pieces of first information.

In some implementations, these modules may be implemented by using software and/or hardware. For example, the encoding module and the header processing module may be implemented by an encoding circuit or by a processor by executing program code in a memory, and the receiving module and the sending module may be implemented by a transceiver. In this implementation, the apparatus may include the processor and the transceiver, and optionally, may further include the memory.

According to a sixth aspect, this application provides a communication apparatus. The apparatus may include functional modules configured to implement the method in the third aspect. For example, the apparatus includes a receiving module; and optionally, may further include a decoding module. For effects that can be obtained by the apparatus, refer to the descriptions in the third aspect. Details are not described herein again.

The receiving module is configured to receive $G_D$ data packets and D pieces of first information from a first communication node. The first communication node is a start node of a $D^{th}$ hop in D hop transmission. In the D hop transmission, a start node of a first hop is configured to encode $G_0$ data packets and send encoded data packets. An end node of a $d^{th}$ hop is configured to encode $G_d$ data packets from a start node of a $d^{th}$ hop and send encoded data packets. The end node of the $d^{th}$ hop is a start node of a $(d+1)^{th}$ hop. The D pieces of first information include D−1 pieces of first information that are in a one-to-one correspondence with D−1 previous hops in the D hop transmission and first information corresponding to the $G_D$ data packets. First information corresponding to a $d^{th}$ hop in the D−1 hops includes $G_d$ pieces of first sub information. The $G_d$ pieces of first sub information are in a one-to-one correspondence with the $G_d$ to-be-encoded data packets of the end node of the $d^{th}$ hop. Each of the $G_d$ pieces of first sub information indicates an encoding coefficient group of a data packet corresponding to the first sub information in the $G_d$ data packets relative to a plurality of to-be-encoded data packets of the start node of the $d^{th}$ hop. The first information corresponding to the $G_D$ data packets includes $G_D$ pieces of second sub information. The $G_D$ pieces of second sub information are in a one-to-one correspondence with the $G_D$ data packets. Each of the $G_D$ pieces of second sub information indicates an encoding coefficient group of a data packet corresponding to the second sub information in the $G_D$ data packets relative to to-be-encoded data packets of the first communication node. Herein, $G_0$, $G_d$, and $G_D$ are all positive integers, D is an integer greater than 1, and d is selected from 1 to D−1.

The decoding module may be configured to decode the $G_D$ data packets based on the D pieces of first information to obtain K data packets.

In some implementations, these modules may be implemented by using software and/or hardware. For example, the decoding module may be implemented by a decoding circuit or by a processor by executing program code stored in a memory, and the receiving module may be implemented by a transceiver. In this implementation, the apparatus may include the processor and a transceiver, and optionally, may further include the memory.

It may be understood that the communication apparatus provided in one or more of the fourth aspect, the fifth aspect, and the sixth aspect may be a chip system.

According to a seventh aspect, this application provides a computer-readable storage medium. The computer-readable storage medium stores program code to be executed by a communication apparatus. The program code includes instructions used to implement the method in the first aspect, the second aspect, or the third aspect.

According to an eighth aspect, this application provides a computer program product including instructions. When the computer program product is run on a communication apparatus, the communication apparatus is enabled to implement the method in the first aspect, the second aspect, or the third aspect.

According to a ninth aspect, this application provides a communication system that may include the communication apparatus provided in one or more of the fourth aspect, the fifth aspect, and the sixth aspect.

BRIEF DESCRIPTION OF DRAWINGS

FIG. 6 is a diagram of another example structure of information sent by a node D according to Embodiment 1 of this application;

FIG. 7 is a diagram of still another example structure of information sent by a node D according to Embodiment 1 of this application;

FIG. 12 is a flowchart of a first example of a communication method according to Embodiment 2 of this application;

DESCRIPTION OF EMBODIMENTS

Technical solutions in embodiments of this application are described below with reference to the accompanying drawings in embodiments of this application.

For ease of describing the technical solutions in embodiments of this application clearly, in embodiments of this application, words such as "first" and "second" are used for distinguishing between same or similar items with a basically same function and role. For example, first information and second information are merely used to distinguish between different information, and do not limit a sequence of the first information and the second information. A person skilled in the art may understand that the words such as "first" and "second" do not limit a quantity and an execution sequence, and the words such as "first" and "second" unnecessarily define a difference.

In embodiments of this application, "at least one" means one or more, and "a plurality of" means two or more. "And/or" describes an association relationship between associated objects, and indicates that three relationships may exist. For example, A and/or B may indicate the following cases: Only A exists, both A and B exist, and only B exists, where A and B may be singular or plural. The character "/"

generally indicates that the associated objects are in an "or" relationship. "At least one of the following items (pieces)" or a similar expression thereof indicates any combination of these items, including a single item (piece) or any combination of a plurality of items (pieces). For example, at least one of a, b, or c may represent: a, b, c; a and b; a and c; b and c; or a, b, and c, where a, b, and c each may be singular or plural.

For ease of understanding of a data transmission method provided in embodiments of this application, the following describes a system architecture and an application scenario of the data transmission method provided in embodiments of this application. It may be understood that the system architecture and the application scenario described in embodiments of this application are intended to describe the technical solutions in embodiments of this application more clearly, and do not constitute limitation on the technical solutions provided in embodiments of this application.

Figures 1, 2:
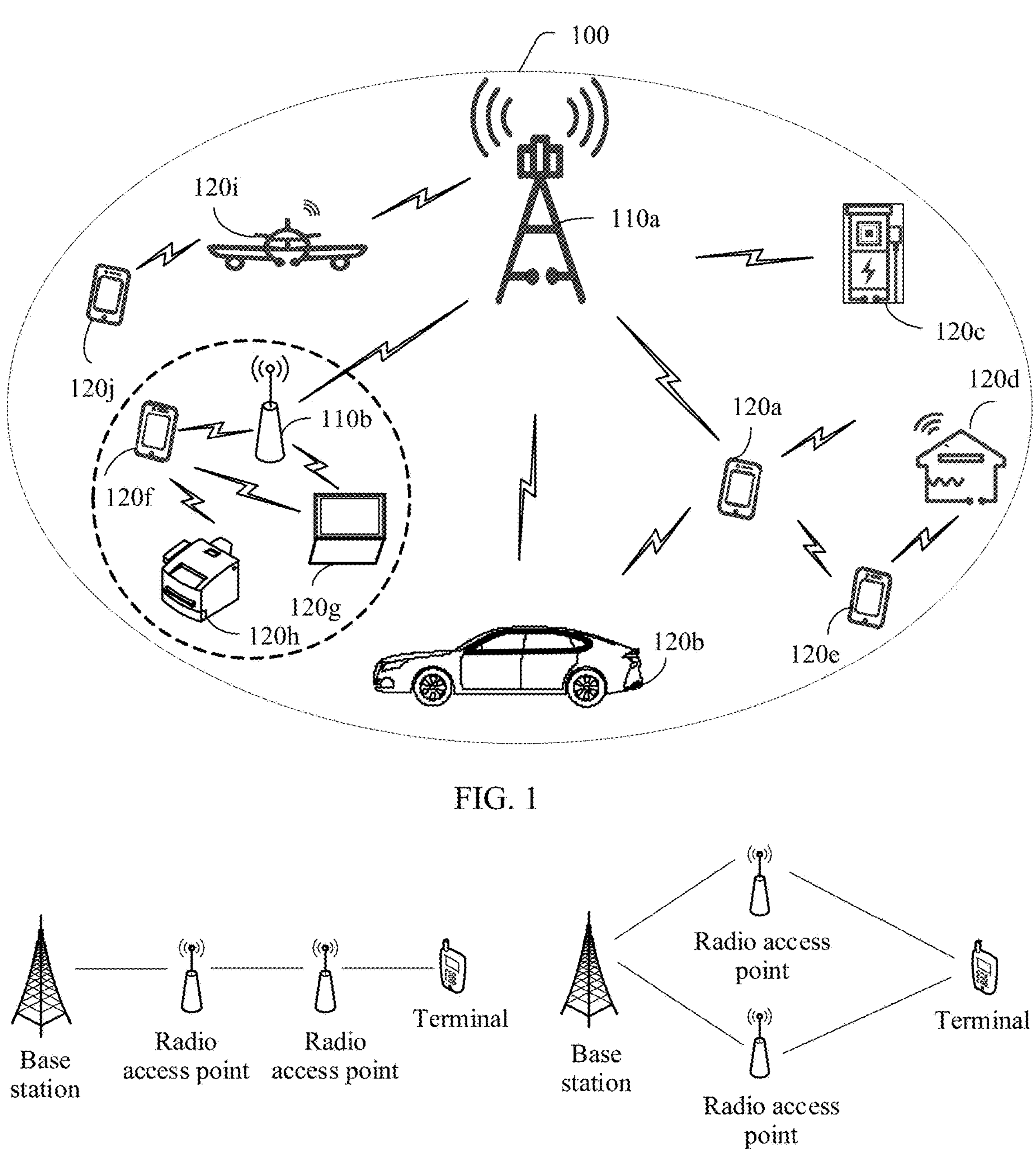
FIG. 1 is a diagram of an example structure of a communication system according to an embodiment of this application.
FIG. 2 is a diagram of example structures of application scenarios according to an embodiment of this application.

FIG. 1 is a schematic diagram of an architecture of a communication system to which an embodiment of this application is applied. As shown in FIG. 1, the communication system includes a radio access network 100. The radio access network 100 may include at least one radio access network device (for example, 110*a* and 110*b* in FIG. 1), and may further include at least one terminal (for example, 120*a* to 120*j* in FIG. 1).

The terminal is connected to the radio access network device in a wireless manner, and the radio access network device is connected to the core network device in a wireless or wired manner. A core network device and the radio access network device may be independent and different physical devices. Alternatively, functions of a core network device and a logical function of the radio access network device are integrated into a same physical device. Alternatively, some functions of a core network device and some functions of the radio access network device are integrated into one physical device. The terminals, and the radio access network devices may be connected to each other in a wired or wireless manner. FIG. 1 is merely a schematic diagram. The communication system may further include another network device, for example, may further include a wireless relay device and a wireless backhaul device, which are not shown in FIG. 1.

The radio access network (RAN) device may be a device having wireless sending and receiving functions. The radio access network device may be a device that provides a wireless communication function service, is usually located on a network side, and includes but is not limited to: a next generation nodeB (gNodeB, gNB) in a fifth generation (5G) communication system, a next generation nodeB in a sixth generation (6G) mobile communication system, a base station in a future mobile communication system, an access node in a Wi-Fi system, an evolved nodeB (eNB) in a long term evolution (LTE) system, a radio network controller (RNC), a nodeB (NB), a base station controller (base station controller, BSC), a home base station (for example, a home evolved NodeB, or a home NodeB, HNB), a baseband unit (BBU), a transmission and reception point (TRP), a transmitting point (TP), a base transceiver station (BTS), and the like. In a network structure, the access network device may include a central unit (CU) node, a distributed unit (DU) node, a RAN device including a CU node and a DU node, a control plane CU node, a user plane CU node, and a RAN device of a DU node. The access network device provides a service for a cell. A user equipment communicates with a base station on a transmission resource (for example, a frequency domain resource, namely, a frequency spectrum resource) used by the cell. The cell may be a cell corresponding to the base station (for example, a base station). The cell may belong to a macro base station, or a base station corresponding to a small cell. The small cell herein may include a metro cell, a micro cell, a pico cell, a femto cell, or the like. These small cells have features of small coverage and low transmit power, and are configured to provide a high-speed data transmission service. The radio access network device may be a macro base station (for example, 110*a* in FIG. 1), or may be a micro base station or an indoor station (for example, 110*b* in FIG. 1), or may be a relay node or a donor node, a device that provides a wireless communication service for the user equipment in a V2X communication system, a radio controller in a cloud radio access network (CRAN) scenario, a relay station, an in-vehicle device, a wearable device, a network device in a future evolved network, or the like. The access network device in this embodiment may also be an open radio access network (O-RAN) device. The O-RAN device may include an open distributed unit (0-DU) and an open central unit (0-CU).

A specific technology and a specific device form that are used by the radio access network device are not limited in embodiments of this application. For ease of description, the following provides description by using an example in which a base station serves as a radio access network device.

The terminal may also be referred to as a terminal device, a user equipment (UE), a mobile station (MS), a mobile terminal (MT), or the like; and may be an entity on a user side configured to receive or transmit a signal, for example, a mobile phone. The terminal device includes a handheld device, an in-vehicle device, a wearable device, or a computing device having a wireless communication function. For example, the UE may be a mobile phone, a tablet computer, or a computer having wireless sending and receiving functions. Alternatively, the terminal device may be a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in a smart city, a wireless terminal in a smart home, or the like. The terminal may be widely used in various scenarios such as device-to-device (D2D), vehicle-to-everything (V2X) communication, machine-type communication (MTC), Internet of things (IoT), virtual reality, augmented reality, industrial control, self-driving, remote medical, a smart grid, smart furniture, smart office, smart wearables, smart transportation, and a smart city. The terminal may be a mobile phone, a tablet computer, a computer with wireless sending and receiving functions, a wearable device, a vehicle, an uncrewed aerial vehicle, a helicopter, an airplane, a ship, a robot, a mechanical arm, a smart home device, or the like. In embodiments of this application, an apparatus configured to implement functions of the terminal may be a terminal, or may be an apparatus that can support the terminal in implementing functions, for example, a chip system, a communication module, or a modem. The apparatus may be installed in the terminal. In embodiments of this application, the chip system may include a chip, or may include a chip and another discrete device. In the technical solutions provided in embodiments of this application, the technical solutions provided in embodiments of this application are described by using an example in which the apparatus configured to implement the functions of the terminal is the terminal and the terminal is the UE. A specific technology and a specific device form that are used by the terminal device are not limited in embodiments of this application.

Optionally, the UE may serve as a base station. For example, the UE may serve as a scheduling entity that provides sidelink signals between UEs in vehicle-to-everything (V2X), device-to-device (D2D), peer-to-peer (P2P), or the like.

The base station and the terminal may be at fixed locations, or may be movable. The base station and the terminal may be deployed on land, including an indoor or outdoor device, a handheld device, or a vehicle-mounted device; or may be deployed on water; or may be deployed on an airplane, a balloon, or an artificial satellite in the air. Application scenarios of the base station and the terminal are not limited in embodiments of this application.

Roles of the base station and the terminal may be relative. For example, a helicopter or an uncrewed aerial vehicle 120*i* in FIG. 1 may be configured as a mobile base station. For a terminal 120*j* that accesses the radio access network 100 through 120*i*, the 120*i* is abase station. However, for a base station 110*a*, 120*i* is a terminal. In other words, 110*a* and 120*i* communicate with each other according to a radio air interface protocol. Certainly, 110*a* and 120*i* may also communicate with each other according to an interface protocol between base stations. In this case, relative to 110*a*, 120*i* is also abase station. Therefore, both the base station and the terminal may be collectively referred to as communication apparatuses. Herein, 110*a*, 110*b*, and 120*a*-120*j* in FIG. 1 may be referred to as communication apparatuses that have respective corresponding functions, for example, communication apparatuses having functions of the base station or communication apparatuses having functions of the terminal.

Communication between the base station and the terminal, between base stations, and between terminals may be performed by using a licensed spectrum, or may be performed by using an unlicensed spectrum, or may be performed by using both a licensed spectrum and an unlicensed spectrum. Communication may be performed by using a spectrum below 6 gigahertz (GHz), or may be performed by using a spectrum above 6 GHz, or may be performed by using a spectrum below 6 GHz and a spectrum above 6 GHz. A spectrum resource used for wireless communication is not limited in embodiments of this application.

In embodiments of this application, the functions of the base station may be performed by a module (for example, a chip) in the base station, or may be performed by a control subsystem having the functions of the base station. Herein, the control subsystem having the functions of the base station may be a control center in the foregoing application scenarios of the terminal, for example, a smart grid, industrial control, smart transportation, and a smart city. The functions of the terminal may be alternatively performed by a module (for example, a chip or a modem) in the terminal, or may be performed by an apparatus having the functions of the terminal.

Further, the technical solutions of this application may be applied to a plurality of specific communication scenarios, for example, multi-hop (for example, (a) and (b) in FIG. 2) transmission between the base station and the terminal. It should be noted that the foregoing specific communication application scenario is merely an example, and does not constitute a limitation.

From a perspective of a service, embodiments of this application are applicable to a plurality of service scenarios, for example, a data encoding scenario in an extended reality (XR) service and an uplink large-capacity scenario. In addition, FIG. 2 imposes no limitation on a network architecture applicable to this application, and transmission of an uplink, a downlink, an access link, a backhaul link, a sidelink, and the like is not limited in this application.

Figure 3:
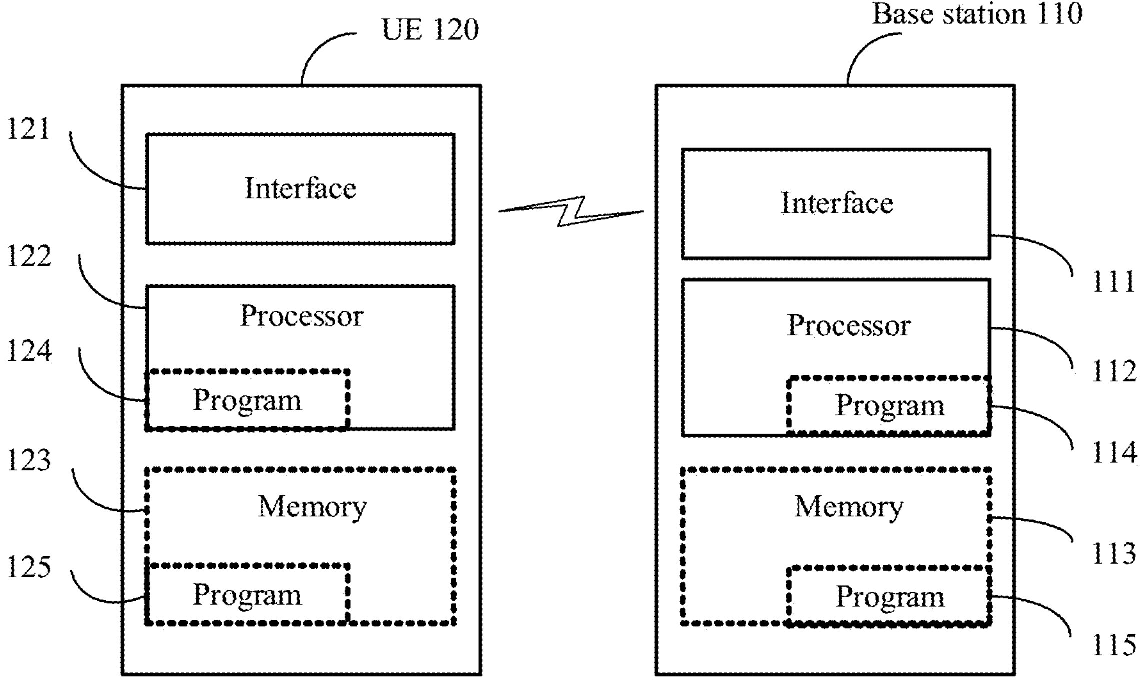
FIG. 3 is a diagram of a simplified structure of a communication system according to an embodiment of this application.

FIG. 3 is a simplified schematic diagram of a communication system according to an embodiment of this application. In the schematic diagram, an example in which a radio access network device is a base station and a terminal is a UE is used. For simplicity, FIG. 3 shows only the base station 110 and the UE 120. The base station 110 includes an interface 111 and a processor 112. Optionally, the processor 112 may store a program 114. Optionally, the base station 110 may include a memory 113. Optionally, the memory 113 may store a program 115. The UE 120 includes an interface 121 and a processor 122. Optionally, the processor 122 may store a program 124. Optionally, the UE 120 may include a memory 123. Optionally, the memory 123 may store a program 125. These components work together to provide functions described in this application. For example, the processor 112 and the interface 121 work together to provide a wireless connection between the base station 110 and the UE 120. The processor 122 and the interface 121 work together to implement downlink transmission and/or uplink transmission of the UE 120.

The processor (for example, the processor 112 and/or the processor 122) may include one or more processors and is implemented as a combination of computing devices. The processor (for example, the processor 112 and/or the processor 122) may separately include one or more of the following: a microprocessor, a microcontroller, a digital signal processor (DSP), a digital signal processing device (DSPD), an application-specific integrated circuit (ASIC), a field programmable gate array (FPGA), a programmable logic device (PLD), gating logic, transistor logic, a discrete hardware circuit, a processing circuit, other appropriate hardware, firmware, and/or a combination of hardware and software. The processor is configured to implement various functions described in this application. The processor (for example, the processor 112 and/or the processor 122) may be a general-purpose processor or a dedicated processor. For example, the processor 112 and/or the processor 122 may be a baseband processor or a central processing unit. The baseband processor may be configured to process a communication protocol and communication data. The central processing unit may be configured to enable the base station 110 and/or the UE 120 to execute a software program and process data in the software program.

The interface (for example, the interface 111 and/or 121) may be configured to implement communication with one or more computer devices. The computer device may include a UE, a base station (BS), and/or a network node. In some embodiments, the interface may include a wire for coupling a wired connection, or a pin for coupling a wireless transceiver, or a chip and/or a pin for a wireless connection. In some embodiments, the interface may include a transmitter, a receiver, a transceiver, and/or an antenna. The interface may be configured to use any available protocol (for example, a 3GPP standard).

The program in this application represents software in a broad sense. A non-restrictive example of the software is program code, a program, a subprogram, an instruction, an instruction set, code, a code segment, a software module, an application, or a software application. The program may be run in a processor and/or a computer, so that the base station 110 or the UE 120 or both perform various functions and/or processes described in this application.

The memory (for example, the memory 113 and/or the memory 123) may store data manipulated by the processors 112 and 122 when executing the software. The memories

113 and 123 may be implemented by using any storage technology. For example, the memory may be any available storage medium that can be accessed by the processor and/or the computer. A non-restrictive example of the storage medium includes: a RAM, a read-only memory (ROM), an electrically erasable programmable read-only memory (EEPROM), a compact disc read-only memory (CD-ROM), a removable medium, an optical disc memory, a magnetic disk storage medium, a magnetic storage device, a flash memory, a register, a state memory, a remotely mounted memory, a local or remote storage component, or any other medium that can carry or store software, data, or information and that can be accessed by a processor/computer.

The memory (for example, the memory 113 and/or the memory 123) and the processor (for example, the processor 112 and/or the processor 122) may be separately disposed or integrated. The memory may be configured to connect to the processor, so that the processor can read information from the memory and store and/or write information into the memory. The memory 113 may be integrated into the processor 112. The memory 123 may be integrated into the processor 122. The processor (for example, the processor 112 and/or the processor 122) and the memory (for example, the memory 113 and/or the memory 123) may be disposed in an integrated circuit (for example, the integrated circuit may be disposed in a UE, a base station, or another network node).

Figure 4A:
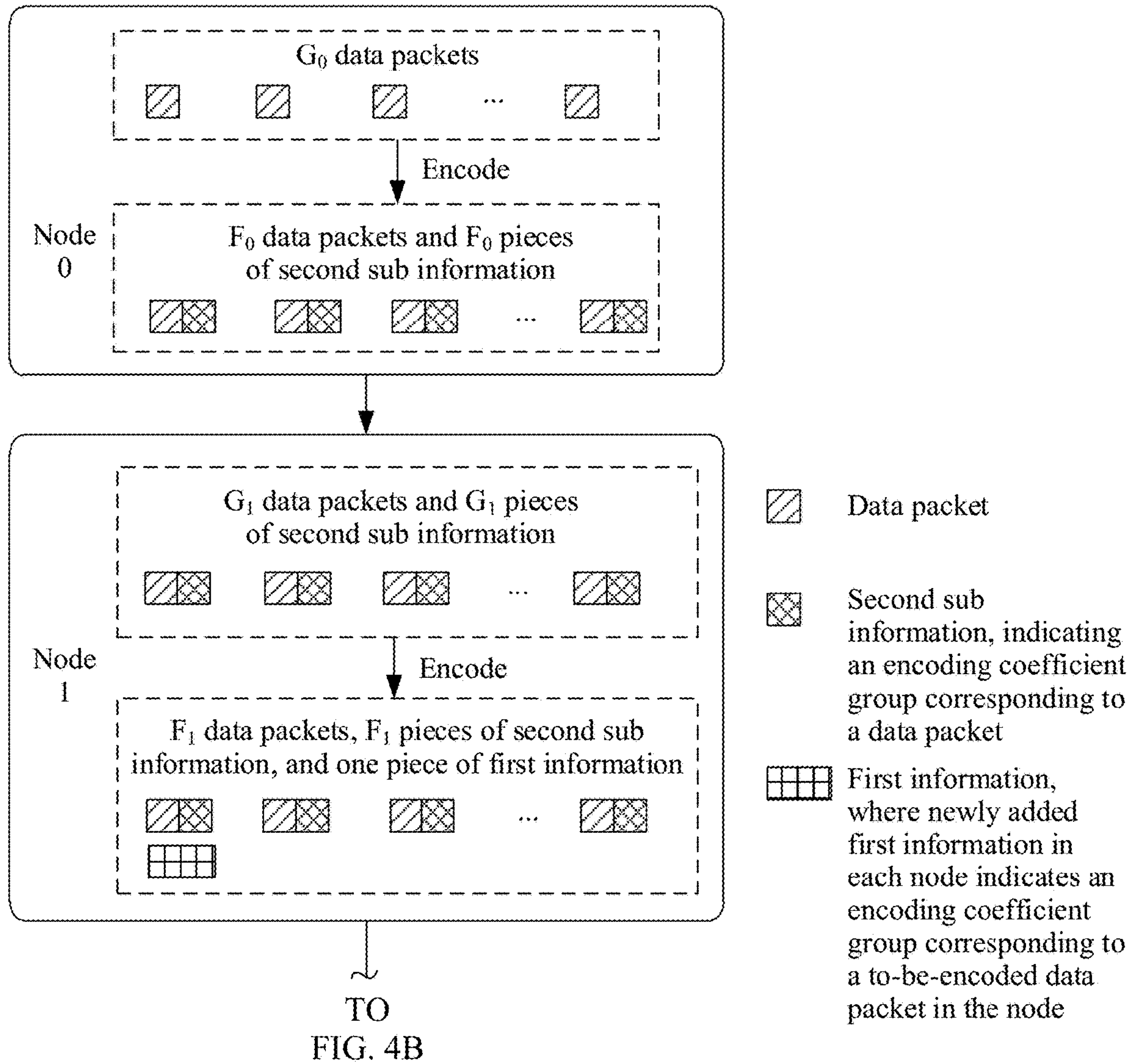
FIG. 4A and FIG. 4B are a flowchart of a first example of a communication method according to Embodiment 1 of this application.
Figures 4B, 5:
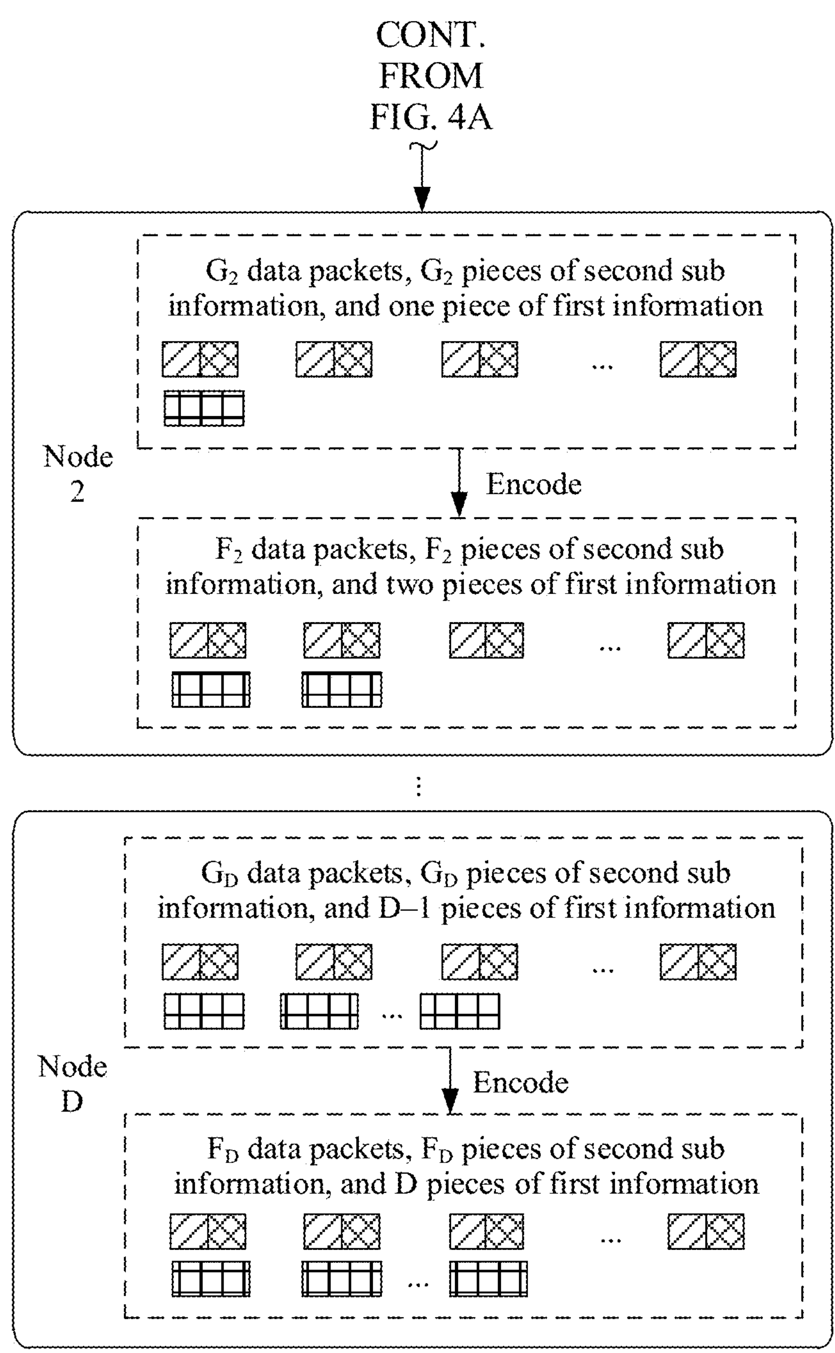
FIG. 5 is a diagram of an example structure of information sent by a node D according to Embodiment 1 of this application.

FIG. 4A and FIG. 4B are a flowchart of a first example of a communication method according to Embodiment 1 of this application. As shown in FIG. 4A and FIG. 4B, $G_0$ data packets are one encoding block. A node 0 performs network encoding on the $G_0$ data packets by using $F_1$ encoding coefficient groups, to obtain $F_1$ data packets. The $F_1$ data packets are in a one-to-one correspondence with the $F_1$ encoding coefficient groups. Each of the $F_1$ data packets is a data packet obtained by the node 0 by performing network encoding on the $G_0$ data packets by using a corresponding encoding coefficient group in the $F_1$ encoding coefficient groups. In other words, each of the $F_1$ encoding coefficient groups is an encoding coefficient group of a corresponding data packet relative to the $G_0$ to-be-encoded data packets. In an example, the $G_0$ data packets are original data packets, and the node 0 is a source node. In this embodiment, an encoding coefficient group of a data packet relative to the $G_0$ to-be-encoded data packets is referred to as an encoding coefficient group corresponding to the data packet.

The node 0 sends the $F_1$ data packets and first information corresponding to the $F_1$ data packets. The first information corresponding to the 1 data packets includes second sub information corresponding to each of the 17 data packets. The second sub information corresponding to each of the 17 data packets indicates an encoding coefficient group of the data packet relative to the $G_0$ to-be-encoded data packets. Further, the node 0 may further send encoding block indication information of each of the 1 data packets. The encoding block indication information of each of the 17 data packets indicates a block identifier (block ID) or a group identifier (group ID) of an encoding block to which the $G_0$ data packets belong. It may be understood that the encoding block indication information sent by a start node of each hop to an end node is optional in this embodiment. The encoding block indication information is used by the end node to identify specific data packets that are in the received data packets and that are obtained by encoding a same encoding block and sent. In this embodiment, the following is not limited: The start node of each hop does not definitely need to send the encoding block indication information to the end node. For example, when the end node does not need to identify whether the received data packets are obtained by encoding the same encoding block, for example, a small quantity of data packets are transmitted, and there is a specific time interval between transmission of different encoding blocks. Alternatively, when the end node may learn in another manner whether the received data packets are obtained by encoding the same encoding block, the start node of each hop may not need to send the encoding block indication information to the end node. For example, when a quantity of encoded packets included in an encoding block is fixed and a quantity of encoding coefficient groups that can be selected in an encoding coefficient group set is relatively large, based on the first information, that is, encoding coefficient group information, the end node of each hop may learn that the $F^1$ data packets belong to the same encoding block. For example, indexes of encoding coefficient groups of a previous encoding block in the encoding coefficient group set are 1 to 10, and indexes of encoding coefficient groups of a next encoding block in the encoding coefficient group set are 11 to 20. Specific data packets belonging to a same encoding block may be learned based on the encoding coefficient groups. Therefore, the encoding block indication information may be optional. In a possible implementation, each hop node may send encoding block indication information corresponding to a currently sent data packet.

A node 1 receives $G_1$ data packets and first information corresponding to the $G_1$ data packets from the node 0. The first information corresponding to the $G_1$ data packets includes second sub information corresponding to each of the $G_1$ data packets. Herein, $G_1$ is less than or equal to $F_1$. Transmission between the node 0 and the node 1 may be referred to as first-hop transmission of the $G_0$ data packets. The node 0 is referred to as a start node of the first-hop transmission. The node 1 is referred to as an end node of the first-hop transmission. Further, the node 1 may further receive encoding block indication information of each of the $G_1$ data packets sent by the node 0.

After receiving the $G_1$ data packets, the encoding block indication information of each of the $G_1$ data packets, and the first information corresponding to the $G_1$ data packets, the node 1 obtains the encoding block indication information of each of the $G_1$ data packets, to obtain $G_1$ pieces of encoding block indication information. The node 1 compares the $G_1$ pieces of encoding block indication information, to determine whether the $G_1$ data packets are data packets obtained by encoding a same encoding block. For example, when the $G_1$ pieces of encoding block indication information indicate block identifiers or group identifiers, it may be determined that the $G_1$ data packets are data packets obtained by encoding a same encoding block.

When the $G_1$ data packets are data packets obtained by encoding a same encoding block, the node 1 may use the $G_1$ data packets as one encoding block, and perform network encoding on the $G_1$ data packets by using $F_2$ encoding coefficient groups, to obtain $F_2$ data packets. The $F_2$ data packets are in a one-to-one correspondence with the $F_2$ encoding coefficient groups. Each of the $F_2$ data packets is a data packet obtained by the node 0 by performing network encoding on the $G_1$ data packets by using a corresponding encoding coefficient group in the $F_2$ encoding coefficient groups. In other words, each of the $F_2$ encoding coefficient groups is an encoding coefficient group of a corresponding data packet relative to the $G_1$ to-be-encoded data packets.

The node 1 sends the first information corresponding to the node 1 (that is, the first information corresponding to the $G_1$ data packets), the $F_2$ data packets, and the first information corresponding to the $F_2$ data packets. The first information corresponding to the $F_2$ data packets includes second sub information corresponding to each of the $F_2$ data packets. The second sub information corresponding to each of the $F_2$ data packets indicates an encoding coefficient group of the data packet relative to the $G_1$ to-be-encoded data packets. Further, the node 1 may further send encoding block indication information of each of the $F_2$ data packets. The encoding block indication information of each of the $F_2$ data packets indicates a block identifier or a group identifier of an encoding block to which the $G_1$ data packets obtained through encoding belong. The first information corresponding to the node 1 may include $G_1$ pieces of first sub information. The $G_1$ pieces of first sub information are in a one-to-one correspondence with $G_1$ pieces of second sub information corresponding to the $G_1$ data packets. Each of the $G_1$ pieces of first sub information is determined based on corresponding second sub information in the $G_1$ pieces of second sub information, and is the same as an encoding coefficient group indicated by the corresponding second sub information. In this embodiment, the first information corresponding to the node 1 may also be referred to as the first information corresponding to the $G_1$ data packets, or may be referred to as first information corresponding to a first hop.

A node 2 receives the first information corresponding to the node 1, $G_2$ data packets, and first information corresponding to the $G_2$ data packets from the node 1. The first information corresponding to the $G_2$ data packets includes second sub information corresponding to each of the $G_2$ data packets. Herein, $G_2$ is less than or equal to $F_2$. Transmission between the node 1 and the node 2 may be referred to as second-hop transmission of the $G_0$ data packets. The node 1 serves as the end node of the first-hop transmission, and is also referred to as a start node of the second-hop transmission. The node 2 is referred to as an end node of the second-hop transmission. Further, the node 2 may further receive encoding block indication information of each of the $G_2$ data packets sent by the node 1.

After receiving the first information corresponding to the node 1, the $G_2$ data packets, the encoding block indication information of each of the $G_2$ data packets, and the first information corresponding to the $G_2$ data packets, the node 2 obtains the encoding block indication information of each of the $G_2$ data packets, to obtain $G_2$ pieces of encoding block indication information. The node 2 compares the $G_2$ pieces of encoding block indication information, to determine whether the $G_2$ data packets are data packets obtained by encoding a same encoding block. For example, when the $G_2$ pieces of encoding block indication information indicate block identifiers or group identifiers, it may be determined that the $G_2$ data packets are data packets obtained by encoding a same encoding block.

When the $G_2$ data packets are data packets obtained by encoding a same encoding block, the node 2 may use the $G_2$ data packets as one encoding block, and perform network encoding on the $G_2$ data packets by using $F_3$ encoding coefficient groups, to obtain $F_3$ data packets. The $F_3$ data packets are in a one-to-one correspondence with the $F_3$ encoding coefficient groups. Each of the $F_3$ data packets is a data packet obtained by the node 2 by performing network encoding on the $G_2$ data packets by using a corresponding encoding coefficient group in the $F_3$ encoding coefficient groups. In other words, each of the $F_3$ encoding coefficient groups is an encoding coefficient group of a corresponding data packet relative to the $G_2$ to-be-encoded data packets.

The node 2 sends the first information corresponding to the node 1, the first information corresponding to the node 2 (that is, the first information corresponding to the $G_2$ data packets), the $F_3$ data packets, and the first information corresponding to the $F_3$ data packets. The first information corresponding to the $F_3$ data packets includes second sub information corresponding to each of the $F_3$ data packets. The second sub information corresponding to each of the $F_3$ data packets indicates an encoding coefficient group of the data packet relative to the $G_2$ to-be-encoded data packets. Further, the node 2 may further send encoding block indication information of each of the $F_3$ data packets. The encoding block indication information of each of the $F_3$ data packets indicates a block identifier or a group identifier of an encoding block to which the $G_2$ data packets obtained through encoding belong. The first information corresponding to the node 2 may include $G_2$ pieces of first sub information. The $G_2$ pieces of first sub information are in a one-to-one correspondence with $G_2$ pieces of second sub information corresponding to the $G_2$ data packets. Each of the $G_2$ pieces of first sub information may be determined based on corresponding second sub information in the $G_2$ pieces of second sub information, and is the same as an encoding coefficient group indicated by the corresponding second sub information. In this embodiment, the first information corresponding to the node 2 may also be referred to as the first information corresponding to the $G_2$ data packets, or may be referred to as first information corresponding to a second hop.

By analogy, when D is greater than 1, a node D in this embodiment receives first information corresponding to each of D−1 previous hops from anode D−1, $G_D$ data packets, and first information corresponding to the $G_D$ data packets. The first information corresponding to the $G_D$ data packets includes second sub information corresponding to each of the $G_D$ data packets. Herein, $G_D$ is less than or equal to $F_D$. The node D−1 serves as an end node of a $(D-1)^{th}$ hop, and also serves as a start node of a $D^{th}$ hop. The node D is an end node of a $D^{th}$ hop. Further, the node D may further receive encoding block indication information of each of the $G_D$ data packets from the node D−1.

First information corresponding to a $d^{th}$ hop in the D−1 previous hops includes $G_d$ pieces of first sub information. The $G_d$ pieces of first sub information are in a one-to-one correspondence with $G_d$ to-be-encoded data packets of an end node of a $d^{th}$ hop. Each of the $G_d$ pieces of first sub information indicates an encoding coefficient group of a corresponding data packet in the $G_d$ data packets relative to $G_{d-1}$ to-be-encoded data packets of a start node of a $d^{th}$ hop.

It may be understood that, when D is equal to 1, the node D is the node 1, the node D−1 is the node 0, and the node 0 does not send corresponding first information to indicate an encoding coefficient group of each of the $G_0$ data packets relative to any data packet. Therefore, the node 1 does not receive the corresponding first information from the node 0. In other words, when D is equal to 1, the node D does not receive the D−1 pieces of first information from the node D−1. In this case, there is no need to take a value for d. Therefore, d does not need to take a value.

After receiving the first information corresponding to each of the D−1 previous hops, the $G_D$ data packets, the encoding block indication information of each of the $G_D$ data packets, and the first information corresponding to the $G_D$ data packets, the node D obtains the encoding block indication information of each of the $G_D$ data packets, to obtain $G_D$ pieces of encoding block indication information. The node D compares the $G_D$ pieces of encoding block indication information, to determine whether the $G_D$ data packets are data packets obtained by encoding a same encoding block. For example, when the $G_D$ pieces of encoding block indication information indicate block identifiers or group identifiers, it may be determined that the $G_D$ data packets are data packets obtained by encoding a same encoding block.

When the $G_D$ data packets are data packets obtained by encoding a same encoding block and D is greater than 1, if the node D is not a destination node, for example, not a destination node of the $G_0$ data packets of the node 0, the node D may use the $G_D$ data packets as one encoding block, and perform network encoding on the $G_D$ data packets by using $F_D$ encoding coefficient groups, to obtain $F_D$ data packets. The $F_D$ data packets are in a one-to-one correspondence with the $F_D$ encoding coefficient groups. Each of the $F_3$ data packets is a data packet obtained by the node D by performing network encoding on the $G_D$ data packets by using a corresponding encoding coefficient group in the $F_3$ encoding coefficient groups. In other words, each of the $F_3$ encoding coefficient groups is an encoding coefficient group of a corresponding data packet relative to the $G_D$ to-be-encoded data packets.

The node D sends the first information corresponding to each of the D−1 previous hops, first information corresponding to the node D, the $F_D$ data packets, encoding block indication information of each of the $F_D$ data packets, and first information corresponding to the $F_D$ data packets. The first information corresponding to the $F_D$ data packets includes second sub information corresponding to each of the $F_D$ data packets. The second sub information corresponding to each of the $F_D$ data packets indicates an encoding coefficient group of the data packet relative to $G_D$ to-be-encoded data packets. Further, the node D may further send encoding block indication information of each of the $F_D$ data packets. The encoding block indication information of each of the $F_D$ data packets indicates a block identifier or a group identifier of an encoding block to which the $G_D$ data packets obtained through encoding belong. The first information corresponding to the node D may include $G_D$ pieces of first sub information. The $G_D$ pieces of first sub information are in a one-to-one correspondence with $G_D$ pieces of second sub information corresponding to the $G_D$ data packets. Each of the $G_D$ pieces of first sub information may be determined based on corresponding second sub information in the $G_D$ pieces of second sub information, and is the same as an encoding coefficient group indicated by the corresponding second sub information. In this embodiment, the first information corresponding to the node D may also be referred to as first information corresponding to the $D^{th}$ hop, or first information corresponding to the $G_D$ data packets.

The following describes an example implementation of network encoding of each node in this embodiment of this application by using an example in which the node D performs network encoding on the received $G_D$ data packets when being a non-destination node.

In an example, the node D may randomly generate encoding coefficient groups, and encode the $G_D$ data packets by using the randomly generated encoding coefficient groups. In this case, the second sub information that corresponds to each of the $F_3$ data packets and that is sent by the node D directly carries the encoding coefficient groups used in encoding the $G_D$ to-be-encoded data packets to obtain the data packets. In this embodiment, an encoding coefficient group used in encoding the $G_D$ to-be-encoded data packets to obtain one data packet may be referred to as an encoding coefficient group corresponding to the data packet.

In another example, the node D may encode the $G_D$ data packets by using encoding coefficient groups in the preset encoding coefficient group set. In this case, the second sub information that corresponds to each of the $F_3$ data packets and that is sent by the node D may indicate, in a plurality of manners, an encoding coefficient group corresponding to the data packet.

The following describes a first example preset encoding coefficient group set in this embodiment. In this example, a size of a finite field is GF(Q), and a value of Q may be $2^8$ or another value. A Vandermond (Vandermonde) matrix with the largest dimension on a finite field whose size is Q is a matrix $$\begin{bmatrix} a_1^0 & a_2^0 & \dots & a_q^0 \\ a_1^1 & a_2^1 & \dots & a_q^1 \\ \vdots & \vdots & \ddots & \vdots \\ a_1^{q-1} & a_2^{q-1} & \dots & a_q^{q-1} \end{bmatrix}$$

including q rows and q columns (where q=Q−1). For example, a largest Vandermonde matrix on a finite field whose size is $GF(2^8)$ is $$\begin{bmatrix} a_1^0 & a_2^0 & \dots & a_{255}^0 \\ a_1^1 & a_2^1 & \dots & a_{255}^1 \\ \vdots & \vdots & \ddots & \vdots \\ a_1^{254} & a_2^{254} & \dots & a_{255}^{254} \end{bmatrix},$$

where elements in $[a_1, a_2, \ldots, a_q]$ are taken from $GF(2^8)$ and are mutually different.

A Vandermonde matrix $$V_0 = \begin{bmatrix} a_1^0 & a_2^0 & \dots & a_{255}^0 \\ a_1^1 & a_2^1 & \dots & a_{255}^1 \\ \vdots & \vdots & \ddots & \vdots \\ a_1^{K-1} & a_2^{K-1} & \dots & a_{255}^{K-1} \end{bmatrix}$$

including K rows is determined based on a quantity K of to-be-encoded data packets and a group of parameters $[a_1, a_2, \ldots, a_q]$. Herein, $V_0$ may be represented in a form of $V_0=[V_1|V_2]$, $V_1$ is a submatrix including K rows and K columns in $V_0$, and $V_2$ is a submatrix including K rows and q-K columns in $V_0$. A combination of an identity matrix and a submatrix may be obtained by performing transform on $V_0$ by using an inverse matrix $$V_1^{-1} \text{ of } V_1.$$

In other words, a generator matrix $$V_1^{-1}V_0 = \left[I|V_1^{-1}V_2\right] = \left[I|G_0\right]$$

of systematic code may be obtained by left multiplying $$V_1^{-1} \text{ by } V_0.$$

An identity matrix I with dimensions of K×K corresponds to an encoding coefficient matrix of a system packet. A matrix $$G_0 = V_1^{-1}V_2 = [\,G_{0,0} \quad G_{0,1} \quad \dots \quad G_{0,q-K-1}]$$

including K rows and q-K columns corresponds to an encoding coefficient matrix of a check packet. q-K encoded packets may be generated by left multiplying a row vector including K to-be-encoded data packets by $G_0$. In other words, the encoding coefficient group set may be determined based on the quantity K of to-be-encoded data packets and the group of parameters $[a_1, a_2, \ldots, a_q]$ by using the foregoing method, or may be directly obtained in a system storage manner. For example, the encoding coefficient group set determined based on K and $[a_1, a_2, \ldots, a_q]$ may be represented in a form of a table. Table 1 or Table 2 is two examples of the encoding coefficient group set represented by using a table. In this embodiment, the preset encoding coefficient group set may also be referred to as a determined codebook, and an encoding coefficient vector including an encoding coefficient in a preset encoding coefficient group may be referred to as a codeword.

A determined codebook corresponding to Table 1 does not include a codeword corresponding to a system packet, and includes only a codeword corresponding to a check packet. Specifically, an encoding coefficient vector $$[g_{0,1} \quad g_{0,2} \quad \cdots \quad g_{0,K}]^T_{K\times1}$$

whose index is 0 may be $G_{0,0}$ in the foregoing matrix $G_0$. By analogy, $$[g_{r,1} \quad g_{r,2} \quad \cdots \quad g_{r,K}]^T_{K\times1} \text{ is } G_{0,q-K-1}$$

in the foregoing matrix $G_0$.

A determined codebook corresponding to Table 2 includes both a codeword corresponding to a system packet and a codeword corresponding to a check packet. Specifically, an encoding coefficient vector whose index is 0 is a unit vector $$[1 \quad 0 \quad \ldots \quad 0]^T_{K\times1}$$

with a dimension of K. By analogy, an encoding coefficient vector whose index is K−1 is a unit vector $$[0 \quad 0 \quad \ldots \quad 1]^T_{K\times1}$$

with a dimension of K, and an encoding coefficient vector $$[g_{0,1} \quad g_{0,2} \quad \cdots \quad g_{0,K}]^T_{K\times1}$$

whose index is K is $G_{0,0}$ in the matrix $G_0$, and so on. An encoding coefficient vector $$[g_{r,1} \quad g_{r,2} \quad \cdots \quad g_{r,k}]^T_{K\times1}$$

whose index is $$K+r \text{ is } G_{0,q-K-1}$$

in the matrix $G_0$.

For the encoding coefficient vectors corresponding to the check packets in Table 1 and Table 2, a relationship between an index and an encoding coefficient may be changed. For example, locations of encoding coefficient vectors are exchanged. Alternatively, a sequence number or an identifier of the encoding coefficient vector may be represented in another manner, or a codeword in a codebook table is a codeword in $$\{G_{0,0} \quad G_{0,1} \quad \cdots \quad G_{0,q-K-1}\},$$

or a codeword is presented in a form of a row vector instead of a form of a column vector $[\bullet]^T$ in Table 1 or Table 2. Alternatively, each encoding coefficient in the foregoing codebook table may not be determined based on $G_0$, for example, may be determined based on a Cauchy matrix.

TABLE 1

Example codebook table 1

| Index | Encoding coefficient vector |
|---|---|
| 0 | $[g_{0,1} \quad g_{0,2} \cdots g_{0,K}]^T_{K\times1}$ |
| 1 | $[g_{1,1} \quad g_{1,2} \cdots g_{1,K}]^T_{K\times1}$ |
| . . . | . . . |
| r | $[g_{r,1} \quad g_{r,2} \cdots g_{r,K}]^T_{K\times1}$ |

TABLE 2

Example codebook table 2

| Index | Encoding coefficient vector |
|---|---|
| 0 | $[1 \quad 0 \ldots 0]^T_{K\times1}$ |
| 1 | $[0 \quad 1 \ldots 0]^T_{K\times1}$ |
| . . . | . . . |
| K − 1 | $[0 \quad 0 \ldots 1]^T_{K\times1}$ |
| K | $[g_{0,1} \quad g_{0,2} \cdots g_{0,K}]^T_{K\times1}$ |
| K + 1 | $[g_{1,1} \quad g_{1,2} \cdots g_{1,K}]^T_{K\times1}$ |
| . . . | . . . |
| K + r | $[g_{r,1} \quad g_{r,2} \cdots g_{r,K}]^T_{K\times1}$ |

In a second example of the preset encoding coefficient group set, a generator matrix of a codebook is directly a combination of an identity matrix and a Vandermonde matrix. For example, q rows of encoding coefficient vectors in the matrix $V_0$ may be used as codewords corresponding to check packets in the codebook. For a quantity $K(K \leq q)$ of to-be-encoded data packets, when codewords with dimensions of $1 \times q$ are extracted from the codebook, K previous, K subsequent, or K elements at any locations may be taken from the codewords as encoding coefficient vectors. Alternatively, q columns of encoding coefficient vectors in the matrix $V_0$ may be used as codewords in the codebook. For a quantity $K(K \leq q)$ of to-be-encoded data packets, when codewords with dimensions of $q \times 1$ are extracted from the codebook, K previous, K subsequent, or K elements at any locations may be taken from the codewords as encoding coefficient vectors. In this example, Table 1 and Table 2 show examples of a correspondence between an encoding coefficient vector and an index in this example.

In a third example of the preset encoding coefficient group set, q rows of encoding coefficient vectors in the matrix $V_0$ may be used as q codewords in the codebook. For a quantity $K(K \leq q)$ of to-be-encoded data packets, when codewords with dimensions of $1 \times q$ are extracted from the codebook, K previous, K subsequent, or K elements at any locations may be taken from the codewords as encoding coefficient vectors. Alternatively, q columns of encoding coefficient vectors in the matrix $V_0$ may be used as q codewords in the codebook. For a quantity $K(K \leq q)$ of to-be-encoded data packets, when codewords with dimensions of $q \times 1$ are extracted from the codebook, K previous, K subsequent, or K elements at any locations may be taken from the codewords as encoding coefficient vectors. Alternatively, a Vandermonde matrix $$\begin{bmatrix} a_1^0 & a_2^0 & \cdots & a_q^0 \\ a_1^1 & a_2^1 & \cdots & a_q^1 \\ \vdots & \vdots & \ddots & \vdots \\ a_1^{q-1} & a_2^{q-1} & \cdots & a_q^{q-1} \end{bmatrix}$$

including K rows may be directly determined based on the quantity K of to-be-encoded data packets and a group of parameters $[a_1, a_2, \ldots, a_q]$. In this case, a generator matrix of the codebook is $V_0$. q check packets may be generated by left multiplying a row vector including the K to-be-encoded data packets by a matrix including elements in K rows in $V_0$. Therefore, the q columns of encoding coefficient vectors may be used as q codewords. Alternatively, a Vandermonde matrix $$V_0 = \begin{bmatrix} a_1^0 & a_1^1 & \cdots & a_1^{K-1} \\ a_2^0 & a_2^1 & \cdots & a_2^{K-1} \\ \vdots & \vdots & \ddots & \vdots \\ a_q^0 & a_q^1 & \cdots & a_q^{K-1} \end{bmatrix}$$

including K columns may be determined based on the quantity K of to-be-encoded data packets and a group of parameters $[a_1, a_2, \ldots, a_q]$. A generator matrix of the codebook is $V_0$. q check packets may be generated by left multiplying a matrix including elements in K columns in $V_0$ by a column vector including the K to-be-encoded data packets. Therefore, the q rows of encoding coefficient vectors are used as codewords corresponding to check packets in the codebook.

In a fourth example of the preset encoding coefficient group set, a computer finds a group of random encoding coefficient vectors. A dimension of each encoding coefficient vector is not less than a quantity of to-be-encoded data packets. Each vector in a determined full-rank random coefficient matrix is used as a codeword in the codebook, and is stored in a transceiver end in a form of a codebook table. Alternatively, a codec at a transceiver end may obtain the codeword in a same calculation manner. For example, {1, 2, . . . } are respectively used as random seeds and input to a pseudo random generator, one number sequence is correspondingly output for each random seed, and a vector with a dimension of N is extracted as a possible codeword. Herein, N is not less than the quantity of to-be-encoded data packets. If a rank corresponding to a matrix including an output vector corresponding to a current random seed and $t-1$ previously determined extension codewords is equal to $\min(N,t)$, the output vector corresponding to the current random seed may be used as an extension codeword; or otherwise, the output vector is discarded. Similarly, the codebook may also include a unit vector.

When the node D performs network encoding by using an encoding coefficient group in the preset encoding coefficient group set, in a first implementation of indicating an encoding coefficient group corresponding to a data packet, second sub information corresponding to each data packet may directly carry an encoding coefficient group corresponding to the data packet.

When the node D performs network encoding by using an encoding coefficient group in the preset encoding coefficient group set, in a second implementation of indicating an encoding coefficient group corresponding to a data packet, second sub information corresponding to each data packet may carry an index of an encoding coefficient group corresponding to the data packet in the preset encoding coefficient group set.

When the node D performs network encoding by using an encoding coefficient group in the preset encoding coefficient group set, in a third implementation of indicating an encoding coefficient group corresponding to a data packet, second sub information corresponding to each data packet may carry a packet identifier of the data packet, and the packet identifier of the data packet and an index of an encoding coefficient group corresponding to the data packet in the preset encoding coefficient group set have a preset relationship.

When the node D performs network encoding by using an encoding coefficient group in the preset encoding coefficient group and an encoding coefficient group corresponding to a data packet is indicated in the first manner or the second manner above, optionally, the node D may further include third sub information in a $D^{th}$ piece of first information. The third sub information indicates version information of the preset encoding coefficient group set used by the node D. The version information indicates a specific encoding coefficient group set as the preset encoding coefficient group set. In this way, a subsequent node can learn, based on the version information, the preset encoding coefficient group set used by the node D, to accurately obtain an encoding coefficient group corresponding to a data packet obtained by the node D through encoding.

It may be understood that, if different nodes use a same preset encoding coefficient group set in a multi-hop scenario, the node D may send the version information of the preset encoding coefficient group set, or may not send the version information. If the node D does not send the version information, transmission overheads can be reduced.

The following describes an example implementation of generating, based on the second sub information corresponding to each of the $G_D$ received data packets, the first information corresponding to the $D^{th}$ hop (that is, the first information corresponding to the node D) when the node D is a non-destination node.

If the second sub information corresponding to each of the $G_D$ data packets carries an index of an encoding coefficient group corresponding to the data packet, in an example implementation of the first information corresponding to the $D^{th}$ hop, the first information may carry $B_D$ fields, and $G_D$ fields in the $B_D$ fields are in a one-to-one correspondence with the $G_D$ data packets. A location of each of the $G_D$ fields in the $B_D$ fields and an index of an encoding coefficient group corresponding to a data packet in the $G_D$ data packets satisfy a preset relationship. A value of each of the $G_D$ fields is a first preset value. A value of any field in the $B_D$ fields except the $G_D$ fields is a second preset value. Herein, $B_D$ is an integer greater than or equal to H.

Each field may include one or more bits. In an example, each field includes one bit. Values of $G_D$ fields (that is, $G_D$ bits) corresponding to $G_D$ data packets are "1", and a value of another bit is "0".

Optionally, quantities of fields in first information respectively generated by the D nodes, namely, the node 1 to the node D, may be the same or may be different.

For example, $B_{b1}=B_{b2}$, b1 is any integer from 1 to D, and b2 is any integer from 1 to D. In other words, quantities of fields in the first information respectively generated by the D nodes are the same. In this case, the same quantities of fields need to be greater than or equal to the largest value among $F_0$, and $F_0$ to $F_{D-1}$.

Optionally, the first information that corresponds to the $D^{th}$ hop and that is sent by the node D may further include fourth sub information. The fourth sub information indicates a value of $B_D$. For example, when the quantities of fields in the first information respectively generated by the D nodes from the node 1 to the node D are different, a $D^{th}$ piece of first information may further include the fourth sub information.

In an example, $B_D$ is equal to $F_{D-1}$. In this case, the node D−1 needs to indicate a value of $F_{D-1}$ to the node D.

If second sub information corresponding to each of the $G_D$ data packets carries a packet identifier of the data packet, in an example implementation of the first information corresponding to the $D^{th}$ hop, the node D may determine, based on a mapping relationship between a packet identifier and an index of an encoding coefficient group, an index of an encoding coefficient group corresponding to the data packet, and obtain the first information in the manner described in the foregoing content.

If the second sub information corresponding to each of the $G_D$ data packets carries the packet identifier of the data packet, in another example implementation of the first information corresponding to the $D^{th}$ hop, the first information may carry the packet identifier of each of the $G_D$ data packets.

When the first information corresponding to the $D^{th}$ hop may carry the packet identifier of each of the $G_D$ data packets, the first information may further include fifth sub information. The fifth sub information indicates a quantity of packet identifiers carried in the first information.

In some implementations, when sending the first information corresponding to the $D^{th}$ hop, the node D may further send second information. The second information indicates that the $G_D$ data packets are data packets obtained by performing D times of recoding on the $G_0$ data packets. In this implementation, the second information may be further understood as a quantity of pieces of first information, or the second information indicates a value of D.

The following provides several schematic diagrams of structures of the D pieces of first information and related information that are sent by the node D by using an example in which the $d^{th}$ piece of first information in the D pieces of first information corresponds to the $d^{th}$ hop in D hop transmission.

FIG. 5 is a diagram of an example structure of information sent by a node D according to Embodiment 1 of this application. The structure shown in FIG. 5 is a first example structure of the information sent by the node D. As shown in FIG. 5, the information sent by the node D may include hop quantity information from a node 0 to a node D, and D pieces of bitmap information (bitmap), that is, bitmap information 1 to bitmap information D. Each piece of bitmap information includes a preset quantity of fields. Each field is one bit. The D pieces of bitmap information are in a one-to-one correspondence with D hop transmission. Each piece of bitmap information indicates a plurality of pieces of first sub information in first information generated by an end node of a corresponding hop.

FIG. 6 is a diagram of another example structure of information sent by a node D according to Embodiment 1 of this application. The structure shown in FIG. 6 is a second example structure of the information sent by the node D. The structure of the information shown in FIG. 6 is similar to the structure of the information shown in FIG. 5. A difference lies in that a quantity of bits included in each piece of bitmap information is further included before the bitmap information, that is, a bit quantity 1 to a bit quantity D are further included. In addition, different pieces of bitmap information may include different quantities of bits. A quantity of bits included in each piece of bitmap information is equal to a quantity of data packets obtained by a start node of a corresponding hop by encoding a same encoding block.

FIG. 7 is a diagram of still another example structure of information sent by a node D according to Embodiment 1 of this application. The structure shown in FIG. 7 is a third example structure of the information sent by the node D. As shown in FIG. 7, the information may include: hop quantity information from anode 0 to anode D; a quantity of to-be-encoded data packets of each hop node from the node 0 to the node D, that is, a data packet quantity 1 to a data packet quantity D; and a packet identifier set of all to-be-encoded data packets of each hop node, that is, a data packet identification information set 1 to a data packet identification information set D.

In this embodiment, each node may send a data packet, second sub information, and first information in a plurality of manners. The node D is used as an example. In a first example implementation, the node D adds a header to each of $F_D$ data packets, to obtain an encoded packet corresponding to the data packet. The header carries second sub information corresponding to the data packet and D pieces of first information. The node D sends the encoded packet.

The node D is used as an example. In a second example implementation, the node D adds a header to each of $F_D$ data packets, to obtain an encoded packet corresponding to the data packet. The header carries second sub information corresponding to the data packet. The node D sends encoded packets and D pieces of first information. In other words, the D pieces of first information are no longer carried in the header of the encoded packet, but are separately sent outside the encoded packet. Because the D pieces of first information are not carried in the header of the encoded packet but are separately carried outside the encoded packet, when the node D obtains a plurality of data packets through encoding, only one of the D pieces of first information may be sent for the plurality of data packets, thereby reducing transmission overheads.

When the node D sends the encoded packets and the D pieces of first information, optionally, the node D may send the encoded packets in a first PDU, and send the D pieces of first information in a second PDU. The first PDU and the second PDU may be a same PDU, or may be different PDUs.

When the first PDU and the second PDU are different PDUs, the first PDU and the second PDU each further carry a same block identifier (block ID), group identifier (group ID), or sliding window identifier. In this way, when a subsequent communication node receives the first PDU and the second PDU, the communication node may determine, based on the same block identifier, group identifier, or sliding window identifier carried in the first PDU and the second PDU, that the D pieces of first information carried in the second PDU are D pieces of first information corresponding to the target encoded packets in the first PDU.

The foregoing embodiment is described by using an example in which each node performs network encoding in an encoding block encoding manner. In another embodiment of this application, each node may perform network encoding in a sliding window encoding manner. For an implementation in which the node performs network encoding in the sliding window encoding manner, refer to an implementation in which the node performs network encoding in the encoding block encoding manner. A difference lies in that encoding block indication information in the implementation of performing network encoding in the encoding block encoding manner is replaced with sliding window indication information. The sliding window indication information may include sliding window information and/or sequence number (SN) information.

The sliding window information includes: identification information of a first data packet in a sliding window and a quantity of data packets in the sliding window, or identification information of a final data packet in a sliding window and a quantity of data packets in the sliding window, or identification information of a first data packet in a sliding window and window information of a final data packet.

The sequence number information indicates a transmission sequence, in a plurality of encoded packets obtained by a first communication node by encoding data packets in the sliding window, of an encoded packet in which a corresponding data packet is located. In an example, the identification information of the data packet may be a sequence number of the data packet.

Figure 8A:
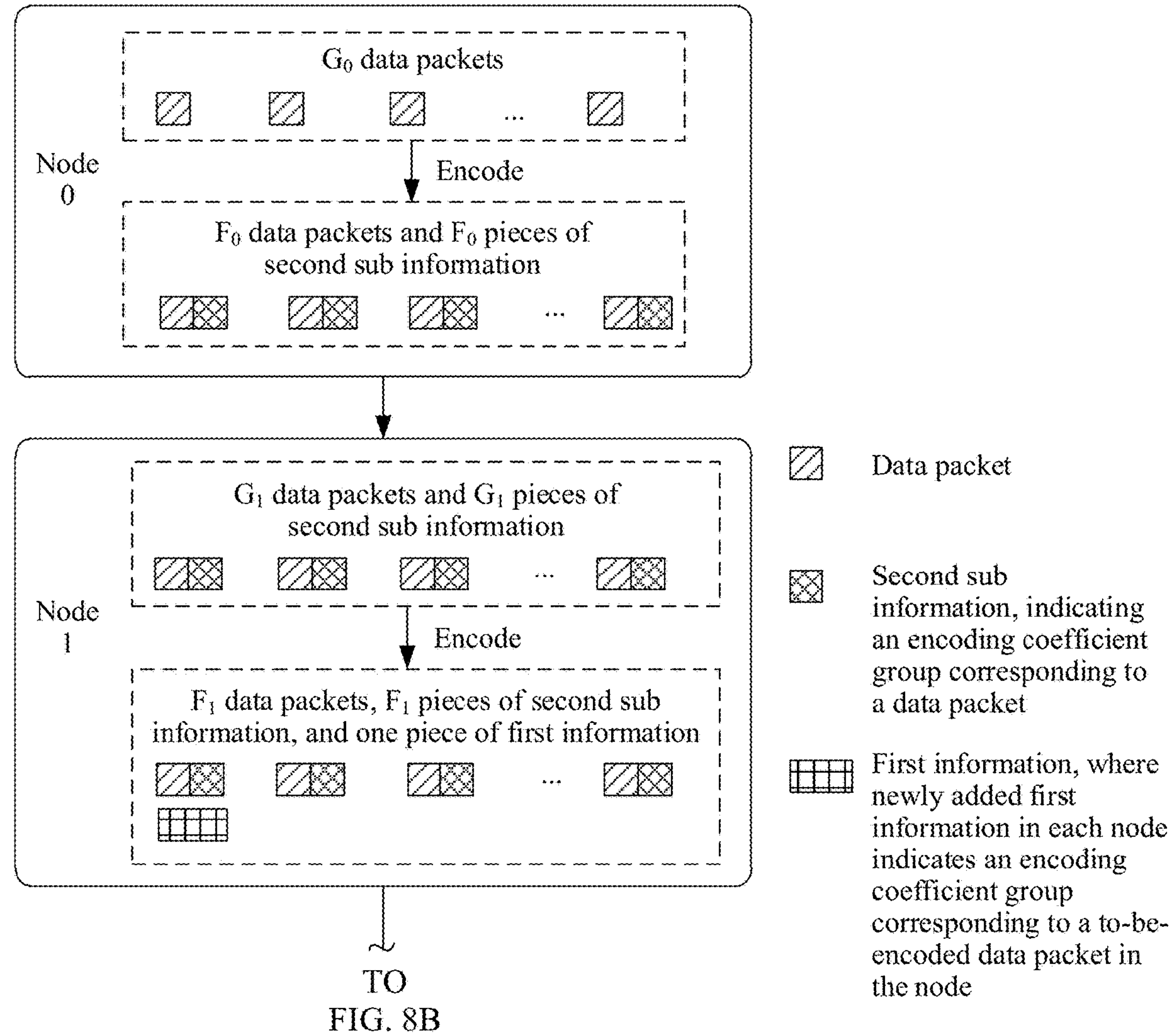
FIG. 8A and FIG. 8B are a flowchart of a second example of a communication method according to Embodiment 1 of this application.
Figure 8B:
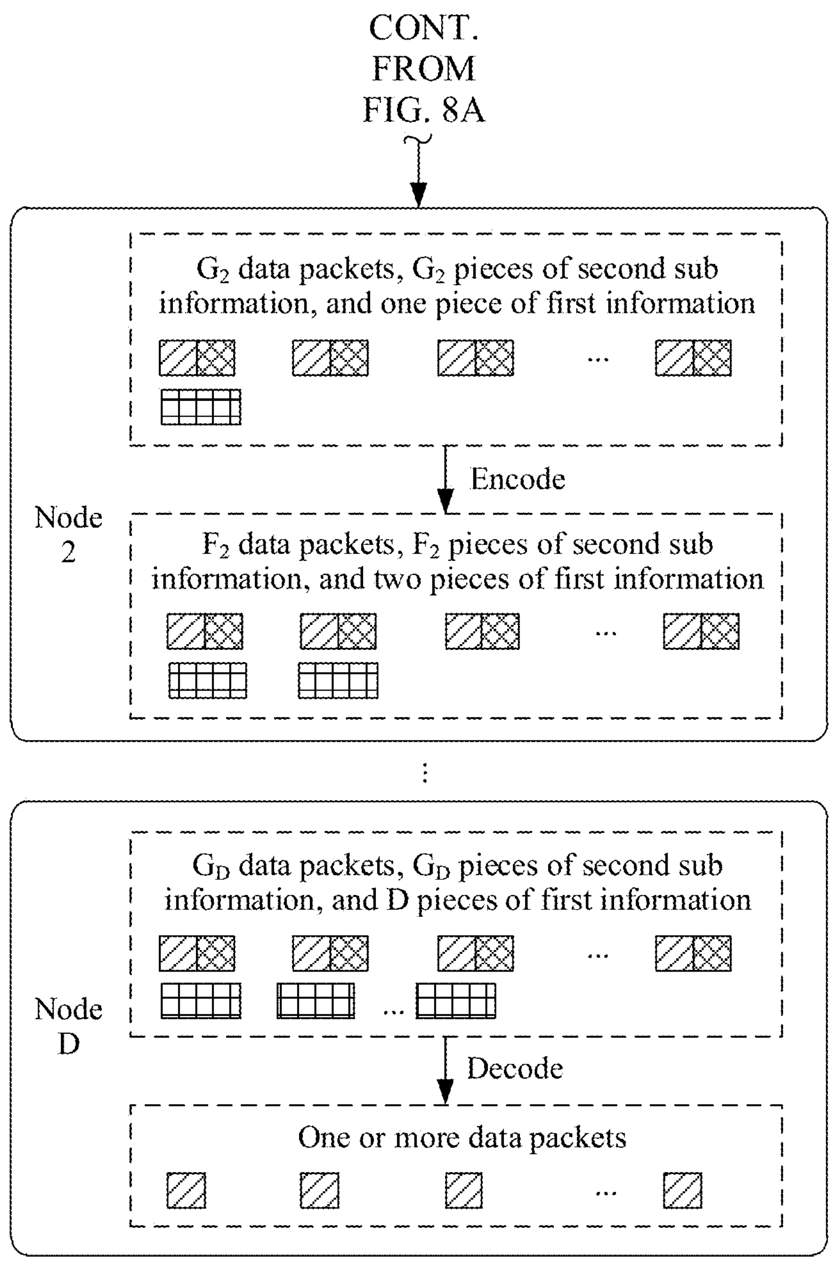

FIG. 8A and FIG. 8B are a diagram of a second example of a communication method according to Embodiment 1 of this application. A difference between the embodiment shown in FIG. 8A and FIG. 8B and the embodiment shown in FIG. 4A and FIG. 4B lies in that a node D is a destination node, for example, a destination node of $G_0$ data packets of a node 0. In this case, the node D performs decoding based on $G_D$ received data packets, second sub information corresponding to each of the $G_D$ data packets, and D−1 pieces of first information, to obtain original data packets.

In an example, the node decodes the $G_D$ data packets based on D pieces of first information and $G_D$ pieces of second sub information, to obtain K data packets. The K data packets and the $G_D$ data packets satisfy the following relational expression:

$$[Y_1 \ \cdots \ Y_k \ \cdots \ Y_K] = [R_1 \ \cdots \ R_g \ \cdots \ R_{G_D}][L_1 \ \cdots \ L_d \ \cdots \ L_{D-1}L]^{-1}.$$

Herein, $Y_k$ represents a $k^{th}$ data packet in the K data packets, $R_g$ represents a $g^{th}$ data packet in the $G_D$ data packets, $L_d$ represents a matrix in which $G_d$ encoding coefficient groups indicated by the $G_d$ pieces of first sub information in a $d^{th}$ piece of first information in the D pieces of first information are $G_d$ column vectors, L represents a matrix in which $G_D$ encoding coefficient groups indicated by the $G_D$ pieces of second sub information are $G_D$ column vectors, $[L_1 \ldots L_d \ldots L_{D-1}L]^{-1}$ represents an inverse matrix of a matrix obtained by multiplying a matrix $L_1$ to a matrix $L_{D-1}$ by a matrix L, and k is an integer and is selected from 1 to K.

It may be understood that a location or sequence of the $k^{th}$ data packet in the K data packets is not limited to k, provided that the location or sequence of the $k^{th}$ data packet in the K data packets and a value of k satisfy a preset relationship.

It may be understood that, if the $G_0$ data packets are not original data packets, indication information of encoding coefficient groups of the $G_0$ data packets relative to the original data packets further needs to be transmitted between the node 0 and the node D. In this case, during decoding, the node D further needs to use the plurality of encoding coefficient groups indicated by the indication information. For a specific decoding manner, refer to the foregoing decoding manner.

Figure 9:
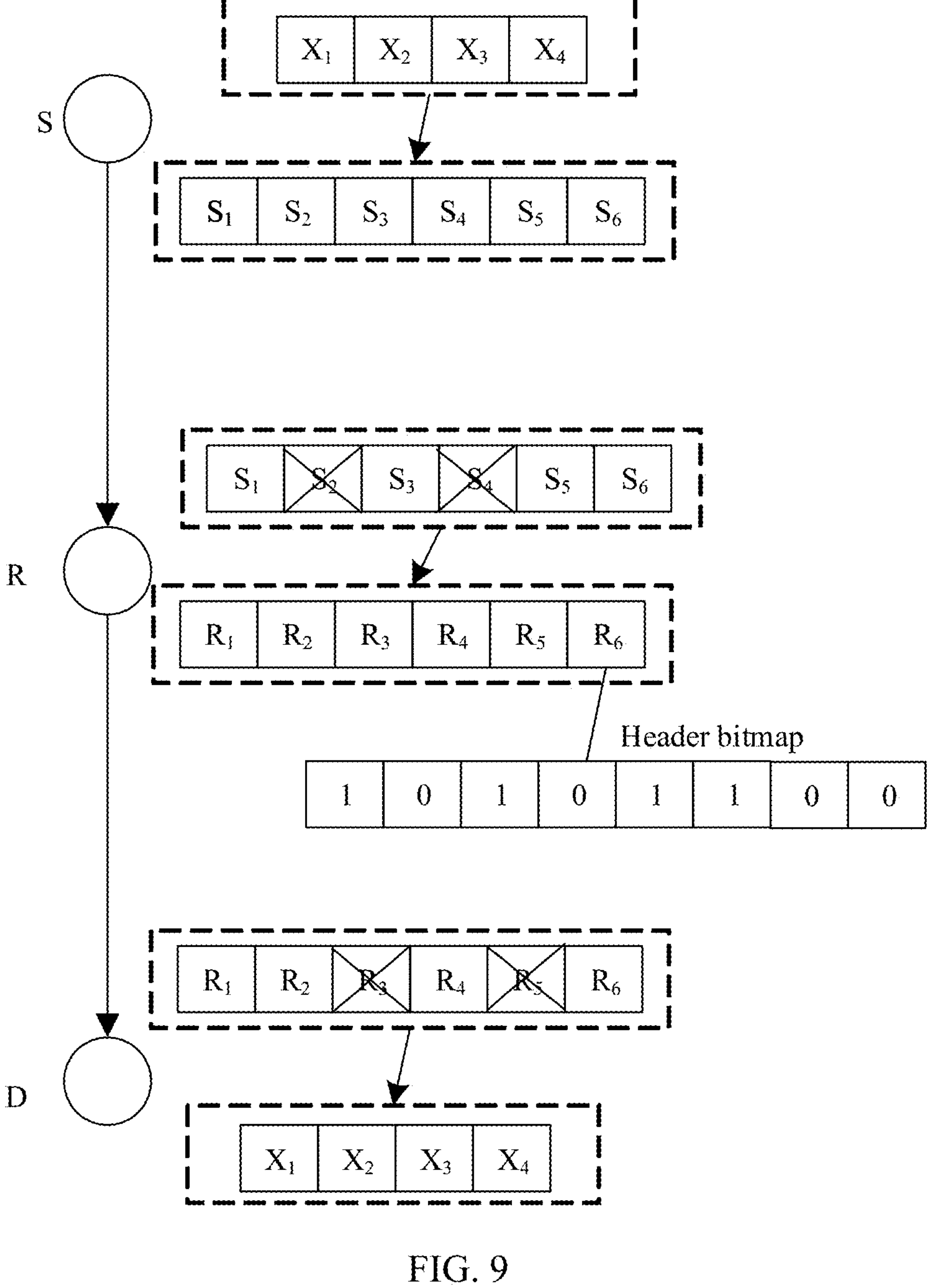
FIG. 9 is a flowchart of a third example of a communication method according to Embodiment 1 of this application.

FIG. 9 is a flowchart of a third example of a communication method according to Embodiment 1 of this application. FIG. 9 mainly describes a communication method for transmitting an original packet (a short name of an original data packet) from a source node to a destination node in a multi-hop scenario. In this scenario, the source node and a forwarding node perform encoding in a group encoding manner.

In this embodiment, the source node S needs to send four original packets to the destination node D. The four original packets are represented as $X_1$, $X_2$, $X_3$, and $X_4$. The source node S encodes the four original packets by using a determined codebook. A generator matrix at the source node S may be written in a form of $[I_K \ G_{K\times r}]$. For example, the generator matrix may be represented as $$\begin{bmatrix} 1 & 0 & 0 & 0 & s_{11} & s_{12} \\ 0 & 1 & 0 & 0 & s_{21} & s_{22} \\ 0 & 0 & 1 & 0 & s_{31} & s_{32} \\ 0 & 0 & 0 & 1 & s_{41} & s_{42} \end{bmatrix}, \text{ where } \begin{bmatrix} s_{11} \\ s_{21} \\ s_{31} \\ s_{41} \end{bmatrix} \text{ or } \begin{bmatrix} s_{21} \\ s_{22} \\ s_{32} \\ s_{42} \end{bmatrix}$$

is an encoding coefficient vector in the determined codebook.

The source node S uses the foregoing generator matrix to perform encoding by using the four original packets as one group, to obtain six data packets that are denoted as $S'_1$, $S'_2$, $S'_3$, $S'_4$, $S'_5$, and $S'_6$. In addition, the source node S adds headers respectively to the six pieces of encoded data, to obtain six encoded packets $S_1$, $S_2$, $S_3$, $S_4$, $S_5$, and $S_6$ in a one-to-one correspondence with $S'_1$, $S'_2$, $S'_3$, $S'_4$, $S'_5$, and $S'_6$. A relationship among the six data packets, the four original packets, and an encoding coefficient vector may be expressed by using the following formula:

$$[S'_1 \ S'_2 \ S'_3 \ S'_4 \ S'_5 \ S'_6] = [X_1 \ X_2 \ X_3 \ X_4] \begin{bmatrix} 1 & 0 & 0 & 0 & s_{11} & s_{12} \\ 0 & 1 & 0 & 0 & s_{21} & s_{22} \\ 0 & 0 & 1 & 0 & s_{31} & s_{32} \\ 0 & 0 & 0 & 1 & s_{41} & s_{42} \end{bmatrix}.$$

The source node S sends the six encoded packets $S'_1$, $S'_2$, $S'_3$, $S'_4$, $S'_5$, and $S'_6$ to a forwarding node R. A header of each encoded packet carries encoding coefficient indication information, encoding block indication information, quantity indication information, and encoded packet type information. The encoding coefficient indication information indicates an encoding coefficient vector corresponding to the encoded packet. The encoding block indication information indicates an encoding block for obtaining the encoded packet through encoding. The quantity indication information indicates a quantity of data packets in the encoding block. The encoded packet type information indicates whether the encoded packet is a system packet or a redundant packet. Encoding blocks indicated by encoding block indication information in the headers of the six encoded packets are a same encoding block.

For example, the encoding coefficient indication information may indicate, by using an index of a corresponding encoding coefficient vector in the determined codebook, an encoding coefficient vector corresponding to an encoded packet; or may indicate, by using identification information of an encoded packet, an encoding coefficient vector corresponding to the encoded packet. Identification information of an encoded packet may be used to determine a specific encoded packet of the encoded packet in a plurality of encoded packets generated based on the same encoding block.

In an example, when the determined codebook is shown in Table 2, K is equal to 4, r is equal to 1, a header of $S'_1$ may indicate an index 0 in the determined codebook, a header of $S'_2$ may indicate an index 1 in the determined codebook, a header of $S'_3$ may indicate an index 2 in the determined codebook, a header of $S'_4$ may indicate an index 3 in the determined codebook, a header of $S'_5$ may indicate an index 4 in the determined codebook, and a header of $S'_6$ may indicate an index 5 in the determined codebook. For another example, a header of each of the six encoded packets may carry the identification information of the encoded packet. The identification information indicates a specific encoded packet of the encoded packet in the six encoded packets. The index of the encoding coefficient vector corresponding to the encoded packet in the determined codebook may be determined based on the identification information.

It is assumed that the forwarding node R receives the encoded packets $S_1$, $S_3$, $S_5$, and $S_6$, it may be determined, based on the encoding block indication information in the four encoded packets, that the four encoded packets are encoded packets obtained by encoding a same encoding block. The data packets $S_1$, $S_3$, $S_5$, and $S_6$ in the four encoded packets are recoded (recoding).

The forwarding node R encodes data packets $S'_1$, $S'_3$, $S'_5$, and $S'_6$ included in $S_1$, $S_3$, $S_5$, and $S_6$ by using an encoding coefficient vector in the determined codebook, to obtain six data packets $R'_1$, $R'_2$, $R'_3$, $R'_4$, $R'_5$, and $R'_6$. In addition, the source node S adds headers respectively to the six pieces of encoded data, to obtain six encoded packets $R_1$, $R_2$, $R_3$, $R_4$, $R_5$, and $R_6$ in a one-to-one correspondence with $R'_1$, $R'_2$, $R'_3$, $R'_4$, $R'_5$, and $R'_6$. The recoding process may be represented as $$[R'_1 \ R'_2 \ R'_3 \ R'_4 \ R'_5 \ R'_6] = [S'_1 \ S'_3 \ S'_5 \ S'_6]\begin{bmatrix} 1 & 0 & 0 & 0 & r_{11} & r_{12} \\ 0 & 1 & 0 & 0 & r_{21} & r_{22} \\ 0 & 0 & 1 & 0 & r_{31} & r_{32} \\ 0 & 0 & 0 & 1 & r_{41} & r_{42} \end{bmatrix},$$

$$\text{where } \begin{bmatrix} r_{11} \\ r_{21} \\ r_{31} \\ r_{41} \end{bmatrix} \text{ or } \begin{bmatrix} r_{12} \\ r_{22} \\ r_{32} \\ r_{42} \end{bmatrix}$$

is an encoding coefficient vector in the determined codebook.

In addition, the header of each encoded packet in $R_1$, $R_2$, $R_3$, $R_4$, $R_5$, and $R_6$ may include encoding coefficient indication information, encoding block indication information, quantity indication information, and encoded packet type information. The encoding coefficient indication information indicates an encoding coefficient vector corresponding to the data packet. The encoding block indication information indicates an encoding block for obtaining the data packet through encoding. The quantity indication information indicates a quantity of data packets in the encoding block. The encoded packet type information indicates whether an encoded packet to which the data packet belongs is a system packet or a redundant packet. Encoding blocks indicated by the encoding block indication information in the headers of the encoded packets to which the six data packets belong are the same encoding block.

For example, the encoding coefficient indication information may indicate, by using an index of a corresponding encoding coefficient vector in the determined codebook, an encoding coefficient vector corresponding to a data packet; or may indicate, by using identification information of a data packet, an encoding coefficient vector corresponding to the data packet. Identification information of a data packet may be used to determine a specific data packet of the data packet in a plurality of data packets generated based on the same encoding block.

For example, when the determined codebook is shown in Table 2, K is equal to 4, r is equal to 1, a header of $R_1$ may indicate an index 0 in the determined codebook, a header of $R_2$ may indicate an index 1 in the determined codebook, a header of $R_3$ may indicate an index 2 in the determined codebook, a header of $R_4$ may indicate an index 3 in the determined codebook, a header of $R_5$ may indicate an index 4 in the determined codebook, and a header of $R_6$ may indicate an index 5 in the determined codebook.

Recoding indication information may be further carried in a header of each encoded packet in $R_1$, $R_2$, $R_3$, $R_4$, $R_5$, and $R_6$ or outside the encoded packet. The recoding indication information indicates an encoding coefficient vector corresponding to an encoding block (that is, $S'_1$, $S'_3$, $S'_5$, and $S'_6$) for obtaining $R'_1$, $R'_2$, $R'_3$, $R'_4$, $R'_5$, and $R'_6$ through encoding.

In an example of the recoding indication information, the indication information includes sub information, and the sub information includes six bits (it is assumed that a quantity of data packets obtained by encoding a same encoding block by each hop node does not exceed six). Values of a first bit, a third bit, a fifth bit, and a sixth bit are "1" (because $R'_1$, $R'_2$, $R'_3$, $R'_4$, $R'_5$, and $R'_6$ are obtained by encoding $S'_1$, $S'_3$, $S'_5$, and $S'_6$), and values of the other two bits are "0".

In another example of the recoding indication information, the indication information includes two pieces of sub information. One piece of sub information indicates a quantity (that is, 6) of bits included in the other piece of sub information, and the other piece of sub information includes six bits. Values of a first bit, a third bit, a fifth bit, and a sixth bit are "1" (because $R'_1$, $R'_2$, $R'_3$, $R'_4$, $R'_5$, and $R'_6$ is obtained by encoding $S'_1$, $S_3$, $S'_5$, and $S'_6$), and values of the other two bits are "0".

In still another example of the recoding indication information, the indication information includes two pieces of sub information. One piece of sub information indicates a quantity (that is, 4) of pieces of identification information included in the other piece of sub information, and the other piece of sub information includes four pieces of identification information. The four pieces of identification information are respectively identification information of $S'_1$, $S'_3$, $S'_5$, and $S'_6$.

In the foregoing three examples, optionally, the recoding indication information may further include information indicating that the forwarding node R is a first-hop forwarding node.

In an example, the forwarding node R sends $R_1$, $R_2$, $R_3$, $R_4$, $R_5$, and $R_6$ to a next-hop node (the destination node D). The header of each encoded packet includes corresponding encoding coefficient indication information, encoding block indication information, quantity indication information, encoded packet type information, and recoding indication information.

In another example, the forwarding node R sends $R_1$, $R_2$, $R_3$, $R_4$, $R_5$, and $R_6$ and the recoding indication information to a next-hop node (the destination node D). A header of each encoded packet includes corresponding encoding coefficient indication information, encoding block indication information, quantity indication information, and encoded packet type information. For example, the recoding indication information may be carried in a PDU associated with a PDU carrying $R_1$, $R_2$, $R_3$, $R_4$, $R_5$, and $R_6$.

It is assumed that the destination node D receives $R_1$, $R_2$, $R_4$, and $R_6$, or receives $R_1$, $R_2$, $R_4$, and $R_6$ and the recoding indication information. The destination node D may obtain original packets $X_1$, $X_2$, $X_3$, and $X_4$ through decoding.

In an example in which the destination node D obtains the original packets $X_1$, $X_2$, $X_3$, and $X_4$ through decoding, the destination node D may determine, based on the same encoding block indication information carried in headers of the four encoded packets $R_1$, $R_2$, $R_4$, and $R_6$, that the four encoded packets $R_1$, $R_2$, $R_4$, and $R_6$ are data packets obtained by encoding a same encoding block.

The destination node D may determine, based on the encoding coefficient indication information, the quantity indication information, and/or the encoded packet type information that are/is carried in the headers of the four data packets $R_1$, $R_2$, $R_4$, and $R_6$, encoding coefficients corresponding to the data packets. For example, encoded packet type information in a header of $R_1$ indicates that the encoded packet is a system packet. Encoding coefficient indication information is identification information, and the identification information indicates that the encoded packet is a first encoded packet in a plurality of encoded packets obtained by encoding a same encoding block. Therefore, it may be determined that an encoding coefficient vector corresponding to $R_1$ is $[1\ 0\ 0\ 0]^T$. Encoded packet type information in a header of $R_2$ indicates that the encoded packet is a system packet. Encoding coefficient indication information is identification information, and the identification information indicates that the encoded packet is a second encoded packet in the plurality of encoded packets obtained by encoding the same encoding block. Therefore, it may be determined that an encoding coefficient vector corresponding to $R_2$ is $[0\ 1\ 0\ 0]^T$. Encoded packet type information in a header of $R_4$ indicates that the encoded packet is a system packet. Encoding coefficient indication information is identification information, and the identification information indicates that the encoded packet is a fourth encoded packet in the plurality of encoded packets obtained by encoding the same encoding block. Therefore, it may be determined that an encoding coefficient vector corresponding to $R_4$ is $[0\ 0\ 0\ 1]^T$ Encoded packet type information in a header of $R_6$ indicates that the encoded packet is a redundant packet. Encoding coefficient indication information is an index and the index is 5. Quantity indication information indicates that $R_6$ is a data packet obtained by encoding an encoding block including four data packets. Therefore, it may be determined that an encoding coefficient vector whose index is 5 (an index starts from 0) is $[r_{12}\ r_{22}\ r_{32}\ r_{42}]^T$.

In other words, the destination node D determines that encoding coefficient vectors corresponding to the four encoded packets $R_1$, $R_2$, $R_4$, and $R_6$ are respectively $[1\ 0\ 0\ 0]^T$, $[0\ 1\ 0\ 0]^T$, $[0\ 0\ 0\ 1]^T$ and $[r_{12}\ r_{22}\ r_{32}\ r_{42}]^T$.

The destination node D determines, based on the recoding indication information, encoding coefficient vectors corresponding to a plurality of data packets included in an encoding block in the forwarding node.

For example, in the first example of the recoding indication information, the destination node D may determine, based on "101011", that the plurality of data packets included in the encoding block for obtaining $R_1$, $R_2$, $R_4$, and $R_6$ through encoding are the first, the third, the fifth, and the sixth data packets in the plurality of data packets obtained by a previous hop of the forwarding node R by encoding the data packets in the same encoding block. Based on a length of the encoding block: 4, the destination node D may determine that the encoding coefficient vector corresponding to the first encoded packet in the four data packets is $[1\ 0\ 0\ 0]^T$, the encoding coefficient vector corresponding to the third data packet is $[0\ 0\ 10]^T$, the encoding coefficient vector corresponding to the fifth data packet is $[s_{11}\ s_{21}\ s_{31}\ s_{41}]^T$, and the encoding coefficient vector corresponding to the sixth data packet is $[s_{12}\ s_{22}\ s_{32}\ s_{42}]^T$. The length of the encoding block may be carried in the recoding indication information, or may be preset.

For example, in the third example of the recoding indication information, the destination node D may determine, based on indications in four pieces of identification information, that the plurality of data packets included in the encoding block for obtaining $R_1$, $R_2$, $R_4$, and $R_6$ through encoding are the first, the third, the fifth, and the sixth data packets in the plurality of data packets obtained by the previous hop of the forwarding node R by encoding the data packets in the same encoding block. Then, based on the length of the encoding block: 4, the destination node D may determine that the encoding coefficient vector corresponding to the first data packet in the four data packets is $[1\ 0\ 0\ 0]^T$, the encoding coefficient vector corresponding to the third data packet is $[0\ 0\ 1\ 0]^T$, the encoding coefficient vector corresponding to the fifth data packet is $[s_{11}\ s_{21}\ s_{31}\ s_{41}]^T$, and the encoding coefficient vector corresponding to the sixth data packet is $[s_{12}\ s_{22}\ s_{32}\ s_{42}]^T$. The length of the encoding block may be carried in the recoding indication information, or may be preset.

The destination node D may obtain a decoding matrix $$\left[\begin{bmatrix} 1 & 0 & s_{11} & s_{12} \\ 0 & 0 & s_{21} & s_{22} \\ 0 & 1 & s_{31} & s_{32} \\ 0 & 0 & s_{41} & s_{42} \end{bmatrix} \cdot \begin{bmatrix} 1 & 0 & 0 & r_{12} \\ 0 & 1 & 0 & r_{22} \\ 0 & 0 & 0 & r_{32} \\ 0 & 0 & 1 & r_{42} \end{bmatrix}\right]^{-1} \left[\begin{bmatrix} 1 & 0 & 0 & r_{12} \\ 0 & 1 & 0 & r_{22} \\ 0 & 0 & 0 & r_{32} \\ 0 & 0 & 1 & r_{42} \end{bmatrix} \cdot \begin{bmatrix} 1 & 0 & s_{11} & s_{12} \\ 0 & 0 & s_{21} & s_{22} \\ 0 & 1 & s_{31} & s_{32} \\ 0 & 0 & s_{41} & s_{42} \end{bmatrix}\right]^{-1}$$

based on the foregoing obtained encoding coefficient vectors, and decode $R_1$, $R_2$, $R_4$, and $R_6$ by using the decoding matrix, to obtain the original packets $X_1$, $X_2$, $X_3$, and $X_4$.

Figure 10:
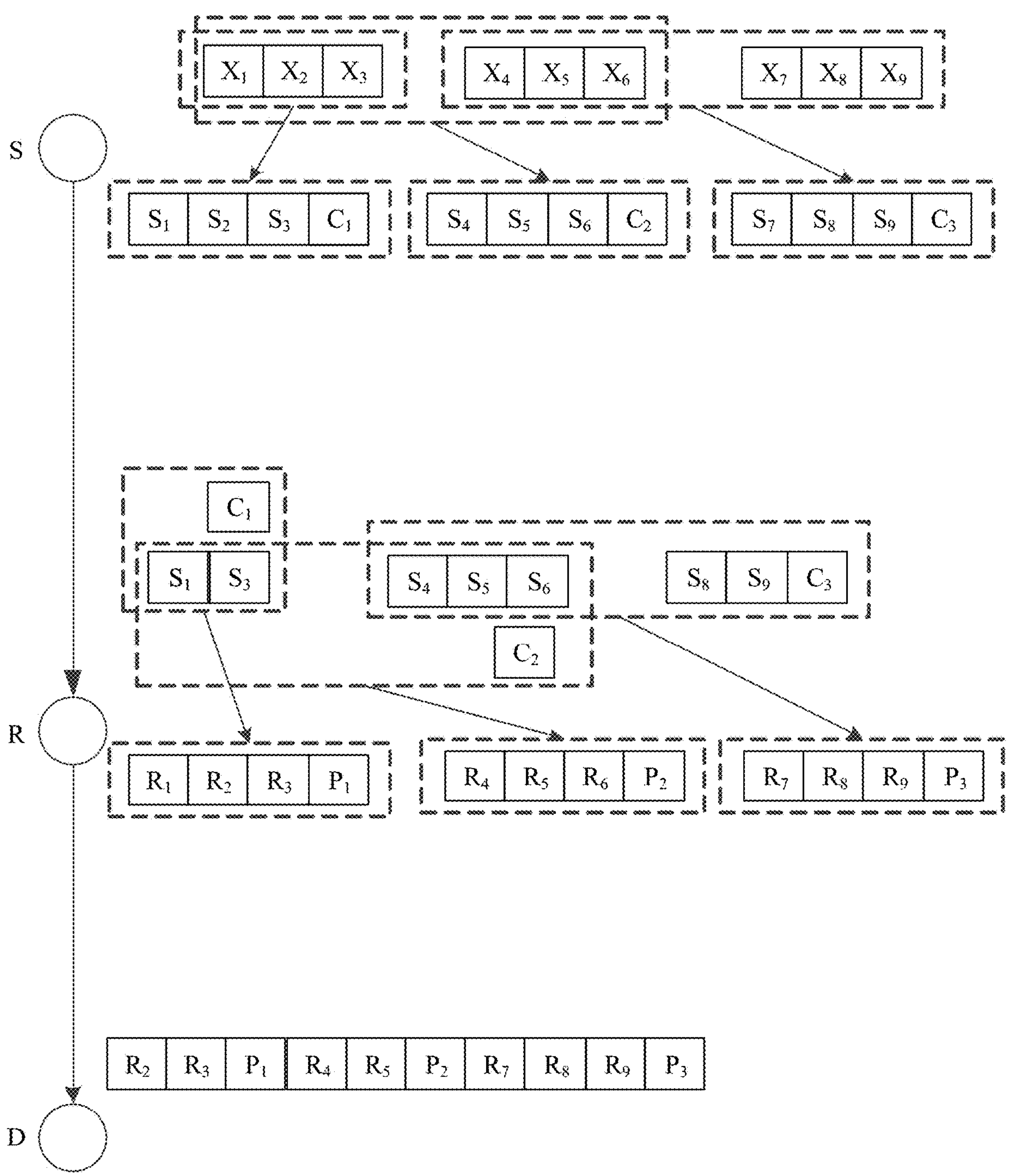
FIG. 10 is a flowchart of a fourth example of a communication method according to Embodiment 1 of this application.

FIG. 10 is a flowchart of a fourth example of a communication method according to Embodiment 1 of this application. FIG. 10 mainly describes a communication method for transmitting an original packet from a source node to a destination node in a multi-hop scenario. In this scenario, the source node and a forwarding node perform encoding in a sliding window encoding manner.

As shown in FIG. 10, the source node S needs to send nine original packets $X_1$, $X_2$, $X_3$, $X_4$, $X_5$, $X_6$, $X_7$, $X_8$, and $X_9$. When the source node S encodes the nine original packets, a first sliding window includes $X_1$, $X_2$, and $X_3$, and network encoding is performed on the data packets in the window to obtain encoded packets $S_1$, $S_2$, $S_3$, and $C_1$. Herein, $S_1$, $S_2$, and $S_3$ may be respectively system packets obtained by adding headers to data packets obtained by encoding $X_1$, $X_2$, and $X_3$ by using a unit encoding coefficient vector, or may be respectively system packets obtained by directly adding headers to $X_1$, $X_2$, and $X_3$; and $C_1$ may be a redundant packet obtained by adding a header to a data packet obtained by encoding $X_1$, $X_2$, and $X_3$ by using a non-unit vector.

A second sliding window includes $X_1$, $X_2$, $X_3$, $X_4$, $X_5$, and $X_6$, and network encoding is performed on the data packets in the window to obtain encoded packets $S_4$, $S_5$, $S_6$, and $C_2$. Herein, $S_4$, $S_5$, and $S_6$ may be respectively system packets obtained by adding headers to data packets obtained by encoding $X_1$, $X_2$, $X_3$, $X_4$, $X_5$, and $X_6$ by using a unit encoding coefficient vector, or may be respectively system packets obtained by directly adding headers to $X_4$, $X_5$, and $X_6$; and $C_2$ may be a redundant packet obtained by adding a header to a data packet obtained by encoding $X_1$, $X_2$, $X_3$, $X_4$, $X_5$, and $X_6$ by using a non-unit vector. A third sliding window includes $X_4$, $X_5$, $X_6$, $X_7$, $X_8$, and $X_9$, and network encoding is performed on the data packets in the window to obtain encoded packets $S_7$, $S_8$, $S_9$, and $C_3$. Herein, $S_7$, $S_8$, and $S_9$ may be respectively system packets obtained by adding headers to data packets obtained by encoding $X_4$, $X_5$, $X_6$, $X_7$, $X_8$, and $X_9$ by using a unit encoding coefficient vector, or may be respectively system packets obtained by directly adding headers to $X_7$, $X_8$, and $X_9$; and $C_3$ may be a redundant packet obtained by adding a header to a data packet obtained by encoding $X_4$, $X_5$, $X_6$, $X_7$, $X_8$, and $X_9$ by using a non-unit vector.

A header of each of the encoded packets $S_1$, $S_2$, $S_3$, $C_1$, $S_4$, $S_5$, $S_6$, $C_2$, $S_7$, $S_8$, $S_9$, and $C_3$ further carries sliding window information, information about a quantity of data packets in a current sliding window, identification information of the encoded packet, and encoding coefficient indication information corresponding to a data packet in the encoded packet. In some scenarios, the identification information of the encoded packet and the encoding coefficient indication information are the same information. For example, when the encoded packet is a system packet, the identification information of the encoded packet may be used as the encoding coefficient indication information corresponding to the data packet in the encoded packet.

The sliding window information indicates a specific data packet for obtaining the data packet in the encoded packet. The sliding window information may include identification information of a first data packet in the sliding window and information about a quantity of data packets in the sliding window, or include identification information of a first data packet in the sliding window and identification information of a final data packet in the sliding window, or include identification information of a final data packet in the sliding window and information about a quantity of data packets in the sliding window.

The source node S sends the encoded packets $S_1$, $S_2$, $S_3$, $C_1$, $S_4$, $S_5$, $S_6$, $C_2$, $S_7$, $S_8$, $S_9$, and $C_3$. It is assumed that the forwarding node R receives encoded packets $S_1$, $S_3$, $C_1$, $S_4$, $S_5$, $S_6$, $C_2$, $S_8$, $S_9$, and $C_3$, that is, fails in receiving encoded packets $S_2$ and $S_7$, the forwarding node R may perform recoding based on the received encoded packets.

For example, sliding windows indicated by sliding window information in the encoded packets $S_1$, $S_3$, and $C_1$ are all $X_1$, $X_2$, and $X_3$. Therefore, the forwarding node R may determine that data packets in the three encoded packets are obtained by encoding data packets in the same sliding window, and further recode the data packets in the sliding window: $S_1$, $S_3$, and $C_1$ to obtain encoded packets $R_1$, $R_2$, $R_3$, and $P_1$. Herein, $R_1$, $R_2$, and $R_3$ may be respectively system packets obtained by adding headers to data packets obtained by encoding data packets in $S_1$, $S_3$, and $C_1$ by using a unit encoding coefficient vector, or may be respectively system packets obtained by directly adding headers to data packets in $S_1$, $S_3$, and $C_1$; and $P_1$, may be a redundant packet obtained by adding a header to a data packet obtained by encoding the data packets in $S_1$, $S_3$, and $C_1$ by using a non-unit vector.

Sliding windows indicated by sliding window information in the encoded packets $S_4$, $S_5$, $S_6$, and $C_2$ are all $X_1$, $X_2$, $X_3$, $X_4$, $X_5$, and $X_6$. Therefore, it may be determined that the four encoded packets are obtained by encoding data packets in the same sliding window, and $S_1$ and $S_3$ are respectively system packets obtained by encoding $X_1$ and $X_3$ in the sliding window. Therefore, the forwarding node R recodes the data packets in the sliding window: $S_1$, $S_3$, $S_4$, $S_5$, $S_6$, and $C_2$ to obtain encoded packets $R_4$, $R_5$, $R_6$, $R_7$, and $P_2$. Herein, $R_4$, $R_5$, $R_6$, and $R_7$ may be respectively system packets obtained by adding headers to data packets obtained by encoding $S_4$, $S_5$, $S_6$, and $C_2$ by using a unit encoding coefficient vector, or may be respectively system packets obtained by directly adding headers to $S_4$, $S_5$, $S_6$, and $C_2$; and $P_2$ may be a redundant packet obtained by adding a header to a data packet obtained by encoding $S_1$, $S_3$, $S_4$, $S_5$, $S_6$, and $C_2$ by using a non-unit vector.

Sliding windows indicated by sliding window information in the encoded packets $S_8$, $S_9$, and $C_3$ are all $X_4$, $X_5$, $X_6$, $X_7$, $X_8$, and $X_9$. Therefore, it may be determined that the three encoded packets are obtained by encoding data packets in the same sliding window, and $S_4$, $S_5$, and $S_6$ are respectively system packets obtained by encoding $X_4$, $X_5$, and $X_6$ in the sliding window. Therefore, the forwarding node R recodes the data packets in the sliding window: $S_4$, $S_5$, $S_6$, $S_8$, $S_9$, and $C_3$ to obtain encoded packets $R_8$, $R_9$, $R_{10}$, and $P_3$. Herein, $R_8$, $R_9$, and $R_{10}$ may be respectively system packets obtained by adding headers to data packets obtained by encoding $S_8$, $S_9$, and $C_3$ by using a unit encoding coefficient vector, or may be respectively system packets obtained by directly adding headers to $S_8$, $S_9$, and $C_3$; and $P_3$ may be a redundant packet obtained by adding a header to a data packet obtained by encoding $S_4$, $S_5$, $S_6$, $S_8$, $S_9$, and $C_3$ by using a non-unit vector.

A header of each of the encoded packets $R_1$, $R_2$, $R_3$, $P_1$, $R_4$, $R_5$, $R_6$, $R_7$, $P_2$, $R_8$, $R_9$, $R_{10}$, and $P_3$ further carries information about a current sliding window, information about a quantity of data packets in the current sliding window, identification information of the encoded packet, and encoding coefficient indication information corresponding to a data packet in the encoded packet. The information about the current sliding window indicates information about a sliding window used by the forwarding node R for recoding. In some scenarios, the identification information of the encoded packet and the encoding coefficient indication information are the same information. For example, when the encoded packet is a system packet, the identification information of the encoded packet may be used as the encoding coefficient indication information corresponding to the data packet in the encoded packet.

In addition, the forwarding node R further generates corresponding recoding indication information for each current sliding window. The recoding indication information includes encoding coefficient indication information corresponding to each encoded packet in the current sliding window (or referred to as encoding coefficient indication information corresponding to a data packet in the encoded packet).

For example, a header of the encoded packet $P_1$ may carry information about a current sliding window (identification information of $S_1$, $S_3$, and $C_1$), information about a quantity (3) of data packets in the current sliding window, identification information of the encoded packet $P_1$, and encoding coefficient indication information corresponding to the encoded packet $P_1$. The header of the encoded packet $P_1$ or other content (for example, an associated PDU) associated with the encoded packet $P_1$, may carry encoding coefficient indication information corresponding to each encoded packet in the information about the current sliding window: $S_1$, $S_3$, and $C_1$.

For another example, a header of the encoded packet $P_2$ may carry information about a current sliding window (identification information of $S_1$, $S_3$, $S_4$, $S_5$, $S_6$, and $C_2$), information about a quantity (6) of data packets in the current sliding window, identification information of the encoded packet $P_2$, and encoding coefficient indication information corresponding to the encoded packet $P_2$. The header of the encoded packet $P_2$ or other content (for example, an associated PDU) associated with the encoded packet $P_2$ may carry encoding coefficient indication information corresponding to each encoded packet in the information about the current sliding window: $S_1$, $S_3$, $S_4$, $S_5$, $S_6$, and $C_2$.

The forwarding node R sends the encoded packets $R_1$, $R_2$, $R_3$, $P_1$, $R_4$, $R_5$, $R_6$, $R_7$, $P_2$, $R_8$, $R_9$, $R_{10}$, and $P_3$. When the recoding indication information is not carried in the encoded packets, the forwarding node further sends the recoding indication information.

It is assumed that the destination node D receives the encoded packets $R_2$, $R_3$, $P_1$, $R_4$, $R_5$, $R_6$, $P_2$, $R_8$, $R_9$, $R_{10}$, and $P_3$, that is, fails in receiving the encoded packets $R_1$ and $R_7$. When the recoding indication information is not carried in the encoded packets, the destination node further receives the corresponding recoding indication information. The destination node D may decode the received encoded packets.

For example, because sliding windows of $R_2$, $R_3$, and $P_1$ are the same (all are $S_1$, $S_3$, and $C_1$), the destination node D may perform decoding based on $R_2$, $R_3$, and $P_1$, and may determine, based on headers of $R_2$, $R_3$, and $P_1$, that encoding coefficient vectors corresponding to the three encoded packets are respectively $[0\ 1\ 0]^T$, $[0\ 0\ 1]^T$ and $[r_{11}\ r_{21}\ r_{31}]^T$. Therefore, an encoding matrix of a previous hop of the destination node D is $$\begin{bmatrix} 0 & 0 & r_{11} \\ 1 & 0 & r_{21} \\ 0 & 1 & r_{31} \end{bmatrix}.$$

In addition, the destination node D may determine, based on the recoding indication information corresponding to the three encoded packets, that encoding coefficient vectors of $S_1$, $S_3$, and $C_1$ in the sliding window of $R_2$, $R_3$, and $P_1$ are respectively $[1\ 0\ 0]^T$, $[0\ 0\ 1]^T$, and $[s_{11}\ s_{21}\ s_{31}]^T$. Therefore, an encoding matrix of a hop before the previous hop of the destination node is $$\begin{bmatrix} 1 & 0 & s_{11} \\ 0 & 0 & s_{21} \\ 0 & 1 & s_{31} \end{bmatrix},$$

and a decoding matrix at the destination node is an inverse matrix of a matrix obtained by sequentially multiplying encoding matrices of the previous hops, that is, $$\left[\begin{bmatrix} 1 & 0 & s_{11} \\ 0 & 0 & s_{21} \\ 0 & 1 & s_{31} \end{bmatrix} \cdot \begin{bmatrix} 0 & 0 & r_{11} \\ 1 & 0 & r_{21} \\ 0 & 1 & r_{31} \end{bmatrix}\right]^{-1} \text{ or } \left[\begin{bmatrix} 0 & 0 & r_{11} \\ 1 & 0 & r_{21} \\ 0 & 1 & r_{31} \end{bmatrix} \cdot \begin{bmatrix} 1 & 0 & s_{11} \\ 0 & 0 & s_{21} \\ 0 & 1 & s_{31} \end{bmatrix}\right]^{-1}.$$

The destination node may obtain the original packets $X_1$, $X_2$, and $X_3$ by decoding $R_2$, $R_3$, and $P_1$ by using the decoding matrix. A manner of obtaining other original packets is similar. Details are not described herein again.

Figure 11:
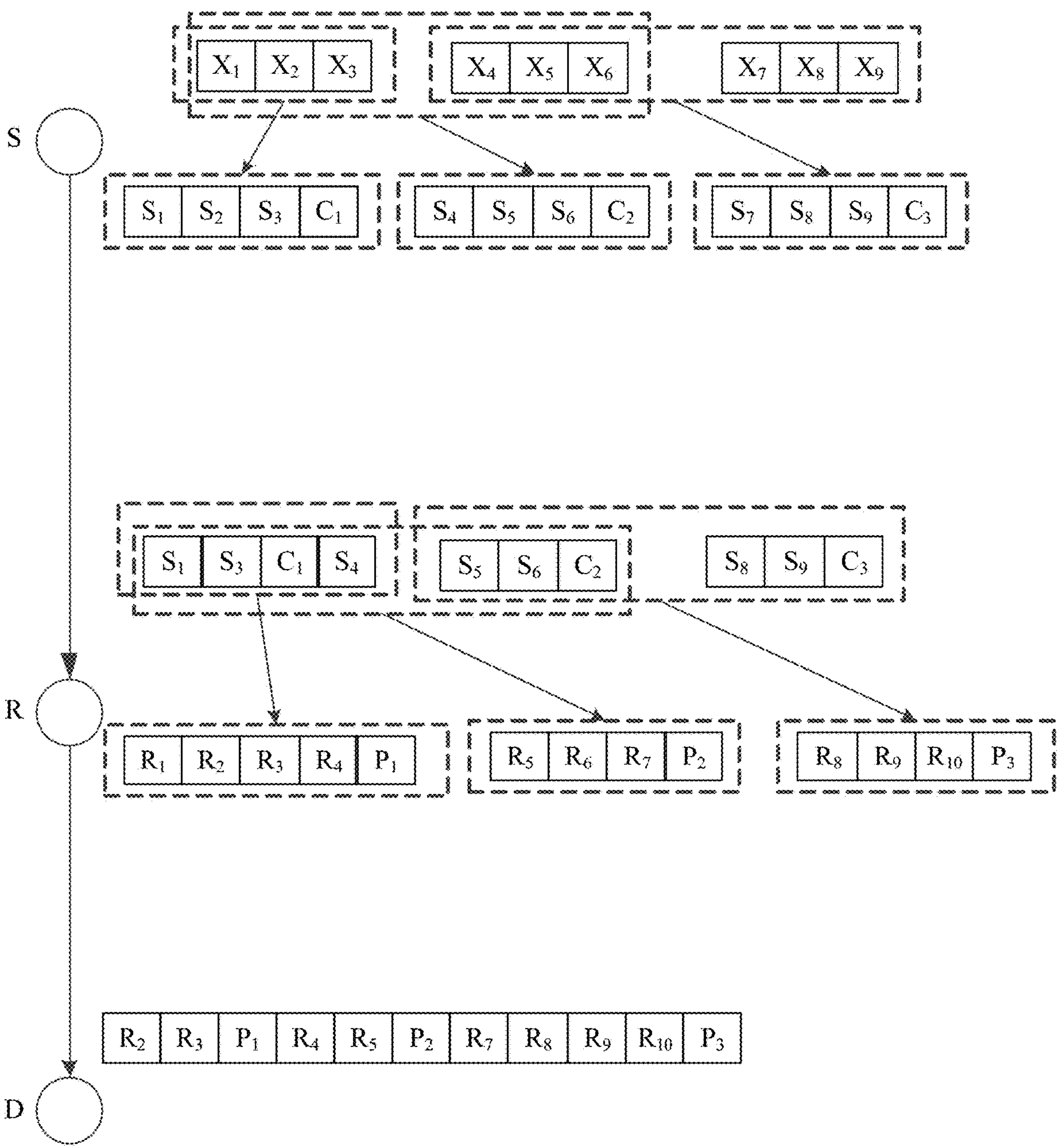
FIG. 11 is a flowchart of a fifth example of a communication method according to Embodiment 1 of this application.

FIG. 11 is a fifth schematic diagram of a communication method according to Embodiment 1 of this application. FIG. 11 mainly describes a communication method for transmitting an original packet from a source node to a destination node in a multi-hop scenario. In this scenario, the source node and a forwarding node perform encoding in an adaptive sliding window encoding manner.

As shown in FIG. 11, the source node S needs to send nine original packets $X_1$, $X_2$, $X_3$, $X_4$, $X_5$, $X_6$, $X_7$, $X_8$, and $X_9$. When the source node S encodes the nine original packets, a first sliding window includes $X_1$, $X_2$, and $X_3$, and network encoding is performed on the data packets in the window to obtain encoded packets $S_1$, $S_2$, $S_3$, and $C_1$. Herein, $S_1$, $S_2$, and $S_3$ may be respectively system packets obtained by adding headers to data packets obtained by encoding $X_1$, $X_2$, and $X_3$ by using a unit encoding coefficient vector, or may be respectively system packets obtained by directly adding headers to $X_1$, $X_2$, and $X_3$; and $C_1$ may be redundant packets obtained by adding headers to data packets obtained by encoding $X_1$, $X_2$, and $X_3$ by using a non-unit vector.

A second sliding window includes $X_1$, $X_2$, $X_3$, $X_4$, $X_5$, and $X_6$, and network encoding is performed on the data packets in the window to obtain encoded packets $S_4$, $S_5$, $S_6$, and $C_2$. Herein, $S_4$, $S_5$, and $S_6$ may be respectively system packets obtained by adding headers to data packets obtained by encoding $X_4$, $X_5$, and $X_6$ by using a unit encoding coefficient vector, or may be respectively system packets obtained by directly adding headers to $X_4$, $X_5$, and $X_6$; and $C_2$ may be a redundant packet obtained by adding a header to a data packet obtained by encoding $X_1$, $X_2$, $X_3$, $X_4$, $X_5$, and $X_6$ by using a non-unit vector.

A third sliding window includes $X_4$, $X_5$, $X_6$, $X_7$, $X_8$, and $X_9$, and network encoding is performed on the data packets in the window to obtain encoded packets $S_7$, $S_8$, $S_9$, and $C_3$. Herein, $S_7$, $S_8$, and $S_9$ may be respectively system packets obtained by adding headers to data packets obtained by encoding $X_7$, $X_8$, and $X_9$ by using a unit encoding coefficient vector, or may be respectively system packets obtained by directly adding headers to $X_7$, $X_8$, and $X_9$; and $C_3$ may be a redundant packet obtained by adding a header to a data packet obtained by encoding $X_4$, $X_5$, $X_6$, $X_7$, $X_8$, and $X_9$ by using a non-unit vector.

A header of each of the encoded packets $S_1$, $S_2$, $S_3$, $C_1$, $S_4$, $S_5$, $S_6$, $C_2$, $S_7$, $S_8$, $S_9$, and $C_3$ further carries sliding window information, information about a quantity of data packets in a current sliding window, identification information of the encoded packet, and encoding coefficient indication information corresponding to a data packet in the encoded packet.

In some scenarios, the identification information of the encoded packet and the encoding coefficient indication information are the same information. For example, when the encoded packet is a system packet, the identification information of the encoded packet may be used as the encoding coefficient indication information corresponding to the data packet in the encoded packet.

The sliding window information indicates a specific data packet for obtaining the data packet in the encoded packet. The sliding window information may include identification information of a first data packet in the sliding window and information about a quantity of data packets in the sliding window, or include identification information of a first data packet in the sliding window and identification information of a final data packet in the sliding window, or include identification information of a final data packet in the sliding window and information about a quantity of data packets in the sliding window.

The source node S sends the encoded packets $S_1$, $S_2$, $S_3$, $C_1$, $S_4$, $S_5$, $S_6$, $C_2$, $S_7$, $S_8$, $S_9$, and $C_3$. It is assumed that the forwarding node R receives encoded packets $S_1$, $S_3$, $C_1$, $S_4$, $S_5$, $S_6$, $C_2$, $S_8$, $S_9$, and $C_3$, that is, fails in receiving encoded packets $S_2$ and $S_7$, the forwarding node R may perform recoding based on the received encoded packets.

For example, the forwarding node R performs sliding window division again on $S_1$, $S_3$, $C_1$, $S_4$, $S_5$, $S_6$, $C_2$, $S_8$, $S_9$, and $C_3$ to obtain three sliding windows. A first sliding window includes $S_1$, $S_3$, $C_1$, and $S_4$, a second sliding window includes $S_1$, $S_3$, $C_1$, $S_4$, $S_5$, $S_6$, and $C_2$, and a third sliding window includes $S_5$, $S_6$, $C_2$, $S_8$, $S_9$, and $C_3$.

The forwarding node R encodes the first sliding window: $S_1$, $S_3$, $C_1$, and $S_4$ to obtain encoded packets $R_1$, $R_2$, $R_3$, $R_4$, and $P_1$. Herein, $R_1$, $R_2$, $R_3$, and $R_4$ may be respectively system packets obtained by adding headers to data packets obtained by encoding data packets in $S_1$, $S_3$, $C_1$, and $S_4$ by using a unit encoding coefficient vector, or may be respectively system packets obtained by directly adding headers to data packets in $S_1$, $S_3$, $C_1$, and $S_4$; and $P_1$, may be a redundant packet obtained by adding a header to a data packet obtained by encoding the data packets in $S_1$, $S_3$, $C_1$, and $S_4$ by using a non-unit vector.

The forwarding node R encodes the second sliding window: $S_1$, $S_3$, $C_1$, $S_4$, $S_5$, $S_6$, and $C_2$ to obtain encoded packets $R_5$, $R_6$, $R_7$, and $P_2$. Herein, $R_5$, $R_6$, and $R_7$ may be respectively system packets obtained by adding headers to data packets obtained by encoding $S_1$, $S_3$, $C_1$, $S_4$, $S_5$, $S_6$, and $C_2$ by using a unit encoding coefficient vector, or may be respectively system packets obtained by directly adding headers to $S_5$, $S_6$, and $C_2$; and $P_2$ may be a redundant packet obtained by adding a header to a data packet obtained by encoding $S_1$, $S_3$, $C_1$, $S_4$, $S_5$, $S_6$, and $C_2$ by using a non-unit vector.

The forwarding node R encodes the third sliding window: $S_5$, $S_6$, $C_2$, $S_8$, $S_9$, and $C_3$ to obtain encoded packets $R_8$, $R_9$, $R_{10}$, and $P_3$. Herein, $R_8$, $R_9$, and $R_{10}$ may be respectively system packets obtained by adding headers to data packets obtained by encoding $S_5$, $S_6$, $C_2$, $S_8$, $S_9$, and $C_3$ by using a unit encoding coefficient vector, or may be respectively system packets obtained by directly adding headers to $S_8$, $S_9$, and $C_3$; and $P_3$ may be a redundant packet obtained by adding a header to a data packet obtained by encoding $S_5$, $S_6$, $C_2$, $S_8$, $S_9$, and $C_3$ by using a non-unit vector.

A header of each of the encoded packets $R_1$, $R_2$, $R_3$, $R_4$, $P_1$, $R_5$, $R_6$, $R_7$, $R_8$, $R_9$, $R_{10}$, and $P_3$ further carries information about a current sliding window, information about a quantity of data packets in the current sliding window, identification information of the encoded packet, and encoding coefficient indication information corresponding to a data packet in the encoded packet. The information about the current sliding window indicates information about a sliding window used by the forwarding node R for recoding. In some scenarios, the identification information of the encoded packet and the encoding coefficient indication information are the same information. For example, when the encoded packet is a system packet, the identification information of the encoded packet may be used as the encoding coefficient indication information corresponding to the data packet in the encoded packet.

In addition, the forwarding node R further generates corresponding recoding indication information for each current sliding window. The recoding indication information includes a union set of data packets in a sliding window of a previous hop for obtaining the encoded packets in the current sliding window through encoding, and encoding coefficient indication information corresponding to each encoded packet in the current sliding window (or referred to as encoding coefficient indication information corresponding to a data packet in the encoded packet).

For example, a header of the encoded packet $P_1$ may carry information about a current sliding window (identification information of $S_1$, $S_3$, $C_1$, and $S_4$), information about a quantity (4) of data packets in the current sliding window, identification information of the encoded packet $P_1$, and encoding coefficient indication information corresponding to the encoded packet $P_1$. The header of the encoded packet $P_1$ or other content (for example, an associated PDU) associated with the encoded packet $P_1$ may carry a union set (that is, $X_1$, $X_2$, $X_3$, $X_4$, $X_5$, and $X_6$) of data packets in a sliding window of a previous hop for obtaining the encoded packets in the current sliding window through encoding, and encoding coefficient indication information corresponding to each encoded packet in the information about the current sliding window: $S_1$, $S_3$, $C_1$, and $S_4$.

For another example, a header of the encoded packet $P_2$ may carry information about a quantity (7) of data packets in a current sliding window, information about the current sliding window (identification information of $S_1$, $S_3$, $C_1$, $S_4$, $S_5$, $S_6$, and $C_2$), identification information of the encoded packet $P_2$, and encoding coefficient indication information corresponding to the encoded packet $P_2$. The header of the encoded packet $P_2$ or other content (for example, an associated PDU) associated with the encoded packet $P_2$ may carry a union set (that is, $X_1$, $X_2$, $X_3$, $X_4$, $X_5$, and $X_6$) of data packets in a sliding window of a previous hop for obtaining the encoded packets in the current sliding window through encoding, and encoding coefficient indication information corresponding to each encoded packet in the information about the current sliding window: $S_1$, $S_3$, $C_1$, $S_4$, $S_5$, $S_6$, and $C_2$.

The forwarding node R sends the encoded packets $R_1$, $R_2$, $R_3$, $R_4$, $P_1$, $R_5$, $R_6$, $R_7$, $P_2$, $R_8$, $R_9$, $R_{10}$, and $P_3$. When the recoding indication information is not carried in the encoded packets, the forwarding node further sends the recoding indication information.

It is assumed that the destination node D receives the encoded packets $R_2$, $R_3$, $R_4$, $P_1$, $R_5$, $R_6$, $P_2$, $R_8$, $R_9$, $R_{10}$, and $P_3$, that is, fails in receiving the encoded packets $R_1$ and $R_7$. When the recoding indication information is not carried in the encoded packets, the destination node further receives the corresponding recoding indication information. The destination node D may decode the received encoded packets.

For example, because sliding windows of $R_2$, $R_3$, $R_4$, and $P_1$ are the same (all are $S_1$, $S_3$, $C_1$, and $S_4$), the destination node D may perform decoding based on $R_2$, $R_3$, $R_4$, $P_1$, and may determine, based on headers of $R_2$, $R_3$, $R_4$, and $P_1$, that encoding coefficient vectors corresponding to the four encoded packets are respectively $[0\ 1\ 0\ 0]^T$, $[0\ 1\ 0]^T$ $[0\ 0\ 0]^T$, and $[r_{11}\ r_{21}\ r_{31}\ r_{41}]^T$. Therefore, an encoding matrix of a previous hop of the destination node D is $$\begin{bmatrix} 0 & 0 & 0 & r_{11} \\ 1 & 0 & 0 & r_{21} \\ 0 & 1 & 0 & r_{31} \\ 0 & 0 & 1 & r_{41} \end{bmatrix}.$$

In addition, the destination node D may determine, based on the recoding indication information corresponding to the four encoded packets, that encoding coefficient vectors of $S_1$, $S_3$, $C_1$, and $S_4$ in the sliding window of $R_2$, $R_3$, $R_4$, and $P_1$ are respectively $[1\ 0\ 0\ 0]^T$, $[0\ 0\ 1\ 0]^T$, $[s_{11}\ s_{21}\ s_{31}\ s_{41}]^T$, and $[0\ 0\ 0\ 1]^T$. Therefore, an encoding matrix of a hop before the previous hop of the destination node is $$\begin{bmatrix} 1 & 0 & s_{11} & 0 \\ 0 & 0 & s_{21} & 0 \\ 0 & 1 & s_{31} & 0 \\ 0 & 0 & s_{41} & 1 \end{bmatrix},$$

and a decoding matrix at the destination node is an inverse matrix of a matrix obtained by sequentially multiplying encoding matrices of the previous hops, that is, $$\left[\begin{bmatrix} 1 & 0 & s_{11} & 0 \\ 0 & 0 & s_{21} & 0 \\ 0 & 1 & s_{31} & 0 \\ 0 & 0 & s_{41} & 1 \end{bmatrix} \cdot \begin{bmatrix} 0 & 0 & 0 & r_{11} \\ 1 & 0 & 0 & r_{21} \\ 0 & 1 & 0 & r_{31} \\ 0 & 0 & 1 & r_{41} \end{bmatrix}\right]^{-1} \text{ or } \left[\begin{bmatrix} 0 & 0 & 0 & r_{11} \\ 1 & 0 & 0 & r_{21} \\ 0 & 1 & 0 & r_{31} \\ 0 & 0 & 1 & r_{41} \end{bmatrix} \cdot \begin{bmatrix} 1 & 0 & s_{11} & 0 \\ 0 & 0 & s_{21} & 0 \\ 0 & 1 & s_{31} & 0 \\ 0 & 0 & s_{41} & 1 \end{bmatrix}\right]^{-1}.$$

The destination node may obtain the original packets $X_1$, $X_2$, $X_3$, and $X_4$ by decoding $R_2$, $R_3$, $R_4$, and $P_1$ by using the decoding matrix. A manner of obtaining other original packets is similar. Details are not described herein again.

FIG. 12 is a flowchart of a first example of a communication method according to Embodiment 2 of this application. In FIG. 12, the following example is used for description: A $t^{th}$ piece of first information in T pieces of first information corresponds to a $t^{th}$ data packet in T data packets, a $k^{th}$ data packet in K data packets corresponds to a $k^{th}$ encoding coefficient group in K encoding coefficient groups, and an $e^{th}$ piece of second information in E pieces of second information corresponds to an $e^{th}$ target data packet in E target data packets. Herein, t is an integer and is sequentially selected from 1 to T, e is an integer and is sequentially selected from 1 to E, and k is an integer and is sequentially selected from 1 to K.

The communication method shown in FIG. 12 may include steps S1201, S1202, S1203, and S1204. In the communication method shown in FIG. 12, a communication node that performs the communication method may be a transit node or a forwarding node in a multi-hop scenario. For example, the communication node may be any radio access point in the application scenario shown in FIG. 2.

S1201: The communication node receives the T data packets and the T pieces of first information. The $t^{th}$ piece of first information in the T pieces of first information indicates an encoding coefficient group of the $t^{th}$ data packet in the T data packets relative to K to-be-encoded data packets. Herein, K is a positive integer, T is an integer greater than or equal to K, and t is an integer and is sequentially selected from 1 to T.

S1202: The communication node obtains E first encoding coefficient groups, where each of the E first encoding coefficient groups includes K encoding coefficients; and determines E second encoding coefficient groups based on the E first encoding coefficient groups and T encoding coefficient groups indicated by the T pieces of first information. Herein, the E second encoding coefficient groups, the E first encoding coefficient groups, and the T encoding coefficient groups satisfy the following relationship:

$$[f_1 \ \dots \ f_e \ \dots \ f_E] = [l_1 \ \dots \ l_k \ \dots \ l_K]^{-1}[h_1 \ \dots \ h_e \ \dots \ h_E].$$

Herein, $l_k$ represents a $k^{th}$ encoding coefficient group in K encoding coefficient groups in the T encoding coefficient groups, $h_e$ represents an $e^{th}$ first encoding coefficient group in the E first encoding coefficient groups, $[l_1 \ldots l_k \ldots l_K]^{-1}$ represents an inverse matrix of a matrix in which K encoding coefficient groups from $l_1$ to $l_K$ are K column vectors, $f_e$ represents an $e^{th}$ second encoding coefficient group in the E second encoding coefficient groups, k is an integer and is sequentially selected from 1 to K, and e is an integer and is sequentially selected from 1 to E.

In an example, the communication node generates a second encoding coefficient group. For example, the communication node selects one encoding coefficient group from the encoding coefficient group set as a first encoding coefficient group. In addition, the communication node obtains the T encoding coefficient groups based on the T pieces of first information, uses K encoding coefficient vectors in a one-to-one correspondence with the K encoding coefficient groups in the T encoding coefficient groups as K column vectors to form an encoding coefficient matrix, and calculates a product of an inverse matrix of the matrix and the first encoding coefficient group. One or more encoding coefficients included in an encoding coefficient vector obtained through calculation form the second encoding coefficient group.

S1203: The communication node encodes the K data packets in the T data packets based on the E second encoding coefficient groups to obtain E target data packets. The E target data packets, the E second encoding coefficient groups, and the T data packets satisfy the following relational expression:

$$[Y_1 \ \dots \ Y_e \ \dots \ Y_E] = [R_1 \ \dots \ R_k \ \dots \ R_K][f_1 \ \dots \ f_e \ \dots \ f_E].$$

Herein, $Y_e$ represents an $e^{th}$ target data packet in the E target data packets, and $R_k$ represents a $k^{th}$ data packet in the K data packets.

S1204: The communication node sends the E target data packets and the E pieces of second information. An $e^{th}$ piece of second information in the E pieces of second information includes first sub information. The first sub information in the $e^{th}$ piece of second information indicates an $e^{th}$ first encoding coefficient group in the E first encoding coefficient groups. The $e^{th}$ first encoding coefficient group is an encoding coefficient group of the $e^{th}$ target data packet in the E target data packets relative to the K to-be-encoded data packets.

In this embodiment, because $[l_1 \ldots l_k \ldots l_K]^{-1}[h_1 \ldots h_e \ldots h_E]$ is calculation at an encoding coefficient group data volume level, and $[R_1 \ldots R_k \ldots R_K][f_1 \ldots f_e \ldots f_E]$ is calculation at a data packet data volume level, calculation at the data packet data volume level needs to be performed only once in an encoding process of the method.

In an encoding method in which $[R_1 \ldots R_k \ldots R_K][l_1 \ldots l_k \ldots l_K]^{-1}$ is calculated first and then a product of the result and $[h_1 \ldots h_e \ldots h_E]$ is calculated, because a process of calculating $[R_1 \ldots R_k \ldots R_K][l_1 \ldots l_k \ldots l_K]^{-1}$ is calculation at the data packet data volume level, and a calculation result is also a value at the data packet data volume level, a process of calculating the product of the result and $[h_1 \ldots h_e \ldots h_E]$ also includes calculation at the data packet data volume level. In other words, this recoding method requires two times of calculation at the data packet data volume level.

According to the communication method in this embodiment, a quantity of times of calculation at the data packet data volume level can be reduced. In addition, a data packet data volume is relatively large. Therefore, according to the method in this application, a recoding computing resource of the communication node can be saved, and recoding efficiency of the communication node can be improved.

In this embodiment, the first sub information may indicate the first encoding coefficient group in a plurality of manners. In a first implementation in which the first sub information indicates the first encoding coefficient group, the first sub information includes a second encoding coefficient group.

In a second implementation in which the first sub information indicates the first encoding coefficient group, the first sub information includes an index of the first encoding coefficient group in a preset encoding coefficient group set. For related content of the preset encoding coefficient group set in this embodiment, refer to related content of the preset encoding coefficient group set in the embodiment shown in FIG. 4A and FIG. 4B.

In a third implementation in which the first sub information indicates the first encoding coefficient group, the first sub information includes identification information of a target data packet, and the identification information and an index of the second encoding coefficient group in the preset encoding coefficient group set satisfy a preset relationship.

In the second or third implementation in which the first sub information indicates the first encoding coefficient group, optionally, the second information further includes second sub information, and the second sub information indicates the preset encoding coefficient group set.

In this embodiment, when sending the second information, the communication node may further send one or more of the following information: an SN, encoding block indication information (for example, a block ID/group ID) or sliding window indication information (for example, Window indicator), indication information of a quantity of to-be-encoded data packets, and encoded packet type indication information.

The SN indicates a transmission sequence of an encoded packet. The encoded packet includes a system packet and a check packet. In an example, the SN is carried in both a header of the system packet and a header of the check packet.

The communication node groups data packets that need to be sent. Each group includes a plurality of data packets. The encoding block indication information indicates a group identifier of a group in which a data packet is located. Network encoding is independently performed for different groups. If a group identifier of to-be-encoded data packets is represented by using a block ID, headers of a plurality of encoded packets generated by performing network encoding on the group of data packets carry the block ID indication information. The plurality of encoded packets carry the same block ID. In this way, the communication node that receives the plurality of encoded packets can learn that the plurality of encoded packets are obtained by performing network encoding on original packets in a same network encoding group, to learn of specific received data packets that participate in recoding. Alternatively, the destination node can learn of, based on the block ID indication information, specific received data packets that participate in decoding.

The sliding window indication information (sliding window information for short) indicates identifiers of data packets that are encoded together. In an example, the indication information may include a window tail location and a window head location. For example, identification information of a first data packet in the K to-be-encoded data packets and identification information of a final data packet in the K data packets indicate that the K data packets are located in a same sliding window. It is assumed that X_1 represents a first data packet, and X_K represents a K data packet. The indication information may include an SN number of X_1 and an SN number of X_K.

In a second example, the sliding window indication information may include a window head and a window length. The window length is a quantity of data packets in the window. For example, the identification information of the final data packet in the K data packets and the window length indicate the K data packets located in the same sliding window. In this case, the sliding window indication information may include the SN number of X_K and the window length (that is, K).

In a third example, the sliding window indication information may include a window tail and a window length. To be specific, the identification information of the first data packet in the K data packets and the window length indicate the K data packets located in the same sliding window. In this case, the sliding window indication information includes the SN number of X_1 and the window length.

In the second example and the third example, if the window length is a fixed value, a preset value, a semi-statically configured value, or a value negotiated in advance by a transmit party and a receive party, the identification information may include only the window head or the window tail.

For group network encoding, the quantity K of to-be-encoded data packets may be preset, semi-statically configured, or negotiated in advance by the receive party and the transmit party, or may dynamically change. Generally, a quantity of data packets to be encoded at a forwarding node is usually not fixed. If the quantity K of to-be-encoded data packet is preset, semi-statically configured, or negotiated in advance by the receive party and the transmit party, a header of a check packet or the encoded packet may not carry indication information of a quantity of to-be-encoded data packets. If the quantity K of to-be-encoded data packets dynamically changes, in consideration of impact of a packet loss factor, the header of the check packet or the encoded packet further needs to carry the indication information of the quantity of to-be-encoded data packets. Herein, an "Original Pkt Num" field may be used to indicate the indication information of the quantity of to-be-encoded data packets.

For sliding window network encoding, the sliding window indication information implicitly indicates the quantity of to-be-encoded data packets.

The encoded packet type indication information is used by a receive end to identify whether a received encoded packet is a system packet or a check packet. An encoded packet obtained by adding an encoded packet header to a packet obtained by encoding a to-be-sent data packet by using an encoding coefficient in a unit vector is referred to as a system packet; or a data packet obtained by directly adding an encoded packet header to a to-be-sent data packet without encoding processing is referred to as a system packet. An encoded packet obtained by adding an encoded packet header to a packet obtained by encoding a to-be-sent data packet by using an encoding coefficient in a non-unit vector is referred to as a redundant packet or a check packet.

Figure 13:
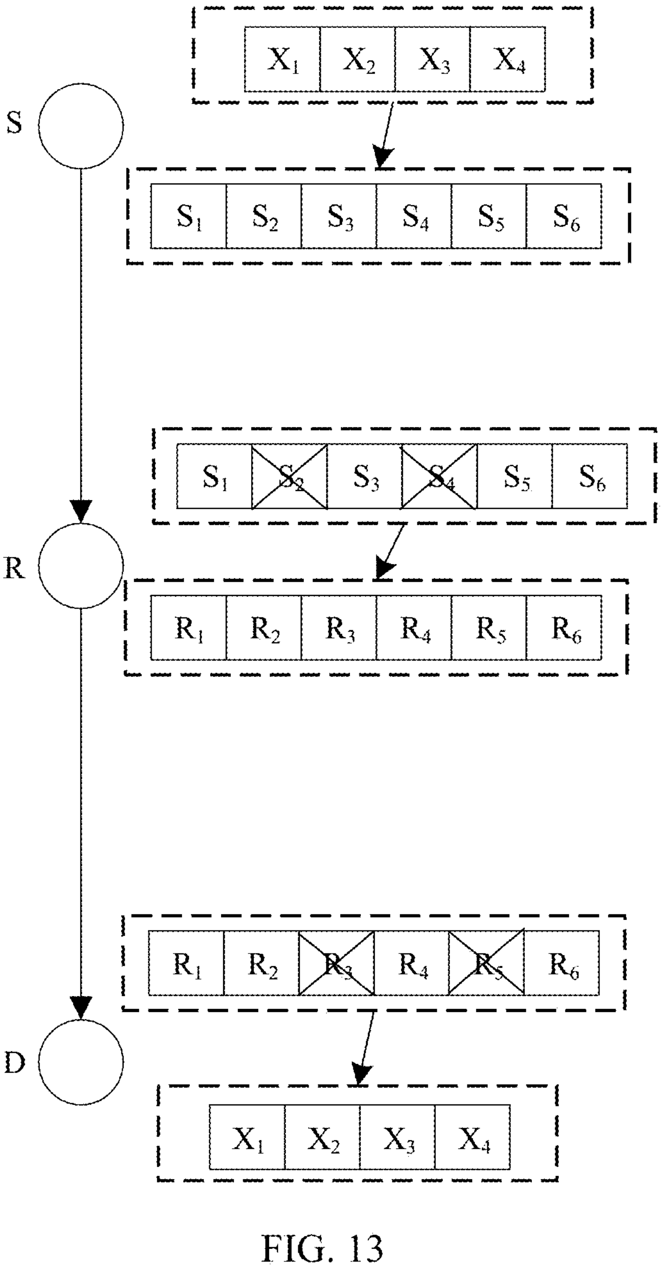
FIG. 13 is a flowchart of a second example of a communication method according to Embodiment 2 of this application.

FIG. 13 is a flowchart of a second example of a communication method according to Embodiment 2 of this application. FIG. 13 mainly describes a communication method for transmitting an original packet from a source node to a destination node in a multi-hop scenario. In this scenario, the source node and a forwarding node perform encoding in a group encoding manner or a sliding window manner.

In this embodiment, the source node S needs to send four original packets to the destination node D. The four original packets are represented as $X_1$, $X_2$, $X_3$, and $X_4$. The source node S encodes the four original packets by using a determined codebook to obtain six encoded packets $S_1$, $S_2$, $S_3$, $S_4$, $S_5$, and $S_6$. For related content of obtaining $S_1$, $S_2$, $S_3$, $S_4$, $S_5$, and $S_6$ through encoding by the source node S, refer to related content in the embodiment shown in FIG. 9.

The source node S sends the six encoded packets $S_1$, $S_2$, $S_3$, $S_4$, $S_5$, and $S_6$ to the forwarding node R. A header of each encoded packet carries encoding coefficient indication information, encoding block indication information, quantity indication information, and encoded packet type information. For related content of this step, refer to related content in the embodiment shown in FIG. 9.

It is assumed that the forwarding node R receives the encoded packets $S_1$, $S_3$, $S_5$, and $S_6$, it may be determined, based on the encoding block indication information in the four encoded packets, that the four encoded packets are encoded packets obtained by encoding a same encoding block. Data packets $S'_1$, $S'_3$, $S'_5$, and $S'_6$ in the four encoded packets are recoded (recoding).

When recoding $S'_1$, $S'_3$, $S'_5$, and $S'_6$, the forwarding node R first determines that an encoding matrix of $S'_1$, $S'_3$, $S'_5$, and $S'_6$ on the source node S is $$\begin{bmatrix} 1 & 0 & s_{11} & s_{21} \\ 0 & 0 & s_{21} & s_{22} \\ 0 & 1 & s_{31} & s_{31} \\ 0 & 0 & s_{41} & s_{42} \end{bmatrix},$$

and then encodes $S'_1$, $S'_3$, $S'_5$, and $S'_6$ by using a first encoding matrix to obtain a data packet $R'_1$, where the first encoding matrix is represented as $$\begin{bmatrix} 1 & 0 & s_{11} & s_{21} \\ 0 & 0 & s_{21} & s_{22} \\ 0 & 1 & s_{31} & s_{31} \\ 0 & 0 & s_{41} & s_{42} \end{bmatrix}^{-1} \cdot \begin{bmatrix} 1 \\ 0 \\ 0 \\ 0 \end{bmatrix};$$

encodes $S'_1$, $S'_3$, $S'_5$, and $S'_6$ by using a second encoding matrix to obtain a data packet $R'_2$, where the second encoding matrix is represented as $$\begin{bmatrix} 1 & 0 & s_{11} & s_{21} \\ 0 & 0 & s_{21} & s_{22} \\ 0 & 1 & s_{31} & s_{31} \\ 0 & 0 & s_{41} & s_{42} \end{bmatrix}^{-1} \cdot \begin{bmatrix} 0 \\ 1 \\ 0 \\ 0 \end{bmatrix};$$

by analogy, encodes $S'_1$, $S'_3$, $S'_5$, and $S'_6$ by using a fifth encoding matrix to obtain a data packet $R'_5$, where the fifth encoding matrix is $$\begin{bmatrix} 1 & 0 & s_{11} & s_{21} \\ 0 & 0 & s_{21} & s_{22} \\ 0 & 1 & s_{31} & s_{31} \\ 0 & 0 & s_{41} & s_{42} \end{bmatrix}^{-1} \cdot \begin{bmatrix} r_{11} \\ r_{21} \\ r_{31} \\ r_{41} \end{bmatrix};$$

and encode $S'_1$, $S'_3$, $S'_5$, and $S'_6$ by using a sixth encoding matrix to obtain a data packet $R'_6$. The sixth encoding matrix is $$\begin{bmatrix} 1 & 0 & s_{11} & s_{21} \\ 0 & 0 & s_{21} & s_{22} \\ 0 & 1 & s_{31} & s_{31} \\ 0 & 0 & s_{41} & s_{42} \end{bmatrix}^{-1} \cdot \begin{bmatrix} r_{12} \\ r_{22} \\ r_{32} \\ r_{42} \end{bmatrix}.$$

Herein, $$\begin{bmatrix} r_{11} \\ r_{21} \\ r_{31} \\ r_{41} \end{bmatrix} \text{ or } \begin{bmatrix} r_{12} \\ r_{22} \\ r_{32} \\ r_{42} \end{bmatrix}$$

is an encoding coefficient vector in the determined codebook.

The forwarding node R sends $R_1$, $R_2$, $R_3$, $R_4$, $R_5$, and $R_6$ in a one-to-one correspondence with $R'_1$, $R'_2$, $R'_3$, $R'_4$, $R'_5$, and $R'_6$ to a next-hop node (the destination node D). In addition, a header of each encoded packet indicates an encoding coefficient vector in the determined codebook used in an encoding matrix corresponding to the encoded packet. For example, a header of $R_5$ indicates an index in the determined codebook or packet identification information. The index is an index corresponding to $$\begin{bmatrix} r_{11} \\ r_{21} \\ r_{31} \\ r_{41} \end{bmatrix}$$

in the fifth encoding matrix $$\begin{bmatrix} 1 & 0 & s_{11} & s_{21} \\ 0 & 0 & s_{21} & s_{22} \\ 0 & 1 & s_{31} & s_{31} \\ 0 & 0 & s_{41} & s_{42} \end{bmatrix}^{-1} \cdot \begin{bmatrix} r_{11} \\ r_{21} \\ r_{31} \\ r_{41} \end{bmatrix}$$

in the determined codebook, or the packet identification information indicates a specific encoded packet of $R_5$ in $R_1$, $R_2$, $R_3$, $R_4$, $R_5$, and $R_6$. The packet identification information also corresponds to an index of $$\begin{bmatrix} r_{11} \\ r_{21} \\ r_{31} \\ r_{41} \end{bmatrix}$$

in the determined codebook.

After receiving the four encoded packets $R_1$, $R_2$, $R_4$, and $R_6$ sent by the forwarding node R, the destination node D may obtain original packets $X_1$, $X_2$, $X_3$, and $X_4$ through restoration based on $R_1$, $R_2$, $R_4$, and $R_6$.

For example, the destination node D may obtain respective encoding coefficient vectors, that is, $$\begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 0 \\ 1 \end{bmatrix}, \text{ and } \begin{bmatrix} r_{12} \\ r_{22} \\ r_{32} \\ r_{42} \end{bmatrix}$$

based on headers of the received $R_1$, $R_2$, $R_4$, and $R_6$, to obtain a decoding matrix $$\begin{bmatrix} 1 & 0 & 0 & r_{21} \\ 0 & 0 & 0 & r_{22} \\ 0 & 1 & 0 & r_{31} \\ 0 & 0 & 1 & r_{42} \end{bmatrix}.$$

The destination node D decodes, based on the decoding matrix, the data packets $R_1$, $R_2$, $R_4$, and $R_6$ included in $R_1$, $R_2$, $R_4$, and $R_6$ to obtain the original packets $X_1$, $X_2$, $X_3$, and $X_4$.

Figure 14:
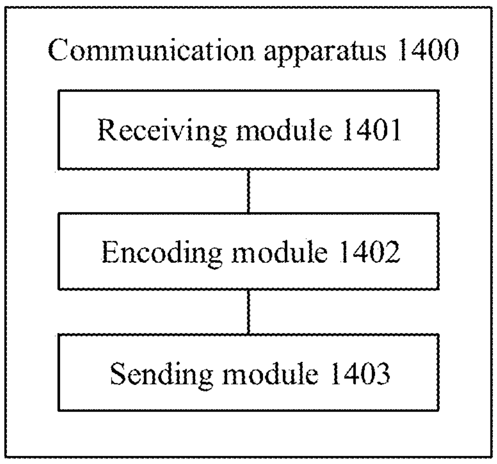
FIG. 14 is a diagram of an example structure of a communication apparatus according to an embodiment of this application.

FIG. 14 is a schematic diagram of a structure of a communication apparatus according to an embodiment of this application. As shown in FIG. 14, a communication apparatus 1400 includes a receiving module 1401, an encoding module 1402, and a sending module 1403.

In a first example, the communication apparatus 1400 may be configured to implement the communication method implemented by any node in the embodiment shown in FIG. 4A and FIG. 4B. The receiving module 1401 may be configured to perform a receiving operation, the encoding module 1402 may be configured to perform an encoding operation, and the sending module 1403 may be configured to perform a sending step.

In a second example, the communication apparatus 1400 may be configured to implement the communication method implemented by any node before the node D in the embodiment shown in FIG. 8A and FIG. 8B. The receiving module 1401 may be configured to perform a receiving operation, the encoding module 1402 may be configured to perform an encoding operation, and the sending module 1403 may be configured to perform a sending step.

In a third example, the communication apparatus 1400 may be configured to implement the communication method implemented by the communication node in the embodiment shown in FIG. 12. The receiving module 1401 may be configured to perform step S1201, the encoding module 1402 may be configured to perform steps S1202 and S1203, and the sending module 1403 may be configured to perform step S1204.

In a fourth example, the communication apparatus 1400 may be configured to implement operations performed by the forwarding node R in the embodiment shown in FIG. 13 or any one of FIG. 9 to FIG. 11.

Figure 15:
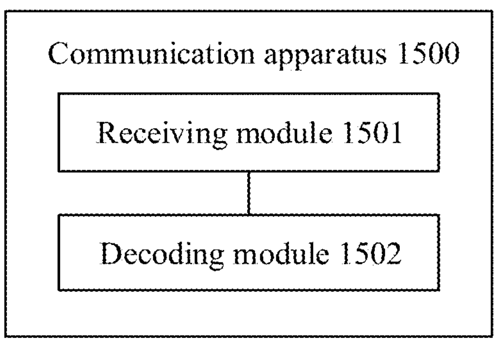
FIG. 15 is a diagram of an example structure of a communication apparatus according to another embodiment of this application.

FIG. 15 is a schematic diagram of a structure of a communication apparatus according to another embodiment of this application. As shown in FIG. 15, the communication apparatus 1500 includes a receiving module 1501 and a decoding module 1502.

In a first example, the communication apparatus 1500 may be configured to implement the communication method implemented by the node D in the embodiment shown in FIG. 8A and FIG. 8B. The receiving module 1501 may be configured to perform a receiving operation, and the decoding module 1502 may be configured to perform a decoding operation.

In a second example, the communication apparatus 1500 may be configured to implement operations performed by the destination node D in the embodiment shown in FIG. 13 or any one of FIG. 9 to FIG. 11.

Figure 16:
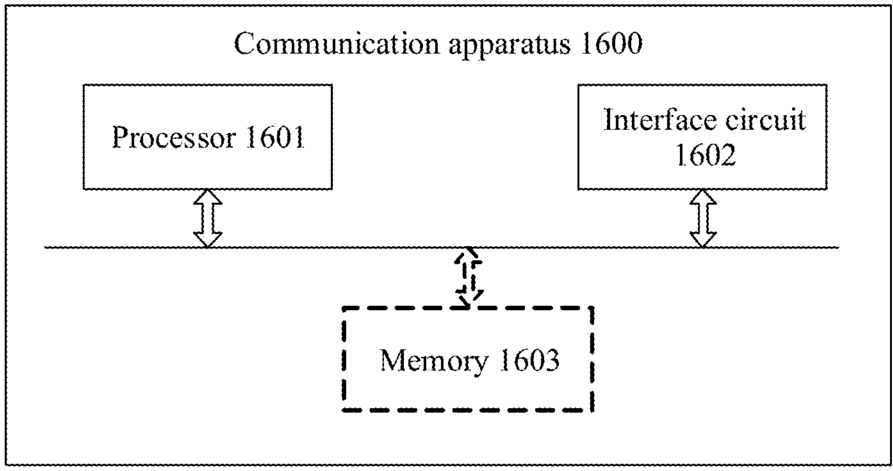
FIG. 16 is a diagram of an example structure of a communication apparatus according to still another embodiment of this application.

FIG. 16 is a schematic diagram of a structure of a communication apparatus according to still another embodiment of this application. As shown in FIG. 16, the communication apparatus 1600 includes a processor 1601 and an interface circuit 1602. The processor 1601 and the interface circuit 1602 are coupled to each other. It may be understood that the interface circuit 1602 may be a transceiver or an input/output interface. Optionally, the communication apparatus 1600 may further include a memory 1603, configured to: store instructions executed by the processor 1601, store input data required by the processor 1601 to run instructions, or store data generated after the processor 1601 runs instructions.

In an example, the processor 1601 is configured to implement functions of the encoding module 1402, and the interface circuit 1602 is configured to implement functions of the receiving module 1401 and the sending module 1403.

In another example, the processor 1601 is configured to implement functions of the decoding module 1502, and the interface circuit 1602 is configured to implement functions of the receiving module 1501.

The communication apparatus 1600 may be a communication device, or may be a chip used in a communication device.

It may be understood that the processor in embodiments of this application may be a central processing unit (CPU), or may be another general-purpose processor, a digital signal processor (DSP), an application specific integrated circuit (ASIC), a field programmable gate array (FPGA) or another programmable logic device, a transistor logic device, a hardware component, or any combination thereof. The general-purpose processor may be a microprocessor, or may be any conventional processor.

The method steps in embodiments of this application may be implemented in a hardware manner, or may be implemented in a manner of executing software instructions by the processor. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. For example, the storage medium is coupled to the processor, so that the processor can read information from the storage medium and write information into the storage medium. Certainly, the storage medium may be alternatively a component of the processor. The processor and the storage medium may be located in an ASIC. In addition, the ASIC may be located in a network device or a terminal device. Certainly, the processor and the storage medium may exist in a network device or a terminal device as discrete components.

All or some of the foregoing embodiments may be implemented by using software, hardware, firmware, or any combination thereof. When the software is used to implement embodiments, all or some of embodiments may be implemented in a form of a computer program product. The computer program product includes one or more computer programs or instructions. When the computer programs or instructions are loaded and executed on a computer, all or some of the procedures or functions in embodiments of this application are executed. The computer may be a general-purpose computer, a dedicated computer, a computer network, a network device, a user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired or wireless manner. The computer-readable storage medium may be any usable medium accessible by a computer, or a data storage device integrating one or more usable media, for example, a server or a data center. The usable medium may be a magnetic medium, for example, a floppy disk, a hard disk, or a magnetic tape; or may be an optical medium, for example, a digital video disc; or may be a semiconductor medium, for example, a solid state drive.

In embodiments of this application, if there are no special statements and logic conflicts, terms and/or descriptions between different embodiments are consistent and may be mutually referenced, and technical features in different embodiments may be combined based on an internal logical relationship thereof, to form a new embodiment.

It may be understood that various numbers in embodiments of this application are merely used for differentiation for ease of description, and are not used to limit the scope of embodiments of this application. The sequence numbers of the foregoing processes do not mean execution sequences. The execution sequences of the processes should be determined based on functions and internal logic of the processes.

What is claimed is:

1. A communication method applied to a communication apparatus, the method comprising:

receiving T data packets and T pieces of first information, wherein the T data packets are in a one-to-one correspondence with the T pieces of first information, wherein each of the T pieces of first information indicates an encoding coefficient group of a data packet in the T data packets corresponding to a piece of the T pieces of first information relative to K to-be-encoded data packets, K is a positive integer greater than 1, and T is an integer greater than or equal to K;

obtaining E first encoding coefficient groups, wherein each of the E first encoding coefficient groups comprises K encoding coefficients;

determining E second encoding coefficient groups based on the E first encoding coefficient groups and T encoding coefficient groups indicated by the T pieces of first information, wherein the E second encoding coefficient groups, the E first encoding coefficient groups, and the T encoding coefficient groups satisfy the following relationship:

$$[f_1 \ \dots \ f_e \ \dots \ f_E] = [l_1 \ \dots \ l_k \ \dots \ l_K]^{-1}[h_1 \ \dots \ h_e \ \dots \ h_E],$$

wherein $l_k$ represents a $k^{th}$ encoding coefficient group in K encoding coefficient groups in the T encoding coefficient groups, $h_e$ represents an $e^{th}$ first encoding coefficient group in the E first encoding coefficient groups, $[l_1 \dots l_k \dots l_K]^{-1}$ represents an inverse matrix of a matrix in which K encoding coefficient groups from $l_1$ to $l_K$ are K column vectors, $f_e$ represents an $e^{th}$ second encoding coefficient group in the E second encoding coefficient groups, k is an integer and is sequentially selected from 1 to K, and e is an integer and is sequentially selected from 1 to E;

encoding K data packets in the T data packets based on the E second encoding coefficient groups to obtain E target data packets, wherein the K data packets are in a one-to-one correspondence with the K encoding coefficient groups, and the E target data packets, the E second encoding coefficient groups, and the T data packets satisfy the following relational expression:

$$[Y_1 \ \dots \ Y_e \ \dots \ Y_E] = [R_1 \ \dots \ R_k \ \dots \ R_K][f_1 \ \dots \ f_e \ \dots \ f_E],$$

wherein $Y_e$ represents an $e^{th}$ target data packet in the E target data packets, and $R_k$ represents a $k^{th}$ data packet in the K data packets; and sending the E target data packets and E pieces of second information that are in a one-to-one correspondence with the E target data packets, wherein each of the E pieces of second information comprises first sub information indicating a first encoding coefficient group, wherein the first encoding coefficient group is of a target data packet corresponding to a piece of the E pieces of second information and is in the E first encoding coefficient groups, and wherein the first encoding coefficient group is an encoding coefficient group of the target data packet relative to the K to-be-encoded data packets.

2. The communication method according to claim 1, wherein the first sub information comprises the first encoding coefficient group.

3. The communication method according to claim 1, wherein the first sub information comprises an index, in a preset encoding coefficient group set, of the first encoding coefficient group.

4. The communication method according to claim 1, wherein the first sub information comprises identification information of the target data packet, and the identification information and an index, in a preset encoding coefficient group set, of the first encoding coefficient group satisfy a preset relationship.

5. The communication method according to claim 3, wherein each of the E pieces of second information further comprises second sub information, and the second sub information indicates version information of the preset encoding coefficient group set.

6. A communication method applied to a communication apparatus, the method comprising:

receiving $G_D$ data packets and D pieces of first information from a first communication node, wherein the first communication node is a start node of a $D^{th}$ hop in D hop transmission, wherein in the D hop transmission, a start node of a first hop is configured to encode $G_0$ data packets and send encoded $G_0$ data packets, wherein in the D hop transmission, an end node of a $d^{th}$ hop is configured to encode $G_d$ data packets from a start node of a $d^{th}$ hop and send encoded $G_d$ data packets, wherein the end node of the $d^{th}$ hop is a start node of a $(d+1)^{th}$ hop, wherein the D pieces of first information comprise D−1 pieces of first information that are in a one-to-one correspondence with D−1 previous hops in the D hop transmission and first information corresponding to the $G_D$ data packets, wherein first information corresponding to a $d^{th}$ hop in the D−1 hops comprises $G_d$ pieces of first sub information, wherein the $G_d$ pieces of first sub information are in a one-to-one correspondence with the $G_d$ to-be-encoded data packets of the end node of the $d^{th}$ hop, wherein each of the $G_d$ pieces of first sub information indicates an encoding coefficient group of a data packet corresponding to the first sub information in the $G_d$ data packets relative to a plurality of to-be-encoded data packets of the start node of the $d^{th}$ hop, wherein the first information corresponding to the $G_D$ data packets comprises $G_D$ pieces of second sub information, wherein the $G_D$ pieces of second sub information are in a one-to-one correspondence with the $G_D$ data packets, wherein each of the $G_D$ pieces of second sub information indicates an encoding coefficient group of a data packet corresponding to the second sub information in the $G_D$ data packets relative to to-be-encoded data packets of the first communication node, wherein $G_0$, $G_d$, $G_D$, and D are all positive integers, d takes no value when D is 1, and d is selected from 1 to D−1 when D is greater than 1;

encoding the $G_D$ data packets by using U encoding coefficient groups to obtain U data packets, wherein each of the U encoding coefficient groups comprises $G_D$ encoding coefficients, the U data packets are in a one-to-one correspondence with the U encoding coefficient groups, and U is a positive integer; and sending D+1 pieces of first information and the U data packets, wherein the D+1 pieces of first information comprise the D−1 pieces of first information, first information corresponding to the $D^{th}$ hop, and first information corresponding to the U data packets, wherein the first information corresponding to the $D^{th}$ hop comprises $G_D$ pieces of first sub information, wherein the $G_D$ pieces of first sub information are in a one-to-one correspondence with the $G_D$ data packets, wherein each of the $G_D$ pieces of first sub information indicates an encoding coefficient group of a corresponding data packet in the $G_D$ data packets relative to the to-be-encoded data packets of the first communication node, wherein the first information corresponding to the U data packets comprises U pieces of second sub information that are in a one-to-one correspondence with the U encoding coefficient groups, and wherein each of the U pieces of second sub information indicates a corresponding encoding coefficient group in the U encoding coefficient groups.

7. The communication method according to claim 6, wherein each of the U encoding coefficient groups is an encoding coefficient group in a first preset encoding coefficient group set.

8. The communication method according to claim 7, wherein each of the U pieces of second sub information comprises an index; in the first preset encoding coefficient group set, and wherein the index is of an encoding coefficient group of a data packet corresponding to the second sub information in the U encoding coefficient groups.

9. The communication method according to claim 7, wherein each of the U pieces of second sub information comprises identification information of a data packet that corresponds to the second sub information and that is in the U data packets, wherein the identification information of and an index in the first preset encoding coefficient group set satisfy a first preset relationship, and wherein the index is of an encoding coefficient group of a data packet corresponding to the second sub information in the U encoding coefficient groups.

10. The communication method according to claim 7, wherein the first information corresponding to the U data packets further comprises: third sub information which indicates version information of the first preset encoding coefficient group set.

11. The communication method according to claim 6, wherein an encoding coefficient group of each of the $G_D$ data packets relative to the to-be-encoded data packets of the first communication node is an encoding coefficient group in a second preset encoding coefficient group set.

12. The communication method according to claim 11, wherein the first information corresponding to the $D^{th}$ hop comprises $B_D$ fields, wherein the $G_D$ pieces of first sub information are in a one-to-one correspondence with $G_D$ fields in the $B_D$ fields, wherein an index and a location satisfy a second preset relationship, wherein the index is in the second preset encoding coefficient group set, and is of an encoding coefficient group indicated by each of the $G_D$ pieces of first sub information, wherein the location is in the $B_D$ fields, and is of a corresponding field in the $B_D$ fields, and wherein a value of each of the $G_D$ fields is a first preset value, a value of any field other than the $G_D$ fields in the $B_D$ fields is a second preset value, and $B_D$ is an integer greater than or equal to $G_D$.

13. The communication method according to claim 12, wherein $B_D$ is a third preset value.

14. The communication method according to claim 12, wherein the first information corresponding to the $D^{th}$ hop further comprises fourth sub information, and the fourth sub information indicates a value of $B_D$.

15. The communication method according to claim 11, wherein each of the $G_D$ pieces of first sub information comprises identification information of a corresponding data packet in the $G_D$ data packets, wherein the identification information and an index in the preset encoding coefficient group set satisfy a third preset relationship, and wherein the index is of an encoding coefficient group indicated by each of the $G_D$ pieces of first sub information.

16. The communication method according to claim 15, wherein the first information corresponding to the $D^{th}$ hop further comprises fifth sub information which indicates a value of $G_D$.

17. The communication method according to claim 11, wherein the first information corresponding to the $D^{th}$ hop further comprises sixth sub information which indicates version information of the second preset encoding coefficient group set.

18. The communication method according to claim 6, wherein D is greater than 1, and the end node of the $d^{th}$ hop encodes the $G_d$ data packets from the start node of the $d^{th}$ hop by using encoding coefficient groups in a preset encoding coefficient group set.

19. The communication method according to claim 18, wherein the first information corresponding to the $d^{th}$ hop comprises $B_d$ fields, wherein the $G_d$ pieces of first sub information in the first information corresponding to the $d^{th}$ hop are in a one-to-one correspondence with $G_d$ fields in the $B_d$ fields, wherein an index and a location satisfy a fourth preset relationship, wherein the index is in the preset encoding coefficient group set used by the end node of the $d^{th}$ node, and is of an encoding coefficient group indicated by each of the $G_d$ pieces of first sub information, wherein the location is in the $B_d$ fields, and is of a corresponding field in the $B_d$ fields, and wherein a value of each of the $G_d$ fields is a fourth preset value, a value of any field other than the $G_d$ fields in the $B_d$ fields is a fifth preset value, and $B_d$ is an integer greater than or equal to $G_d$.

20. The communication method according to claim 19, wherein the first information corresponding to the $d^{th}$ hop further comprises seventh sub information in the first information corresponding to the $d^{th}$ hop, wherein the seventh sub information indicates a value of $B_d$.

* * * * *